US007382343B2

(12) United States Patent
Hiraki et al.

(10) Patent No.: US 7,382,343 B2
(45) Date of Patent: Jun. 3, 2008

(54) DISPLAY PANEL DRIVING METHOD, DISPLAY PANEL DRIVER CIRCUIT, AND LIQUID CRYSTAL DISPLAY DEVICE

(75) Inventors: Katsuyoshi Hiraki, Kanagawa (JP); Takae Ito, Kanagawa (JP); Toshiaki Suzuki, Kanagawa (JP); Seiji Hayashimoto, Kanagawa (JP); Masaki Miyahara, Kanagawa (JP); Toshimitsu Minemura, Kanagawa (JP); Koichi Katagawa, Kanagawa (JP); Satoshi Sekido, Kanagawa (JP); Yasutake Furukoshi, Kanagawa (JP)

(73) Assignee: Sharp Kabushiki Kaisha, Osaka (JP)

( * ) Notice: Subject to any disclaimer, the term of this patent is extended or adjusted under 35 U.S.C. 154(b) by 922 days.

(21) Appl. No.: 10/669,863

(22) Filed: Sep. 24, 2003

(65) Prior Publication Data

US 2004/0070581 A1 Apr. 15, 2004

Related U.S. Application Data

(62) Division of application No. 09/428,324, filed on Oct. 27, 1999, now Pat. No. 6,680,722.

(30) Foreign Application Priority Data

Oct. 27, 1998 (JP) ................................ 10-304923
Dec. 15, 1998 (JP) ................................ 10-355875
Jul. 30, 1999 (JP) ................................ 11-217333

(51) Int. Cl.
*G09G 3/36* (2006.01)
*G06F 3/038* (2006.01)

(52) U.S. Cl. ........................... 345/96; 345/98; 345/209
(58) Field of Classification Search .......... 345/55-100, 345/204-214
See application file for complete search history.

(56) References Cited

U.S. PATENT DOCUMENTS 5,365,284 A 11/1994 Matsumoto et al.
5,576,729 A 11/1996 Yamazaki
6,084,562 A 7/2000 Onda
6,219,019 B1 4/2001 Hasegawa et al.
6,229,512 B1 5/2001 Shigehiro
6,229,515 B1 5/2001 Itoh et al.
6,304,242 B1 10/2001 Onda (Continued)

FOREIGN PATENT DOCUMENTS

JP 62-113129 5/1987

(Continued)

*Primary Examiner*—David L. Lewis
(74) *Attorney, Agent, or Firm*—Greer, Burns & Crain, Ltd.

(57) ABSTRACT

Polarity patterns (polarity pattern signal POL) are stored in a ROM in a polarity pattern controlling portion. Then, the polarity pattern is changed according to applications of a liquid crystal display panel. Since the polarity pattern is stored in the ROM, the polarity pattern can be changed without modification of a hardware. Also, two sets of polarity patterns or more are stored in the ROM, and then any one polarity pattern can be output according to the application. In addition, the polarity pattern signal POL and image signals RGB are compared with each other, and then the polarity pattern which is to be read from the ROM is switched according to the result.

17 Claims, 51 Drawing Sheets

CONFIGURATION OF LIQUID CRYSTAL DISPLAY DEVICE

1 LIQUID CRYSTAL DISPLAY DEVICE

U.S. PATENT DOCUMENTS

| | | | |
|---|---|---|---|
| 6,310,600 | B1 | 10/2001 | Koyama et al. |

FOREIGN PATENT DOCUMENTS

| | | |
|---|---|---|
| JP | 2-34818 | 2/1990 |
| JP | 6-149174 | 5/1994 |
| JP | 07-175448 | 7/1995 |
| JP | 8-202317 | 8/1996 |
| JP | 9-204159 | 8/1997 |
| WO | WO 93/23845 | 11/1993 |

SECTIONAL SHAPE OF LIQUID CRYSTAL PANEL

LIQUID CRYSTAL DISPLAY PANEL

CONFIGURATION OF LIQUID CRYSTAL DISPLAY DEVICE

TIMING CHART (1)

TIMING CHART (2)

CONFIGURATION OF POLARITY PATTERN CONTROLLING PORTION 32

CONFIGURATION OF DATA DRIVER 33

CONFIGURATION OF D/A CONVERTER 46a

FIG. 11

INPUT/OUTPUT OF DECODER 51

| DECODER INPUT | | | | DECODER OUTPUT | | | | | | | | | | | | | | | | D/A CONVERTER OUTPUT |
|---|---|---|---|---|---|---|---|---|---|---|---|---|---|---|---|---|---|---|---|---|
| 0 | 1 | 1 | 1 | 1 | 0 | 0 | 0 | 0 | 0 | 0 | 0 | 0 | 0 | 0 | 0 | 0 | 0 | 0 | 0 | +V7 |
| 0 | 1 | 1 | 0 | 0 | 1 | 0 | 0 | 0 | 0 | 0 | 0 | 0 | 0 | 0 | 0 | 0 | 0 | 0 | 0 | +V6 |
| 0 | 1 | 0 | 1 | 0 | 0 | 1 | 0 | 0 | 0 | 0 | 0 | 0 | 0 | 0 | 0 | 0 | 0 | 0 | 0 | +V5 |
| 0 | 1 | 0 | 0 | 0 | 0 | 0 | 1 | 0 | 0 | 0 | 0 | 0 | 0 | 0 | 0 | 0 | 0 | 0 | 0 | +V4 |
| 0 | 0 | 1 | 1 | 0 | 0 | 0 | 0 | 1 | 0 | 0 | 0 | 0 | 0 | 0 | 0 | 0 | 0 | 0 | 0 | +V3 |
| 0 | 0 | 1 | 0 | 0 | 0 | 0 | 0 | 0 | 1 | 0 | 0 | 0 | 0 | 0 | 0 | 0 | 0 | 0 | 0 | +V2 |
| 0 | 0 | 0 | 1 | 0 | 0 | 0 | 0 | 0 | 0 | 1 | 0 | 0 | 0 | 0 | 0 | 0 | 0 | 0 | 0 | +V1 |
| 0 | 0 | 0 | 0 | 0 | 0 | 0 | 0 | 0 | 0 | 0 | 1 | 0 | 0 | 0 | 0 | 0 | 0 | 0 | 0 | +V0 |
| 1 | 0 | 0 | 0 | 0 | 0 | 0 | 0 | 0 | 0 | 0 | 0 | 1 | 0 | 0 | 0 | 0 | 0 | 0 | 0 | −V0 |
| 1 | 0 | 0 | 1 | 0 | 0 | 0 | 0 | 0 | 0 | 0 | 0 | 0 | 1 | 0 | 0 | 0 | 0 | 0 | 0 | −V1 |
| 1 | 0 | 1 | 0 | 0 | 0 | 0 | 0 | 0 | 0 | 0 | 0 | 0 | 0 | 1 | 0 | 0 | 0 | 0 | 0 | −V2 |
| 1 | 0 | 1 | 1 | 0 | 0 | 0 | 0 | 0 | 0 | 0 | 0 | 0 | 0 | 0 | 1 | 0 | 0 | 0 | 0 | −V3 |
| 1 | 1 | 0 | 0 | 0 | 0 | 0 | 0 | 0 | 0 | 0 | 0 | 0 | 0 | 0 | 0 | 1 | 0 | 0 | 0 | −V4 |
| 1 | 1 | 0 | 1 | 0 | 0 | 0 | 0 | 0 | 0 | 0 | 0 | 0 | 0 | 0 | 0 | 0 | 1 | 0 | 0 | −V5 |
| 1 | 1 | 1 | 0 | 0 | 0 | 0 | 0 | 0 | 0 | 0 | 0 | 0 | 0 | 0 | 0 | 0 | 0 | 1 | 0 | −V6 |
| 1 | 1 | 1 | 1 | 0 | 0 | 0 | 0 | 0 | 0 | 0 | 0 | 0 | 0 | 0 | 0 | 0 | 0 | 0 | 1 | −V7 |

VOLTAGE-TRANSMITTANCE CHARACTERISTIC

EXAMPLE OF POLARITY PATTERN (1)

DISPLAY PIXEL

DISPLAY PIXEL

DISPLAY PIXEL

DISPLAY PIXEL

EXAMPLE OF POLARITY PATTERN (2)

CASE OF ODD-NUMBERED FRAME

CASE OF EVEN-NUMBERED FRAME

DISPLAY PATTERN

DISPLAY PIXEL

| | | | |
|---|---|---|---|
| DARK YELLOW | DARK SKY BLUE | DARK BLUE | DARK RED |
| DARK BLUE | DARK RED | DARK YELLOW | DARK SKY BLUE |
| | | | |

EXAMPLE OF POLARITY PATTERN (3)

| OUTPUT | O1 | O2 | O3 | O4 | O5 | O6 | O7 | O8 | O9 | O10 | O11 | O12 | O13 | O14 | O15 | O16 |
|---|---|---|---|---|---|---|---|---|---|---|---|---|---|---|---|---|
| POLARITY | + | + | − | + | − | − | + | + | − | + | − | − | + | + | − | + |

POLARITY PATTERN SIGNAL (POL)

POLARITY PATTERN CONTROLLING PORTION

DATA DRIVER

FIG. 28
TIMING CHART (3)
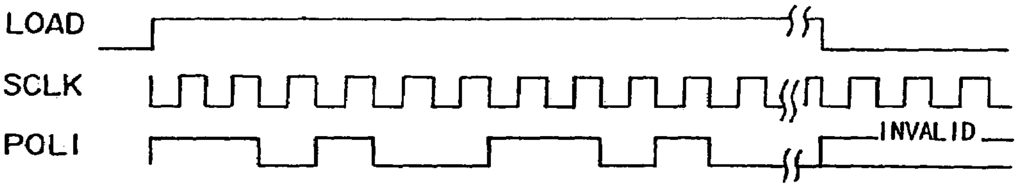
FIG. 29
EXAMPLE OF POLARITY PATTERN
| OUTPUT | | | O1 | O2 | O3 | O4 | O5 | O6 | O7 | O8 | O9 | O10 | O11 | O12 |
|---|---|---|---|---|---|---|---|---|---|---|---|---|---|---|
| POLARITY | POL2 | 0 | + | + | − | + | − | − | + | + | − | + | − | − |
| | | 1 | − | − | + | − | + | + | − | − | + | − | + | + |
FIG. 30
VOLTAGE APPLIED TO PIXEL
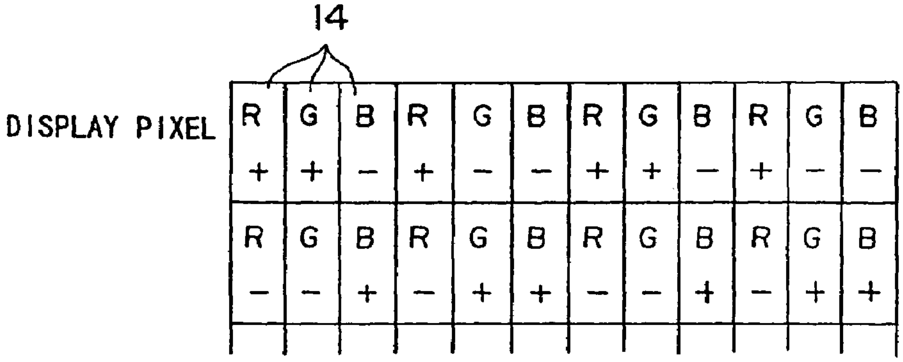

CONFIGURATION OF POLARITY PATTERN CONTROLLING PORTION

CONFIGURATION OF POLARITY PATTERN CONTROLLING PORTION

FIG. 33

INPUT/OUTPUT OF LOGIC CIRCUIT

| A | B | C | Q |
|---|---|---|---|
| 1 | 1 | 0 | 1 |
| 0 | 1 | 0 | 0 |
| 1 | 0 | 0 | 1 |
| 0 | 0 | 0 | 0 |

| A | B | C | Q |
|---|---|---|---|
| 1 | 1 | 1 | 1 |
| 0 | 1 | 1 | 1 |
| 1 | 0 | 1 | 0 |
| 0 | 0 | 1 | 0 |

FIG. 34A

POLARITY INVERSION IN SEL=0

DISPLAY PIXEL

| | | | | | | | | | | | |
|---|---|---|---|---|---|---|---|---|---|---|---|
| R + | G − | B + | R − | G + | B − | R + | G − | B + | R − | G + | B − |
| R − | G + | B − | R + | G − | B + | R − | G + | B − | R + | G − | B + |
| | | | | | | | | | | | |

FIG. 34B

POLARITY INVERSION IN SEL=1

DISPLAY PIXEL

| | | | | | | | | | | | |
|---|---|---|---|---|---|---|---|---|---|---|---|
| R + | G + | B − | R − | G + | B + | R − | G − | B + | R + | G − | B − |
| R − | G − | B + | R + | G − | B − | R + | G + | B − | R − | G + | B + |
| | | | | | | | | | | | |

BLOCK PARTITION OF SCREEN

FIG. 36A

FIRST POLARITY PATTERN

| | | | | | | | |
|---|---|---|---|---|---|---|---|
| + | − | + | − | + | − | + | − |
| − | + | − | + | − | + | − | + |
| + | − | + | − | + | − | + | − |
| − | + | − | + | − | + | − | + |
| + | − | + | − | + | − | + | − |

FIG. 36B

SECOND POLARITY PATTERN

| | | | | | | | |
|---|---|---|---|---|---|---|---|
| + | − | + | − | + | − | + | − |
| + | − | + | − | + | − | + | − |
| − | + | − | + | − | + | − | + |
| − | + | − | + | − | + | − | + |
| + | − | + | − | + | − | + | − |

DISPLAY DATA CONVERTING PORTION

FLICKER PATTERN DETECTING

DYNAMIC RANGE DESIGNATING PORTION

FLICKER INFORMATION STORING PORTION

FLICKER INFORMATION STORING PORTION

DRIVE MODE SELECTING PORTION

FLICKER PATTERN DECISION

DATA DRIVER

FLICKER PATTERN

EXAMPLE OF FLICKER PATTERN AND EXCEPTION PATTERN
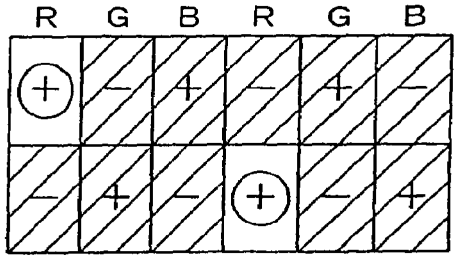
FIG. 47A
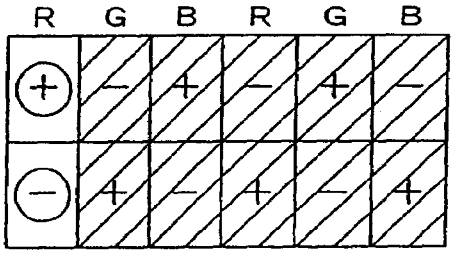
FIG. 47B
FIG. 48
VERTICAL-STRIPED PATTERN DECISION
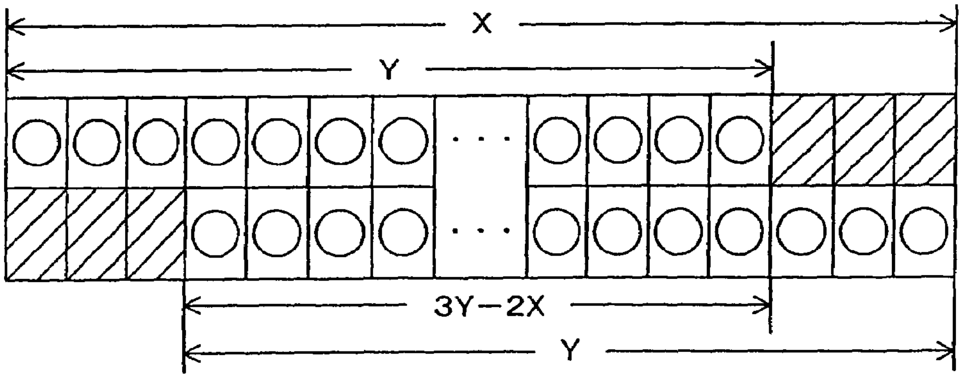

2-DOT CHECKER PATTERN

EXAMPLE OF SPECIAL PATTERN

FIG. 51

VERTICAL LINE INVERTED POLARITY PATTERN

| | | | | | | |
|---|---|---|---|---|---|---|
| N | + | − | + | − | + | − |
| N+1 | + | − | + | − | + | − |
| N+2 | + | − | + | − | + | − |
| N+3 | + | − | + | − | + | − |

FIG. 52

HORIZONTAL LINE INVERTED POLARITY PATTERN

| | | | | | | |
|---|---|---|---|---|---|---|
| N | + | + | + | + | + | + |
| N+1 | − | − | − | − | − | − |
| N+2 | + | + | + | + | + | + |
| N+3 | − | − | − | − | − | − |

LIQUID CRYSTAL DISPLAY PANEL DRIVER CIRCUIT

FLICKER PATTERN DETECTING/DRIVE MODE SELECTING PORTION (No. 1)

FLICKER PATTERN DETECTING/DRIVE MODE SELECTING PORTION (No. 2)

FLICKER PATTERN DETECTING/DRIVE MODE SELECTING PORTION (No. 3)

FLICKER PATTERN DETECTING/DRIVE MODE SELECTING PORTION (No. 4)

FLICKER PATTERN DETECTING/DRIVE MODE SELECTING PORTION (No. 5)

FLICKER PATTERN DETECTING/DRIVE MODE SELECTING PORTION (No. 6)

DISPLAY PANEL DRIVING METHOD, DISPLAY PANEL DRIVER CIRCUIT, AND LIQUID CRYSTAL DISPLAY DEVICE

This is a Divisional of application Ser. No. 09/428,324 filed Oct. 27, 1999 now U.S. Pat. No. 6,680,722.

BACKGROUND OF THE INVENTION

1. Field of the Invention

The present invention relates to a display panel driving method, a display panel driver circuit, and a liquid crystal display device, which are capable of inverting a polarity of a data signal which is applied to respective picture elements of a display panel every predetermined time, i.e., executing the alternating current drive and, more particularly, an active matrix type liquid crystal display panel driving method, a liquid crystal panel driver circuit, and a liquid crystal display device.

2. Description of the Related Art

In recent years, as a display for OA devices such as the notebook computer (mobile PC), etc. as well as various devices such as the digital video camera, the telephone, etc., the liquid crystal display device is rapidly spreading. Such liquid crystal display device is still inferior in screen size, picture quality, cost, etc. to the displaying means such as the CRT (cathode ray tube), etc., nevertheless its excellent features such as low power consumption, light weight, space saving, etc. are watched with interest.

The active matrix type liquid crystal display panel has such a structure that a liquid crystal is sealed between two glass substrates. A plurality of picture element electrodes, which are arranged in the horizontal direction and the vertical direction, and a plurality of switching elements, which turn ON/OFF the voltage applied to the picture element electrodes, are formed on one glass substrate. As the switching element, a thin film transistor (abbreviated as a "TFT" hereinafter) is often employed.

Also, color filters and opposing electrode are formed on the other glass substrate. These two glass substrates are arranged such that a face on which the picture element electrodes are formed and a face on which the opposing electrode are formed are opposed to each other. Three color filters, i.e., red (R), green (G), blue (B) filters are formed as the color filters. The R, G, B color filters are arranged in predetermined sequence to correspond to respective picture element electrodes. The substrate having the TFTs thereon is called a TFT substrate, and the substrate having the opposing electrode thereon is called an opposing substrate.

In addition, a pair of polarizing plates are arranged so as to put the TFT substrate and the opposing substrate, between which the liquid crystal is sealed, between them. Normally, polarizing axes of a pair of polarizing plates are arranged to intersect orthogonally with each other.

FIG.1 is a block diagram showing an example of a liquid crystal display device in the prior art. As shown in FIG.1, the liquid crystal display device comprises a liquid crystal display panel 501, a data driver include a plurality of data driver IC 502, a gate driver include a plurality of gate driver IC 503, an input controlling portion 505, and a reference voltage power supply 506.

A plurality of picture elements (not shown) which are arranged in a matrix, a plurality of data bus lines 502*a* and a plurality of gate bus lines 503*a*, and a plurality of TFTs (not shown) which are connected between the picture elements and the data bus lines 502*a* and the gate bus lines 503*a* respectively are provided to the liquid crystal display panel 501. The data driver 502 outputs data signals (display data) to the data bus lines 502*a*. The gate driver 503 outputs a predetermined scanning signal to the gate bus lines 503*b* in sequence at timings which are in synchronism with the horizontal synchronizing signal. The TFTs are turned ON when the predetermined scanning signal is supplied to the gate bus lines 503*a* to transmit the data signals, which are supplied to the data bus lines 502*a*, to picture element electrodes.

The input controlling portion 505 receives signals such as image signals, synchronizing signals, operating clocks, etc. from a display control information source (referred to as a "personal computer" hereinafter) 504 such as a personal computer, and then outputs the image signals to the data driver 502 at predetermined timings and also supplies the clock signals to the gate driver 503. The reference voltage power supply 506 supplies reference voltages, which is applied to the picture elements, to the data driver 502.

FIG. 2 is a block diagram showing a configuration of the input controlling portion 505 of the liquid crystal display device in the prior art.

The input controlling portion 505 is composed of an input interface (I/F) portion 511, an input data latch circuit 512, and a data output circuit 513. The input. I/F portion 511 receives display control information (the image signal, the horizontal, and vertical synchronizing signal, the operation control signal, etc.) from the personal computer 504, and transmits predetermined signals to the input data latch circuit 512, the data output circuit 513, etc. The input data latch circuit 512 holds temporarily the image signals (R, G, B). Also, the data output circuit 513 performs timing control, waveform shaping, etc. of the image signal, and then outputs them to the data driver 502.

In such configuration, the image data which are received via the input I/F portion 511 are output to the data driver 502 at a predetermined timing via the input data latch circuit 512 and the data output circuit 513. Based on an inverting period of the reference voltage supplied from the reference voltage power supply 506, the data driver 502 inverts the polarity of the data signal, which is applied to the picture element, at a predetermined period.

Where the wording "inverting period of the reference voltage" means such an inverting period that the reference voltage being applied between the picture element electrode and the opposing electrode in the liquid crystal display panel repeats a positive polarity voltage and a negative polarity voltage invertedly relative to a common voltage alternatively. Normally, such inverting period of the reference voltage is set to a constant inverting period.

As described above, the active matrix type liquid crystal display panel can be driven by the alternating current voltage. For example, the voltage whose polarity can be changed into a positive polarity (+) and a negative polarity (−) every predetermined time interval with respect to the voltage, which applied to the opposing electrode, is supplied to the picture element electrode. It is preferable that the voltage being applied to the liquid crystal should have a positive voltage waveform and a negative voltage waveform symmetrically. However, even if the alternating current voltage which has the positive voltage waveform and the negative voltage waveform symmetrically is applied to the picture element electrodes, the positive voltage waveform and the negative voltage waveform which are applied actually to the liquid crystal are not formed in a symmetrical manner. Therefore, a transmittance of light obtained when the positive voltage is applied and a transmittance of light obtained when the negative voltage is applied become different. As a result, a luminance is varied in a period of the alternating current voltage being applied to the picture element electrode to thus cause a flicker. This phenomenon is called a flicker.

In the prior art, a method of changing the voltage applied to the opposing electrode, a method of setting the polarity of the voltage applied to the adjacent picture element electrodes differently in the horizontal direction and the vertical direction, and a method of increasing the frequency of the polarity inversion are known as a method of suppressing such flicker. For example, such technologies have been disclosed in Patent Application Publication (KOKAI) Sho 62-113129, Patent Application Publication (KOKAI) Hei 2-34818, Patent Application Publication (KOKAI) Hei 6-149174, Patent Application Publication (KOKAI) Hei 7-175448, and Patent Application Publication (KOKAI) Hei 9-204159.

In case the voltages which has the different polarity are applied to the adjacent picture element electrodes, there may be considered (i) a method by which the voltage with the same polarity is applied to the picture element electrodes being aligned in the vertical direction while the voltage with the opposite polarity is applied to the neighboring picture element electrodes being aligned in the horizontal direction, (ii) a method by which the voltage with the same polarity is applied to the picture element electrodes being aligned in the horizontal direction while the voltage with the opposite polarity is applied to the neighboring picture element electrodes being aligned in the vertical direction, (iii) a method by which the voltages with mutually different polarities are applied to the picture element electrodes being adjacent in the vertical direction and the horizontal direction, etc. Where the pattern indicating the polarity of the voltage, which is applied to the picture element electrodes of the liquid crystal display panel, is called the polarity pattern.

The inventors of the present invention have concluded that the above prior art contains following problems. That is, the flicker becomes conspicuous when the vertical-striped pattern (display pattern) is displayed in the polarity pattern (i), when the lateral-striped pattern is displayed in the polarity pattern (ii), and when the mosaic pattern (checker pattern) is displayed in the polarity pattern (iii). These patterns (display patterns) are relatively often used in the display for the computer system.

Also, according to the method of changing the voltage applied to the opposing electrode, the control becomes complicated and also the circuit scale is increased. In addition, according to the method of increasing the inverting frequency, the circuit configuration becomes complicated.

SUMMARY OF THE INVENTION

It is an object of the present invention to provide a display panel driving method, a display panel driver circuit, and a liquid crystal display device, which are capable of reducing or preventing generation of flickers with a relatively simple circuit configuration.

The above subjects can be overcome by providing, for example, as shown in FIG. 16, a liquid crystal display device comprising a liquid crystal display panel 501 having picture elements which are arranged at intersection points of a plurality of data bus lines 502*a* and a plurality of gate bus lines 503*a* in a matrix; a data driver 502 for supplying image data to the data bus lines 502*a* in unit of picture element; a gate driver 503 for driving the picture elements into their operation states sequentially via the gate bus lines 503*a* in synchronism with a horizontal synchronizing signal; an input controlling portion 555 for controlling the image data displayed on the liquid crystal display panel 501 by supplying a display control signal, which contains at least the image data and the horizontal synchronizing signal, to the data driver 502 and the gate driver 503; and a reference voltage generating portion 556 for generating a reference voltage, which is applied to the picture elements with predetermined polarities on the liquid crystal display panel 501, based on the image data; wherein the input controlling portion 555 monitors a correlation between a change period of a display pattern of the image data and a polarity inverting period of the reference voltages, and then switches arbitrarily the polarity inverting period when it is decided that the change period synchronizes with the polarity inverting period.

In this case, as shown in FIG. 17 and FIG. 18, the input controlling portion 555 includes an image data extracting means 512*a* for extracting the image data sequentially, a pattern detecting means 514*a* for detecting a particular display pattern by counting an amount of change of extracted image data and then comparing the amount of change with a predetermined specified value, and an inverting period controlling means 514*b* for generating the reference voltage having a different polarity inverting period, the inverting period controlling means 514*b* switches and sets the polarity inverting period based on a detection result derived by the pattern detecting means 514*a*, and the reference voltage generating portion 556 generates the reference voltage having the polarity inverting period being switched and set and supplies it to the data driver 502.

In the present invention, the image data which are to be displayed adjacently are extracted and monitored in sequence by the image data extracting means 512*a* and the pattern detecting means 514*a*, and then the reference voltage is supplied from the inverting period controlling means 514*b* at a different polarity inverting period, which is previously prepared, when a particular display pattern which generates the flicker or an increase of power consumption is decided.

Therefore, according to the liquid crystal display device of the present invention, in the event that the polarity inversion of the image data being applied to the picture elements is performed based on the polarity inverting period which is set as the initial state, the polarity inverting period can be switched to the different polarity inverting period when the image data which need to display the particular pattern causing the flicker or the increase in the power consumption on the display screen are input. As a result, the flicker or the increase of power consumption of the liquid crystal display device can be suppressed by avoiding the synchronization between the polarity inverting period of the image data and the display pattern.

BRIEF DESCRIPTION OF THE DRAWINGS

FIG. 11 is a view showing a relationship between inputs and outputs of a decoder of the D/A converter in FIG. 10;

FIG. 28 is a timing chart showing timings of a loading signal LOAD, the shift clock SCLK, and a polarity pattern signal POL1;

FIG. 29 is a view showing a relationship between an inverting signal POL2 and the polarity pattern;

FIG. 30 is a view showing polarities of respective picture element electrodes of the liquid crystal display panel;

FIG. 33 is a table showing inputs and outputs of logic circuits in the data driver in FIG. 32;

FIG. 34A is a view showing the polarity pattern when a selection signal SEL is "0";

FIG. 34B is a view showing the polarity pattern when the selection signal SEL is "1";

FIG. 36A is a view showing a first polarity pattern according to the sixth embodiment of the present invention;

FIG. 36B is a view showing a second polarity pattern according to the sixth embodiment of the present invention;

FIG. 47A is a schematic view showing an example of the flicker pattern;

FIG. 47B is a schematic view showing an example of the pattern excepted from the flicker pattern;

FIG. 48 is a view showing a vertical-striped pattern detection method;

FIG. 51 is a view showing a vertical line inverted polarity pattern;

FIG. 52 is a view showing a horizontal line inverted polarity pattern;

DESCRIPTION OF THE PREFERRED EMBODIMENTS

Embodiments of the present invention will be explained with reference to the accompanying drawings hereinafter.

First Embodiment

(1) Configuration of a Liquid Crystal Display Panel

Figure 3:
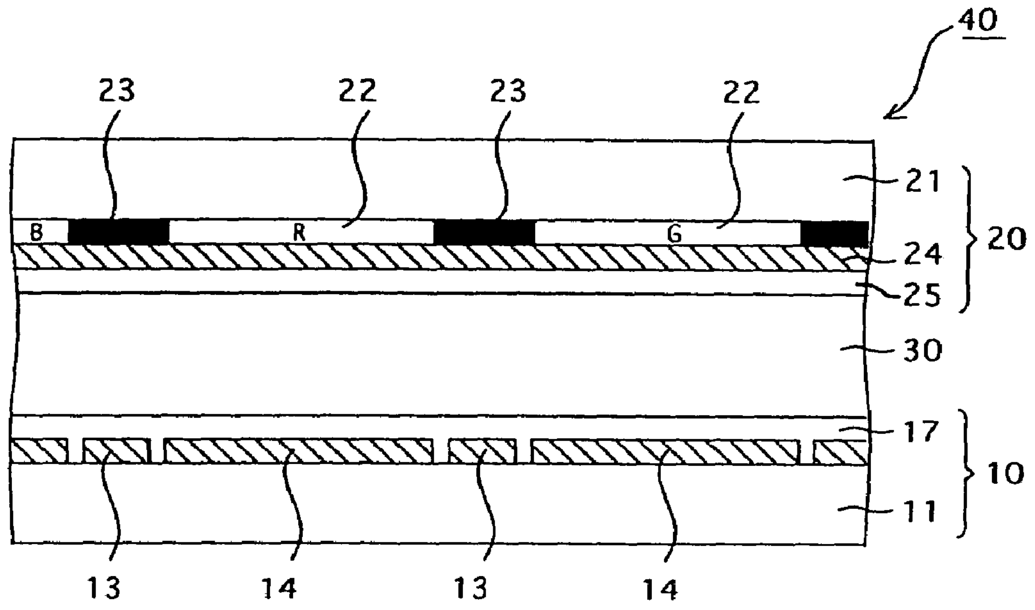
FIG. 3 is a sectional view showing a configuration of a liquid crystal display panel.
Figure 4:
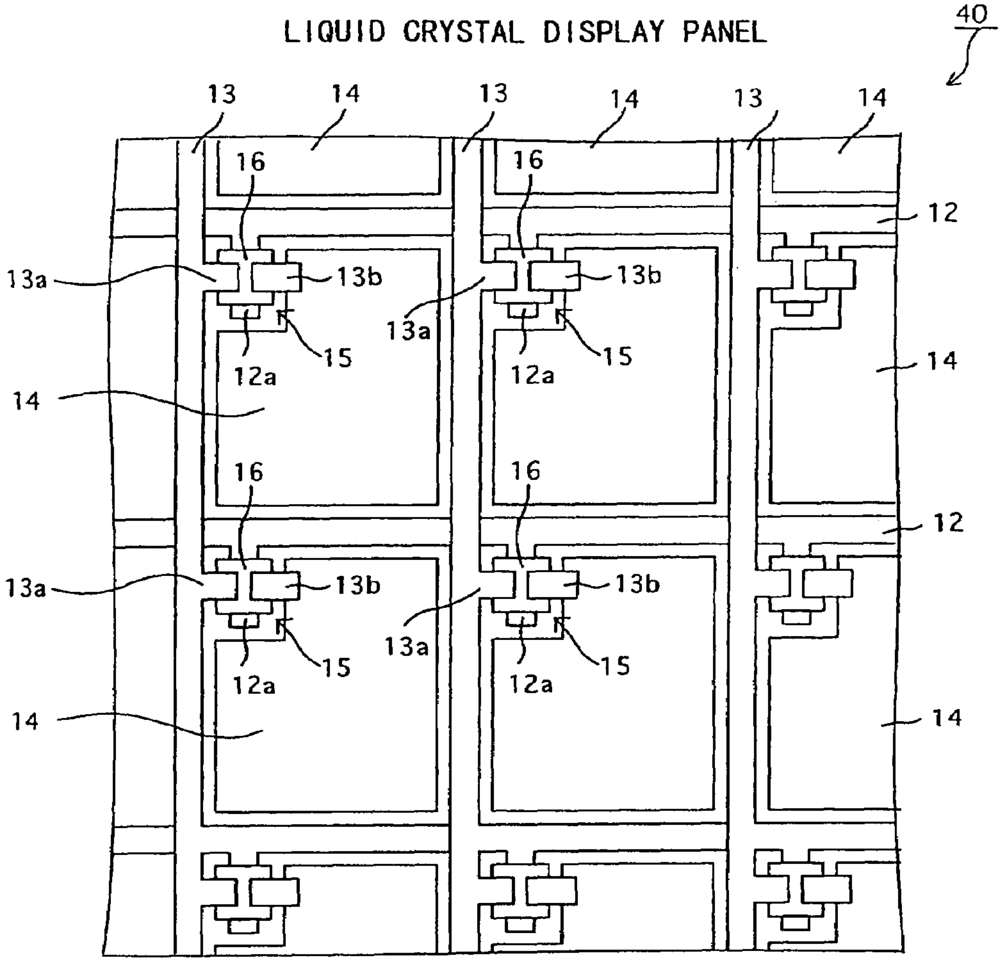
FIG. 4 is a plan view showing a TFT substrate of the liquid crystal display panel.

FIG. 3 is a sectional view showing a configuration of a liquid crystal display panel which is driven by a driver circuit according to a first embodiment. FIG. 4 is a plan view showing a TFT substrate of the liquid crystal display panel in FIG. 3.

The liquid crystal display panel 40 comprises a TFT substrate 10 and an opposing substrate 20 which are arranged to face to each other, and a liquid crystal 30 which is sealed between the TFT substrate 10 and the opposing substrate 20.

The TFT substrate 10 includes a glass substrate 11, gate bus lines 12 formed on the glass substrate 11, data bus lines 13, picture element electrodes 14, TFTs 15, etc. The gate bus lines 12 and the data bus lines 13 are intersected perpendicularly with each other, and are isolated electrically by an insulating film (not shown) which is formed between them. The gate bus lines. 12 and the data bus lines 13 are formed of metal such as aluminum, etc.

Rectangular regions which are partitioned by the gate bus lines 12 and the data bus lines 13 act as the picture elements respectively. Transparent picture element electrodes 14 which are formed of indium-tin oxide (abbreviated as an "ITO" hereinafter) are formed on the picture elements respectively. The TFT 15 consists of a gate electrode 12*a* connected to the gate bus line 12, a silicon film 16 formed over the gate electrode 12*a* via a gate insulating film (not shown), and a drain electrode 13*a* and a source electrode 13*b* formed over the silicon film 16. The drain electrode 13*a* is connected to the data bus line 13, and the source electrode 13*b* is connected to the picture element electrodes 14. Also, a storage capacitance electrode (not shown) is formed so as to overlap with a part of the picture element electrodes 14.

An orientation film 17 formed of polyimide, for example, is formed on the picture element electrodes 14. Orientation treatment is applied to a surface of the orientation film 17 to decide the alignment direction of liquid crystal molecules when the voltage is not applied. As the representative method of the orientation treatment, there is known a rubbing method in which a surface of the orientation film is rubbed in one way by a cloth roller.

While, the opposing substrate 20 includes a glass substrate 21, color filters 22 which are formed on a lower surface side of the glass substrate 21, a black matrix 23, opposing electrode 24, an orientation film 25, etc. Three types of the color filters, i.e., red (R), green (G), and blue (B) filters are provided as the color filters 22. The color filter 22 is opposed to the picture element electrodes 14 one by one. In the first embodiment, the color filters 22 are aligned in the order of R, G, B along the horizontal direction. The black matrix 23 is provided between the color filters 22. This black matrix 23 is formed of a metal thin film such as chromium (Cr), which does not transmit the light.

A transparent opposing electrode 24 formed of ITO is formed below the color filters 22 and the black matrix 23. An orientation film 25 is formed below the opposing electrode 24. The orientation treatment is also applied to a surface of the orientation film 25.

Spherical spacers (not shown) are provided between the TFT substrate 10 and the opposing substrate 20, whereby a constant distance between the TFT substrate 10 and the opposing substrate 20 can be maintained. Also, polarizing plates (not shown) are arranged on the TFT substrate 10 and the opposing substrate 20 respectively. These polarizing plates are arranged such that their polarizing axes intersect with each other.

When the data signal is supplied to the data bus lines 13 and the scanning signal is supplied to the gate bus lines 12, the TFTs 15 are turned ON and thus the data signal is supplied to the picture element electrodes 14. Accordingly, an electric field is generated between the picture element electrodes 14 and the opposing electrode 24. The direction of liquid crystal molecules in the liquid crystal 30 is changed by this electric field, so that the light transmittance of the picture element is changed. A desired-image can be displayed on the liquid crystal display panel 40 by controlling the voltage applied to the picture element electrodes 14 picture element by picture element.

(2) Configuration of the Driver Circuit

Figure 5:
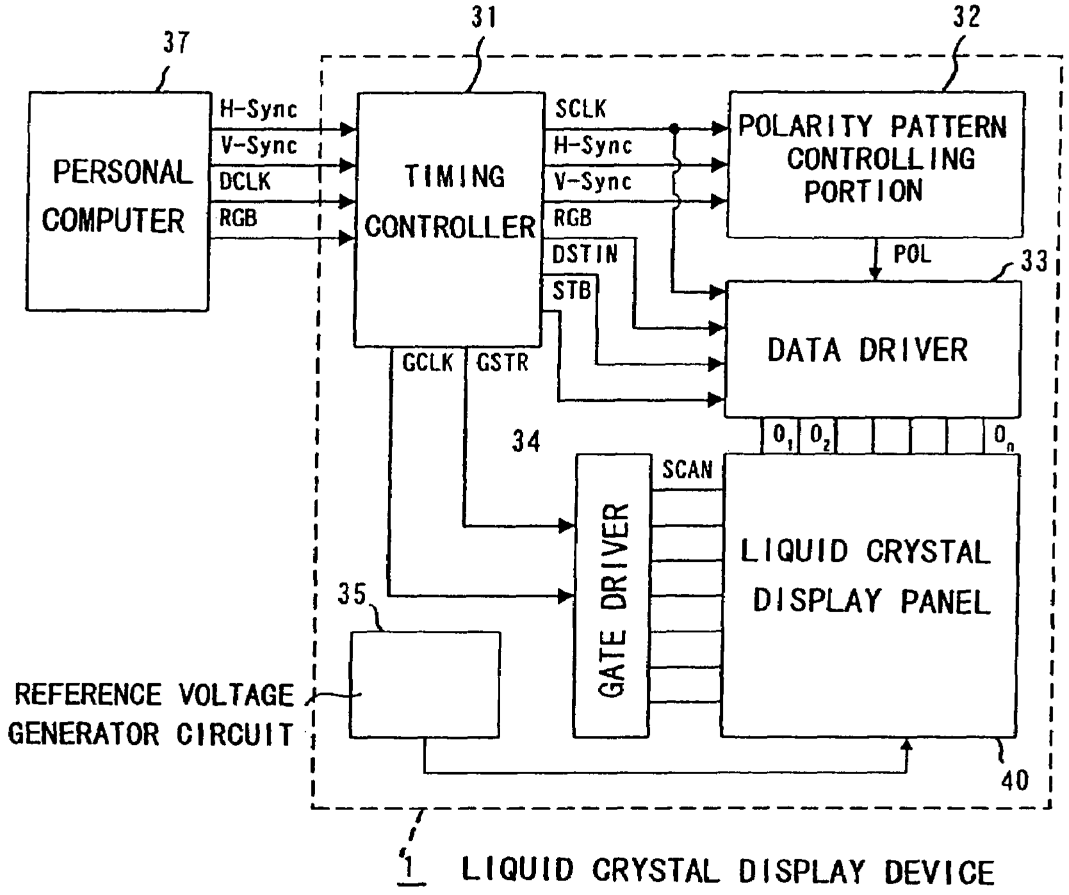
FIG. 5 is a block diagram showing a configuration of a liquid crystal display device according to a first embodiment of the present invention.

FIG. 5 is a block diagram showing a liquid crystal display device according to the first embodiment of the present invention. The liquid crystal display device 1 comprises the liquid crystal display panel 40, a timing controller 31, a polarity pattern controlling portion 32, a data driver include a plurality of data driver IC 33 and a gate driver include a plurality of gate drive IC 34, and a reference voltage generator circuit 35.

The timing controller 31 is connected to a personal computer 37 or other device for outputting the image signals RGB (referred simply to as the "personal computer" hereinafter). A horizontal synchronizing signal H-sync, a vertical synchronizing signal V-sync, a data clock DCLK, and the image signals RGB are input from the personal computer 37 to the timing controller 31.

The image signals RGB are three digital signals (referred to as "RGB signal" hereinafter) consisting of an R signal indicating a red luminance, a G signal indicating a green luminance, and a B signal indicating a blue luminance. Normally, the bit number of the RGB signal is often set to 8 bit respectively. However, for simplicity of explanation, assume that the RGB signal are formed of a 3-bit signal respectively. These RGB signal are signals which are synchronism with the data clock DCLK.

The timing controller 31 receives the horizontal synchronizing signal H-sync, the vertical synchronizing signal V-sync, and the data clock DCLK, and then generates a shift clock SCLK, a data start signal DSTIN, a strobe signal STB, a gate start signal GSTR, and a gate clock GCLK based on these signals.

Figure 6:
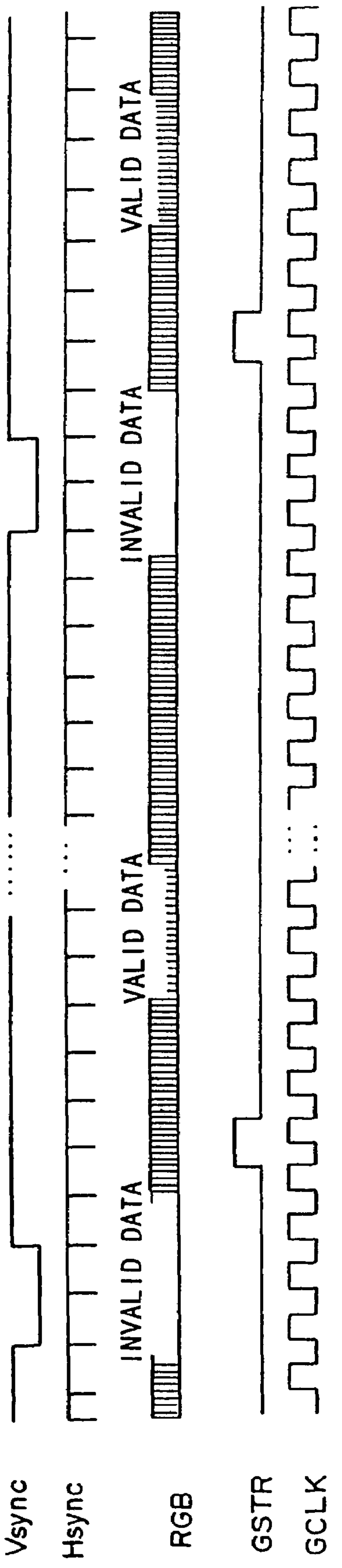
FIG. 6 is a timing chart showing timings of a vertical synchronizing signal V-sync, a horizontal synchronizing signal H-sync, an image signal RGB, a gate start signal GSTR, and a gate clock GCLK.
Figure 7:
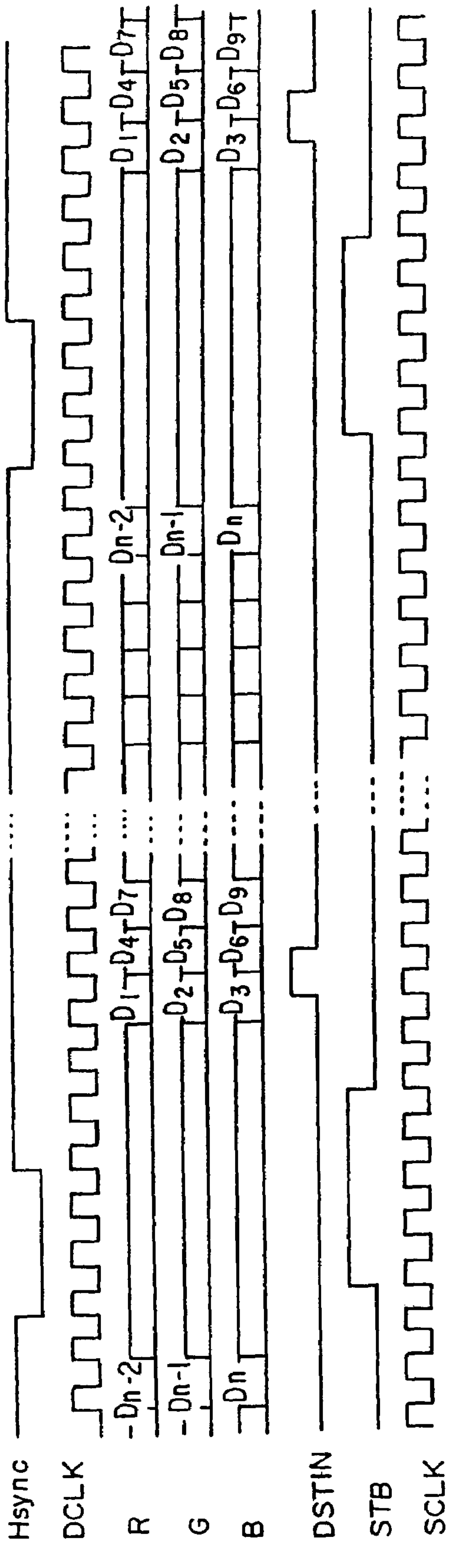
FIG. 7 is a timing chart showing timings of the horizontal synchronizing signal H-sync, an R signal, a G signal, a B signal, a data start signal DSTIN, a strobe signal STB, and a shift clock SCLK.

FIG. 6 is a timing chart showing timings of the vertical synchronizing signal V-sync, the horizontal synchronizing signal H-sync, the image signal RGB, the gate start signal GSTR, and the gate clock GCLK. FIG. 7 is a timing chart showing timings of the horizontal synchronizing signal H-sync, the R signal, the G signal, the B signal, the data start signal DSTIN, the strobe signal STB, and the shift clock SCLK.

As shown in FIGS. 6 and 7, the gate start signal GSTR is a signal to synchronize with a leading edge of the vertical synchronizing signal V-sync. The gate clock GCLK is a signal to synchronize with the horizontal synchronizing signal H-sync. The data start signal DSTIN is a signal to indicate a start timing of transmission of the image signal RGB. After the vertical synchronizing signal V-sync has been changed from "0." to "1", the transmission of the image signal RGB is started in synchronism with the first leading edge of the horizontal synchronizing signal H-sync. In this case, the data corresponding to the picture element number (n) of the liquid crystal display panel 40 in the horizontal direction are transmitted as the image signal RGB within one horizontal synchronization period in synchronism with the data clock DCLK. Accordingly, before the data transmission for the succeeding horizontal synchronization period is started after the data transmission for one horizontal synchronization period has been completed, and before the data transmission for the succeeding frame is started after the data transmission for one frame has been completed, values of the image signal RGB become invalid data.

The strobe signal STB is a signal to synchronize with the horizontal synchronizing signal H-sync. The shift clock SCLK is a signal to synchronize with the data clock DCLK.

The polarity pattern controlling portion 32 receives the horizontal synchronizing signal H-sync, the vertical synchronizing signal V-sync and the shift clock SCLK, and then outputs the polarity pattern signal POL. The data driver 33 receives the image signal RGB, the shift clock SCLK, the data start signal DSTIN, and the strobe signal STB from the timing controller 31 and also receives the polarity pattern signal POL from the polarity pattern controlling portion 32, and then outputs data signals $O_1$ to $O_n$ to the data bus lines 13 for the liquid crystal display panel 40. The polarity of these data signals $\mathbf{0}_1$ to $O_n$ is inverted at a predetermined period.

The gate driver 34 receives the gate start signal GSTR and the gate clock GCLK from timing controller 31, and supplies the scanning signal SCAN to the gate bus lines 11 of the liquid crystal display panel 40 in sequence.

In the case of the driver circuit of the TFT type liquid crystal display panel, the data driver 33 and the gate driver 34 may be formed on the TFT substrate of the liquid crystal display panel 40.

The reference voltage generator circuit 35 generates a reference voltage which is applied to the opposing electrode 24 of the liquid crystal display panel 40. This reference voltage can be set according to a center voltage of the data signals $O_1$ to $O_n$ and an amount of the voltage shift due to the capacitance component of the picture element. Also, the reference voltage generator circuit 35 generates predetermined voltages necessary for operations of the data driver 33, and the gate driver 34, and then supplies these voltages to respective circuits via wirings (not shown).

In the above example, the case where the driver circuit is connected to the computer 37 is explained. However, also the driver circuit of the liquid crystal display panel of the present invention can be connected to a video signal outputting device such as a TV tuner, etc. In this case, respective circuits for generating the RGB signal, the horizontal synchronizing signal H-sync, and the vertical synchronizing signal V-sync from the video signal are required, but well-known circuits may be employed as these circuits.

(3) Configuration of the Polarity Pattern Control Circuit

Figure 8:
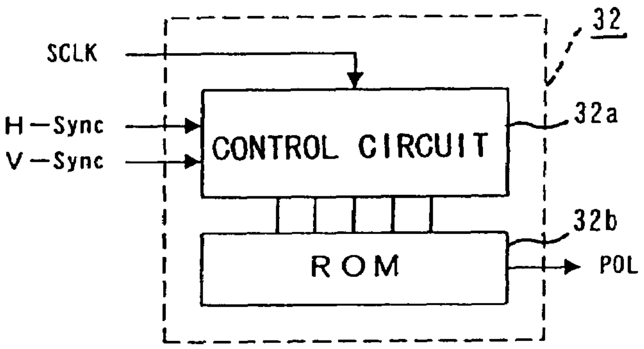
FIG. 8 is a block diagram showing a configuration of a polarity pattern controlling portion in FIG. 5.

FIG. 8 is a block diagram showing a configuration of the polarity pattern controlling portion 32 in FIG. 5.

The polarity pattern controlling portion 32 comprises a control circuit 32*a*, and a ROM 32*b* for storing polarity patterns.

The polarity pattern stored in the ROM 32*b* is composed of a combination of "0" and "1". For example, "0" means that the voltage with the positive polarity (+) is applied to the picture element electrodes 14, and "1" means that the voltage with the negative polarity (−) is applied to the picture element electrodes 14. In the first embodiment, the polarity of the data signals $O_1$ to $O_n$ which are supplied to the liquid crystal display panel 40 is inverted frame by frame. Therefore, the polarity patterns which are output to the odd-numbered frame and the polarity patterns which are output to the even-numbered frame must have just opposite combinations of "0" and "1" respectively. The ROM 32*b* stores the polarity patterns of two frames, i.e., the polarity patterns having the bit number which is twice the picture element number of the liquid crystal display panel 40 as a set of data.

The control circuit 32*a* receives the horizontal synchronizing signal H-sync, the vertical synchronizing signal V-sync, and the shift clock SCLK to set addresses of the ROM 32*b*. In other words, the control circuit 32*a* sets an initial value of the address of the ROM 32*b* in synchronism with a leading edge of the odd-numbered vertical synchronizing signal V-sync, and then increments the address in synchronism with the shift clock SCLK. Therefore, the polarity pattern signal POL is output from the ROM 32*b* bit by bit in synchronism with the shift clock SCLK. In this case, the control circuit 32*a* stops its operation once when it increments the address of the ROM 32*b* during one period of the horizontal synchronizing signal H-sync by the same number as the picture element number (n) of the display panel 40 in the horizontal direction, and then starts to increments the address at the leading edge of the horizontal synchronizing signal H-sync again.

(4) Configuration of the Data Driver

Figure 9:
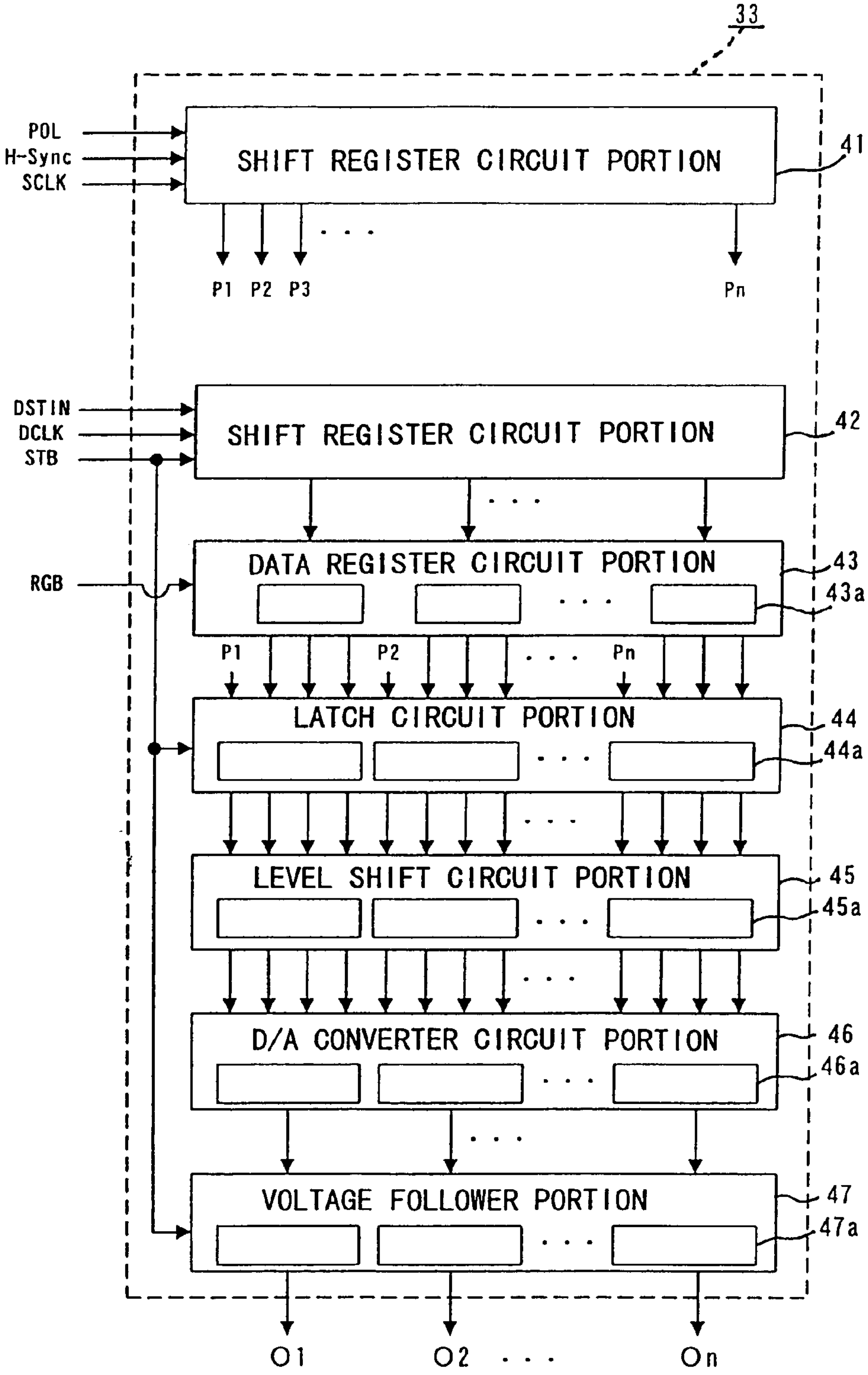
FIG. 9 is a block diagram showing a configuration of a data driver in FIG. 5.

FIG. 9 is a block diagram showing a configuration of the data driver 33 in FIG. 5.

The data driver 33 comprises shift register circuit portions 41, 42, a data register circuit portion 43, a latch circuit portion 44, a level shift circuit portion 45, a D/A converter circuit portion 46, and a voltage follower portion 47.

The shift register circuit portion 41 starts to read the polarity pattern signal POL from the polarity pattern controlling portion 32 in synchronism with the horizontal synchronizing signal H-sync. Then, the shift register circuit portion 41 shifts the polarity pattern signal POL in synchronism with the shift clock SCLK, and then outputs the n-bit polarity pattern signal POL in parallel. The signals which are output from the shift register circuit 41 in parallel are referred to as the polarity signals P1 to Pn hereinafter.

The data register circuit portion 43 consists of n registers 43*a*. The shift register circuit portion 42 receives the data start signal DSTIN, the data clock DCLK, and the strobe signal STB to then set the address of the register 43*a* of the data register circuit portion 43. That is to say, the data register circuit portion 43, when receives the data start signal DSTIN, sets a head address of the register 43*a* and increments the address in synchronism with the data clock DCLK. The data register circuit portion 43 receives the image signal RGB, and then holds the R signal, the G signal, or the B signal in the register 43*a* having the address which is designated by the shift register circuit portion 42.

The latch circuit portion 44 consists of n latch circuits 44*a*. Respective latch circuits 44*a* latch outputs of the data register circuit portion 43 and outputs of the shift register circuit portion 41 in synchronism with the strobe signal STB. At this time, respective latch circuits 44*a* adds the polarity signal P1 to Pn to the most significant bit of the 3-bit R signal, the 3-bit G signal, or the 3-bit B signal to form 4-bit signals.

The level shift circuit portion 45 converts a level of the signal which is output from the latch circuit portion 44. In the first embodiment, the level shift circuit portion 45 converts the signal, which is output from the latch circuit portion 44 and whose peak value is 3.3 V, into a signal whose peak value is 12 V, and then outputs such signal to the D/A converter circuit portion 46.

The D/A converter circuit portion 46 consists of n D/A converters 46*a*. These D/A converters 46*a* receive the 4-bit R signal, the 4-bit G signal, and the 4-bit B signal, to which the polarity signal P1 to Pn are added, and then outputs analogue data signals $O_1$ to $O_n$ with the positive polarity (+) or the negative polarity (−). The voltage follower portion 47 consists of n voltage followers 47*a*. These voltage followers 47*a* supplies the data signals $O_1$ to $O_n$, which are output from the D/A converter circuit portion 46, to the data bus lines 13 of the liquid crystal display panel 40 in synchronism with the strobe signal STB.

Figure 10:
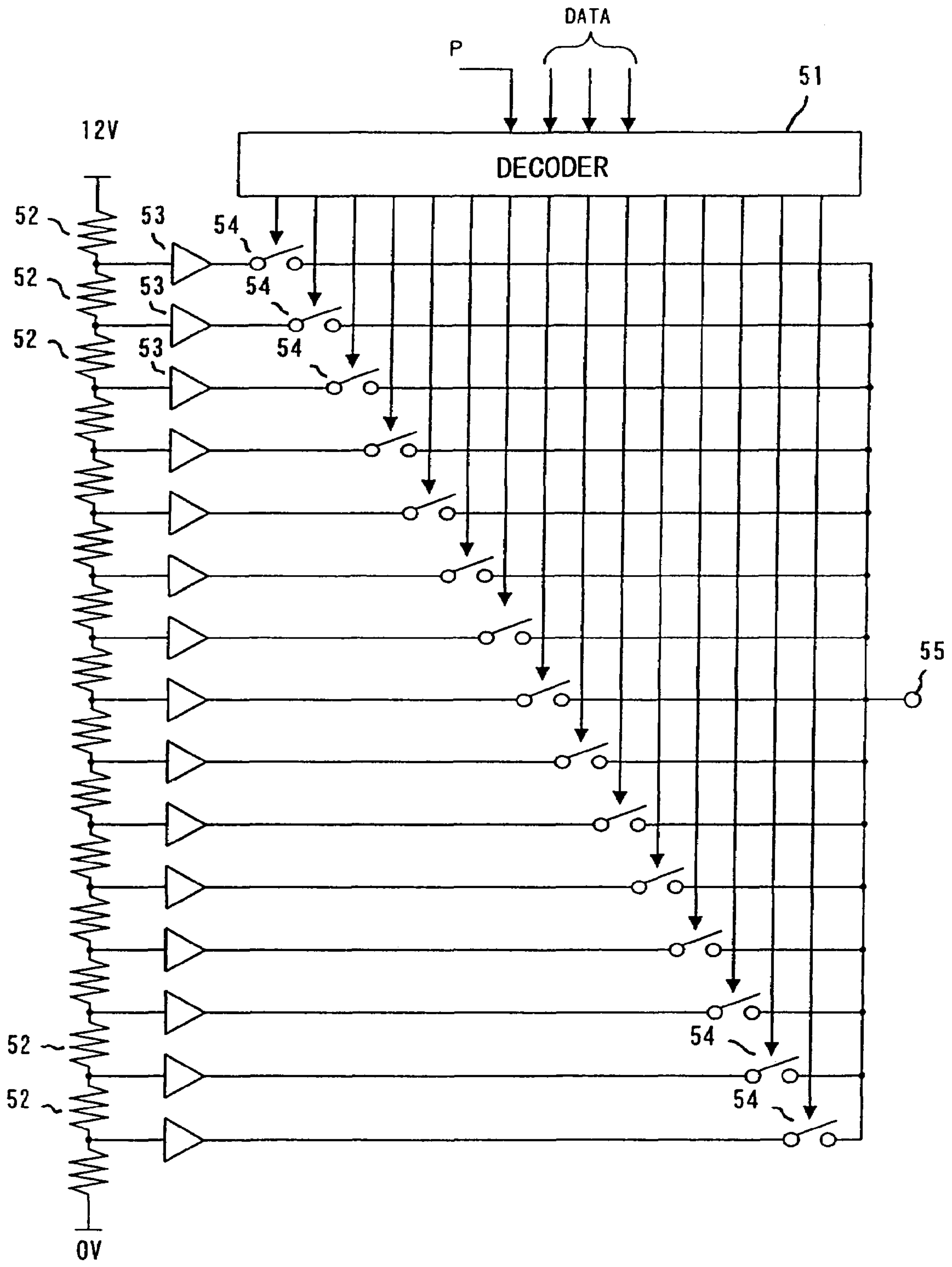
FIG. 10 is a circuit diagram showing a configuration of a D/A converter in FIG. 9.

FIG. 10 is a circuit diagram showing a configuration of the D/A converter 46*a* of the D/A converter circuit portion 46 in FIG. 9.

The D/A converter 46*a* consists of a decoder 51, 17 resistor elements 52, 16 voltage followers 53, and 16 switching elements 54. The resistor elements 52 are connected in series between the high potential power supply line (+12 V) and the low potential power supply line (+0 V). Inputs of the voltage followers 53 are connected to connecting points (nodes) of the resistor elements 52 respectively. Outputs of the voltage followers 53 are connected to one ends of the switching elements 54 respectively. All other ends of the switching elements 54 are connected to an output terminal 55.

The switching element 54 is turned ON when “1” is supplied from the decoder 51, and is turned OFF when “1” is supplied from the decoder 51. The decoder 51 receives the 4-bit signals in which 1-bit polarity signal P is added to the 3-bit R signal, the 3-bit G signal, or the 3-bit B signal, and then outputs a 16-bit signal.

FIG. 11 is a view showing a relationship between inputs and outputs of a decoder 51 of the D/A converter 46*a* in FIG. 10. As shown in FIG. 11, the 16-bit signal being output from the decoder 51 contains any one bit of “1” and remaining 15-bits of “0”. The voltage obtained when an input signal of the decoder 51 is “0000” is a center voltage (V0). The voltage which corresponds to this center voltage (V0) is applied to the opposing electrode 24 as the reference voltage.

The data signal has the positive polarity (+) if the voltage of the signal (data signals $O_1$ to $O_n$) being output from the output terminal 55 is higher than the reference voltage (V1 to V7), while the data signal has the negative polarity (−) if the voltage of the signal being output from the output terminal 55 is lower than the reference voltage (−V1 to −V7). In other words, the data signals $O_1$ to $O_n$ being output from the voltage follower portion 47 have the positive polarity if the most significant bit (polarity signal) being input into the decoder 51 is “0”, while the data signals $O_1$ to $O_n$ have the positive polarity if the most significant bit being input into the decoder 51 is “1”.

Figure 12:
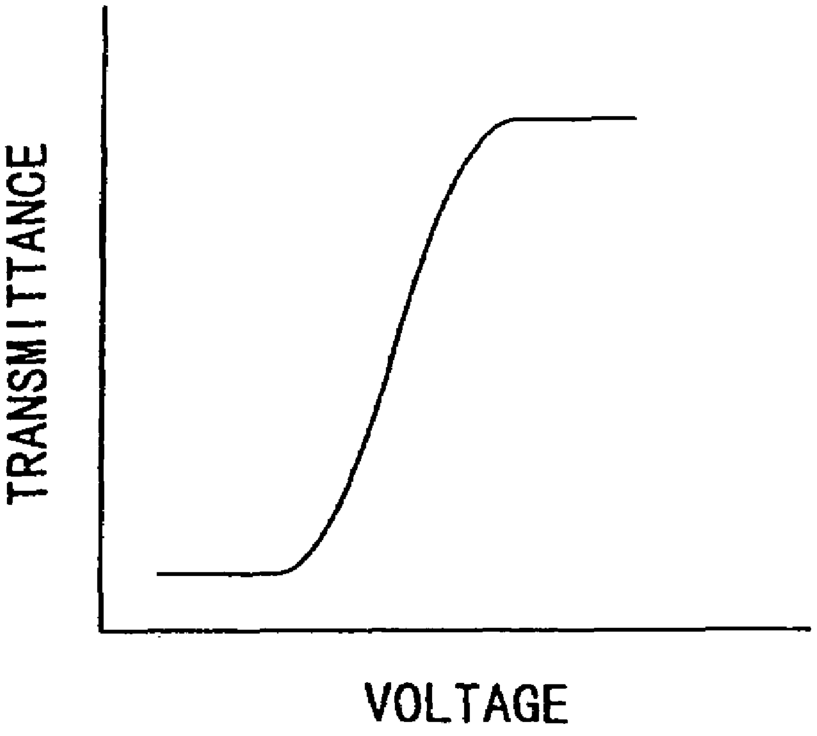
FIG. 12 is a characteristic diagram showing a relationship between a voltage applied to a picture element electrode and a transmittance of a light.

(5) Relationship Between an Applied Voltage and a Transmittance and the Polarity Pattern FIG. 12 is a characteristic diagram showing a relationship between an applied voltage and a transmittance of a light (voltage-transmittance characteristic), wherein an abscissa denotes a voltage applied between a picture element electrodes 14 and an opposing electrode 24 and an ordinate denotes a transmittance of a light. As shown in FIG. 12, in both cases that the applied voltage is low and the applied voltage is high, variation of the transmittance is small even if such applied voltage is slightly changed. However, in case the applied voltage is in the middle range, the transmittance is largely changed even if such applied voltage is slightly changed. As described above, the alternating current voltage is applied to the picture element electrodes. Hence, unless the applied voltage with the positive polarity and the applied voltage with the negative polarity are generated symmetrically in order to display the half tone, the luminance is varied every period of the alternating current to generate the flicker.

Figure 13A:
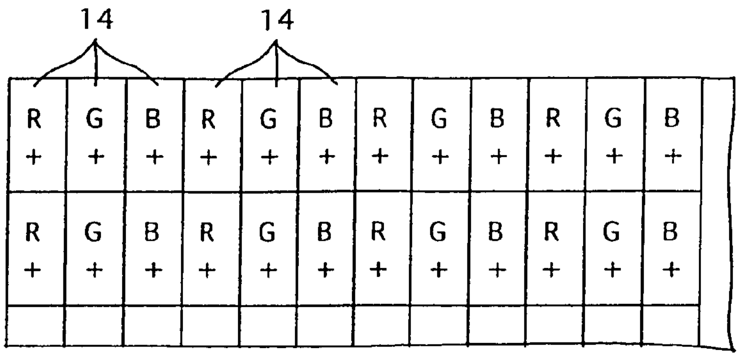
FIGS. 13A to 13D are schematic views each showing an example of a polarity pattern.

In FIG. 13A, the polarity of all picture element electrodes 14 of the liquid crystal display panel 40 are set to the same polarity. Then, the polarity pattern in which the polarity is inverted frame by frame is employed. In this case, the flicker becomes conspicuous when the gray is displayed, for example.

Figure 13B:
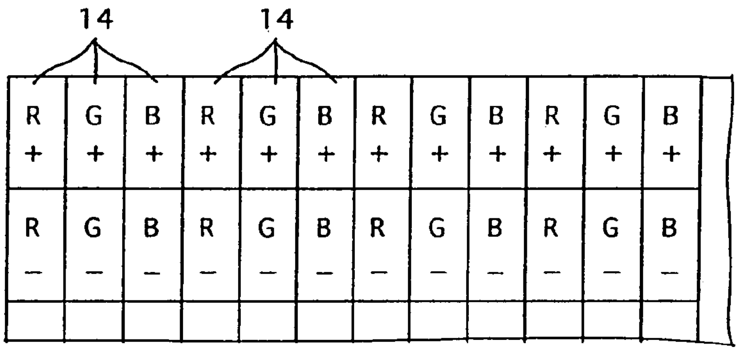

In FIG. 13B, the polarity of the picture element electrodes 14 in the odd-numbered rows are set to the same polarity and the polarity of the picture element electrodes 14 in the even-numbered rows are set to the opposite polarity. Then, the polarity pattern in which the polarity is inverted frame by frame is employed. In this case, the flicker becomes conspicuous when the lateral-striped pattern consisting of the gray and the block is displayed, for example.

Figure 13C:
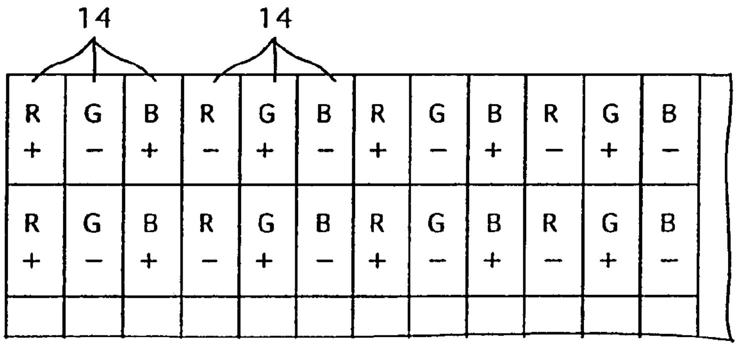

In FIG. 13C, the polarity of the picture element electrodes 14 in the odd-numbered columns are set to the same polarity and the polarity of the picture element electrodes 14 in the even-numbered columns are set to the opposite polarity. Then, the polarity pattern in which the polarity is inverted frame by frame is employed. In this case, the flicker becomes conspicuous when the vertical-striped pattern consisting of the half tone (dark) green and the black is displayed, for example.

Figure 13D:
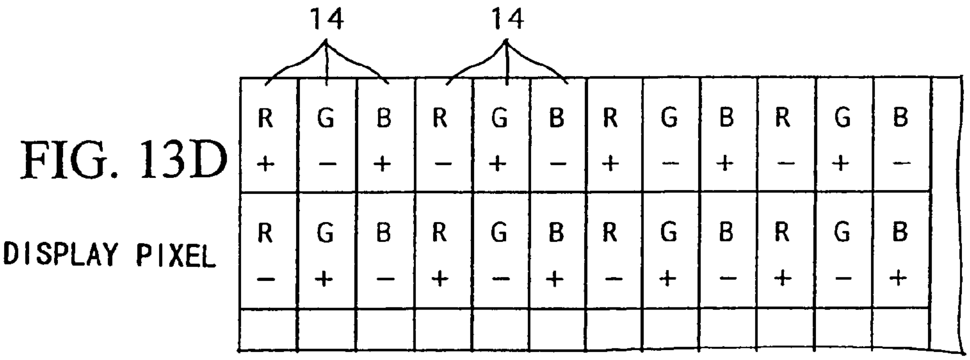

In FIG. 13D, the polarities of the adjacent picture element electrodes 14 are set differently in the horizontal and vertical directions Then, the polarity pattern in which the polarity is inverted frame by frame is employed. In this case, the flicker becomes conspicuous in the mosaic display which consists of the half tone (dark) green dots and the black dots.

In three types of the polarity patterns (FIGS. 13B to 13D) which are normally employed in the prior art, there exists surely the display pattern, in which the flicker becomes conspicuous, even if the polarity pattern is exchanged in all manners. The above-mentioned display pattern, i.e., the lateral-striped pattern, the vertical-striped pattern, or the mosaic display is frequently employed in the display for the normal personal computer. In this manner, it is not preferable that the flicker becomes conspicuous in the frequently employed display pattern.

Figure 14:
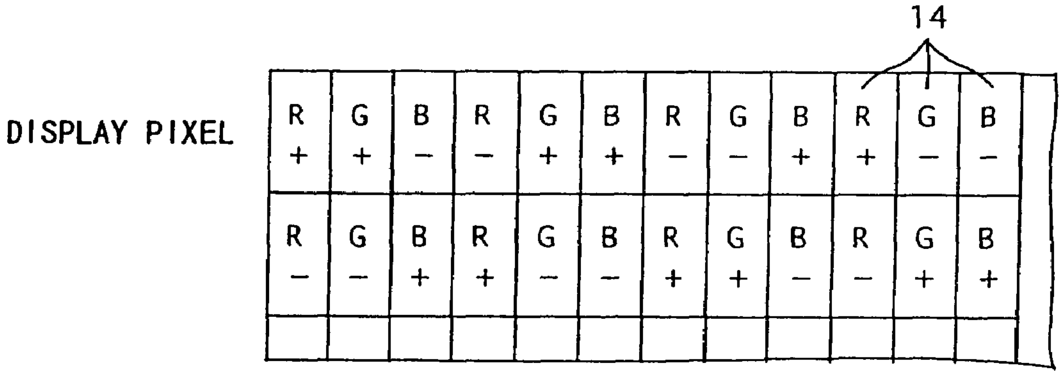
FIG. 14 is a schematic view showing another examples of the polarity pattern.
Figure 14:
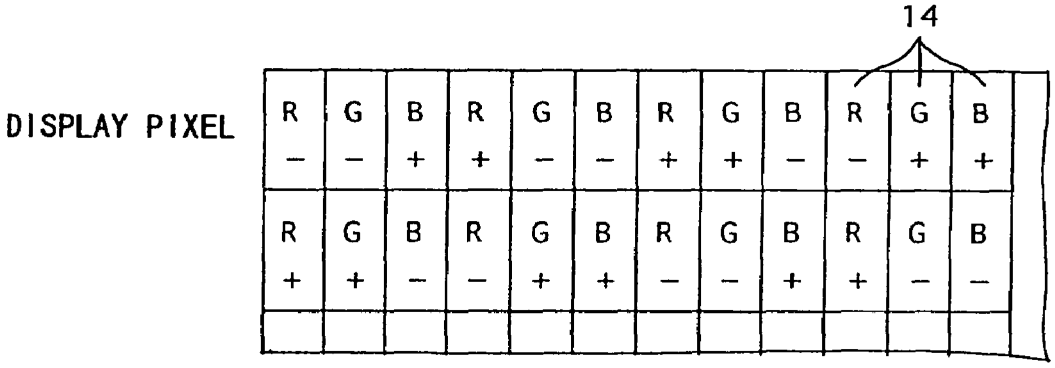
Figures 15A, 15B:
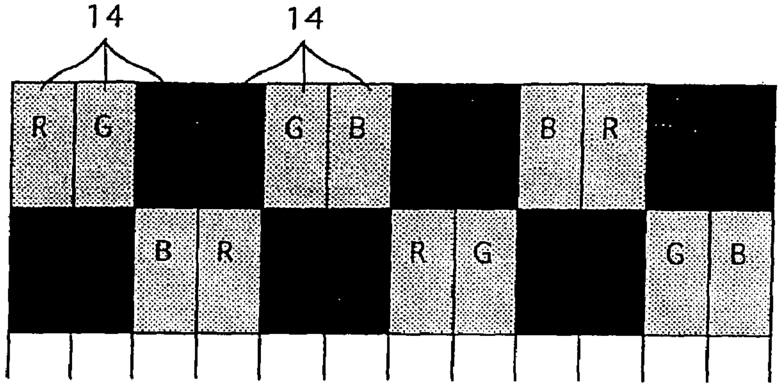
FIG. 15A is a schematic view showing a display pattern in which flickers becomes conspicuous when the polarity pattern in FIG. 14 is used.
FIG. 15B is a view showing colors which are displayed by the display pattern in FIG. 15A.

In the first embodiment, such a polarity pattern that generation of the flicker can be suppressed extremely small in the usually employed display pattern is employed as the polarity pattern. For example, as shown in FIG. 14, the polarity of the picture element electrodes 14 which are aligned in the horizontal direction is inverted every two bits, but the polarity of the picture element electrodes 14 which are aligned in, the vertical direction is inverted every bit. In addition, the polarity of these picture element electrodes 14 is inverted frame by frame. In this case, the flicker appears remarkably when, as shown in FIG. 15A, the picture elements in the intermediate luminance display and the picture elements in the low luminance display are aligned alternatively every two bits. For example, the flicker appears remarkably when, as shown in FIG. 15B, the mosaic pattern consisting of dark yellow, dark sky blue, dark blue, dark red is displayed. Since a probability to display such mosaic pattern is small in the personal computer, the flicker is never conspicuously caused in normal use if the polarity pattern is set, as shown in FIG. 14.

(6) Operation

An operation of the liquid crystal display panel driver circuit according to the first embodiment will be explained hereinbelow.

As shown in FIG. 5, the timing controller 31 receives the horizontal synchronizing signal H-sync the vertical synchronizing signal V-sync, the data clock DCLK, and the image signal RGB from the personal computer 37, and then generates the shift clock SCLK, the data start signal DSTIN, the strobe signal STB, the gate start signal GSTR, and the gate clock GCLK.

The control circuit 32*a* of the polarity pattern controlling portion 32 shown in FIG. 7 starts to read the polarity pattern from the ROM 32*b* in synchronism with the vertical synchronizing signal V-sync and the horizontal synchronizing signal H-sync. In other words, the control circuit 32*a* designates the head address of the ROM 32*b* at the first leading edge of the horizontal synchronizing signal H-sync after the vertical synchronizing signal V-sync has been changed from "0" to "1", then increments the address in synchronism with the shift clock SCLK. Accordingly, the polarity pattern signal POL is output from the ROM 32*b* bit by bit in synchronism with the shift clock SCLK. When the polarity pattern signal POL is output from the ROM 32*b* by the number corresponding to the horizontal picture element number (n), the control circuit 32*a* stops once reading of the polarity pattern signal POL until the rising-up of the succeeding horizontal synchronizing signal H-sync.

In the first embodiment, the polarity of the picture element electrodes is inverted frame by frame. Thus, the ROM 32*b* stores the polarity patterns by the two-frame bit number, and "1" and "0" combinations of the polarity patterns in the odd-numbered frame are exactly opposite to those of the polarity patterns in the even-numbered frame. Then, the control circuit 32*a* returns the read address of the ROM 32*b* to the head address every two vertical synchronization periods. Also, the polarity pattern signal POL for one frame may be stored in the ROM 32*b* and then the output of the ROM 32*b* may be inverted frame by frame. In this case, a switch for switching the output destination of the ROM 32*b* every vertical synchronization period and an inverter for inverting the output signal of the ROM 32*b* are needed.

The shift register circuit portion 41 of the data driver 33 shown in FIG. 9 starts to read the polarity pattern signal POL in synchronism with the horizontal synchronizing signal H-sync, and then shifts the polarity pattern signal POL bit by bit in synchronism with the shift clock SCLK. Then, when the shift register circuit portion 41 shifts the polarity pattern signal POL by the horizontal picture element number (n), it stops its shift operation and then outputs the polarity signals P1 to Pn.

Meanwhile, the shift register circuit portion 42 receives the data start signal DSTIN, the data clock DCLK, and the strobe signal STB from the timing controller 31, and then starts the address setting of the data register circuit portion 43. That is to say, when the data start signal DSTIN is changed from "0" to "1", the shift register circuit portion 42 sets the initial address of the data register circuit portion 43, and then increments the address in synchronism with the data clock DCLK. Accordingly, the R signal, the G signal, or the B signal are held in sequence into the registers 43*a* of the data register circuit portion 43. More particularly, the first R signal (D1), the first G signal (D2), the first B signal (D3) are held into the first to third registers 43*a* of the data register circuit portion 43 in response to the first data clock DCLK. Then, the second R signal (D4), the second G signal (D5), the second B signal (D6) are held into the fourth to sixth registers 43*a* of the data register circuit portion 43 in response to the second data clock DCLK. In this manner, the R signal, the G signal, and the B signal for one horizontal synchronization period are held in the data register circuit portion 43.

Respective latch circuits 44*a* of the latch circuit portion 44 generate the 4-bit data by adding the 1-bit polarity signal P1 to Pn being output from the shift register circuit portion 41 to the 3-bit R, G, B signals being output from the data register circuit portion 43, and then output them to the level shift circuit portion 45 in synchronism with the strobe signal STB. The level shift circuit portion 45 converts a level of the signal which is output from the latch circuit portion 44. In the first embodiment, the level shift circuit portion 45 converts the voltage level of these 4-bit signals to output them.

The D/A converter circuit portion 46 D/A-converts i the 4-bit signals being output from the level shift circuit portion 45, and then outputs the analogue data signals $O_1$ to $O_n$. In this case, according to FIG. 11, the D/A converter circuit portion 46 outputs the data signals $O_1$ to $O_n$ with the positive polarity (+) when the most significant bit of the decoder input is "0", and outputs the data signals $O_1$ to $O_n$ with the negative polarity (−) when the most significant bit of the decoder input is "1". The voltage follower portion 47 outputs the data signals $O_1$ to $O_n$ to the data bus lines 13 of the liquid crystal display panel 40 at timings which are in synchronism with the strobe signal STB.

Meanwhile, when receives the gate start signal GSTR from the timing controller 31, the gate driver 34 supplies the scanning signal SCAN sequentially to the uppermost gate bus line 12 to the lowermost gate bus line 12 one by one in synchronism with the gate clock GCLK. As a result, the TFT 15 connected to the gate bus line 12 to which the scanning signal SCAN is supplied is turned ON, and therefore the data signals $O_1$ to $O_n$ being output from the data driver 33 are supplied to the picture element electrodes 14. Thus, the electric field is generated between the picture element electrodes 14 and the opposing electrode 24. Since the alignment of the liquid crystal molecules is changed by the electric field, the optical transmittance of the picture elements can be changed in response to the applied voltage. In this case, the polarity of the signal applied to the picture element electrodes 14 is decided according to the polarity pattern stored in the ROM 32*b*, and the polarity is inverted every frame.

(7) Advantage of the First Embodiment

In the first embodiment, since the polarity of the signal being supplied to the picture element electrodes is decided according to the polarity pattern stored in the ROM 32*b*, the polarity patterns in which the flicker is hard to occur can be generated by the simple circuit configuration without the complicated process of the image signals, etc. For example, if the present invention is applied to the liquid crystal display panel driver circuit for the computer, the flicker can be reduced extremely in normal use by setting the polarity patterns, as shown in FIG. 14. Also, in the first embodiment, the driver circuit (the data driver 33 and the gate driver 34) can be applied to the so-called one-sided drive type liquid crystal display device which is arranged only on one side of the liquid crystal display panel 40.

Second Embodiment

Figure 1:
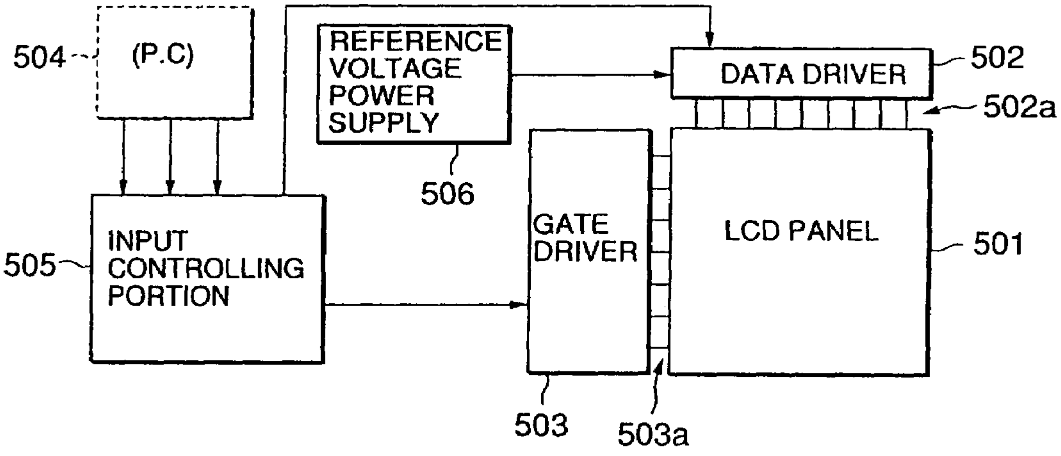
FIG. 1 (Prior Art)
FIG. 1 is a block diagram showing a schematic configuration of a liquid crystal display device in the prior art.
Figure 2:
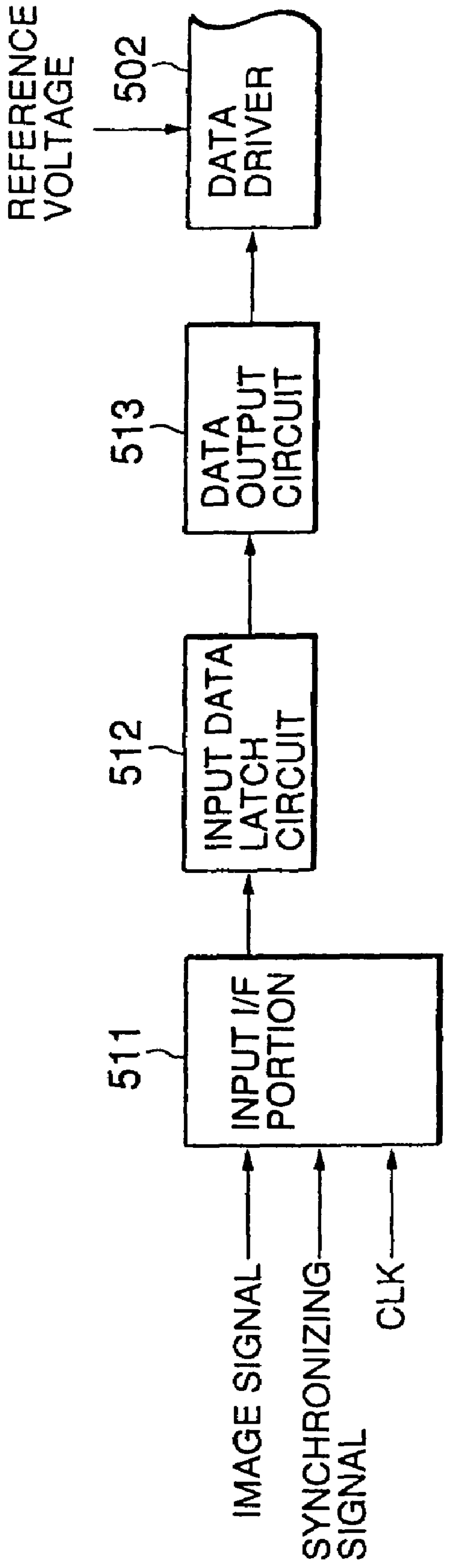
FIG. 2 (Prior Art)
FIG. 2 is a block diagram showing a configuration of an input controlling portion of the liquid crystal display device in the prior art.
Figure 16:
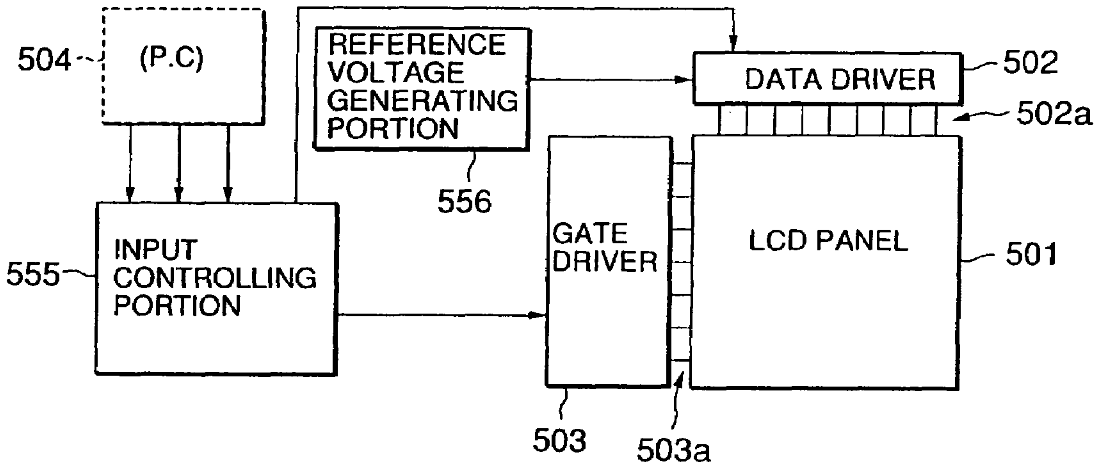
FIG. 16 is a block diagram showing a schematic configuration of a liquid crystal display device according to a second embodiment of the present invention.

FIG. 16 is a block diagram showing a basic configuration of a liquid crystal display device according to a second embodiment of the present invention. In FIG. 16, like references are affixed to the same constituent elements as those in FIG. 1.

As shown in FIG. 16, the liquid crystal display device of the present invention includes a liquid crystal display panel 501, a data driver 502, a gate driver 503, an input controlling portion 555, and a reference voltage generating portion 556.

A plurality of picture elements (see FIG. 4) which are arranged in a matrix, a plurality of data bus lines 502*a* and a plurality of gate bus lines 503*a*, and a plurality of TFTs (see FIG. 4) which are connected between the data bus lines 502*a* and the gate bus lines 503*a* and the picture elements respectively are provided to the liquid crystal display panel 501. The data driver 502 outputs the data signals to the data bus lines 502*a*. The gate driver 503 outputs the predetermined scanning signal to the gate bus lines 503*a* in sequence at timings which are in synchronism with the horizontal synchronizing signal. The TFTs are turned ON when the predetermined scanning signal is supplied to the gate bus lines 503*a* to transmit the data signals, which are supplied to the data bus lines 502*a*, to picture element electrodes.

The input controlling portion 555 receives signals such as image signals, synchronizing signals, operating clocks, etc. from the personal computer 504, and then outputs the predetermined signals to the data driver 502 and the gate driver 503. The input controlling portion 555 always monitors the correlation between the change period of the display pattern and the polarity inverting period of the reference voltage. Then, if the synchronization between them is detected and also the polarity inverting period is decided as the particular display patterns which are previously set, the input controlling portion 555 outputs the polarity inverting period, which is different from the polarity inverting period of the original period, to a reference voltage generating portion 556, and then supplies the reference voltage to the data driver 502 at any inverting period.

Figure 17:
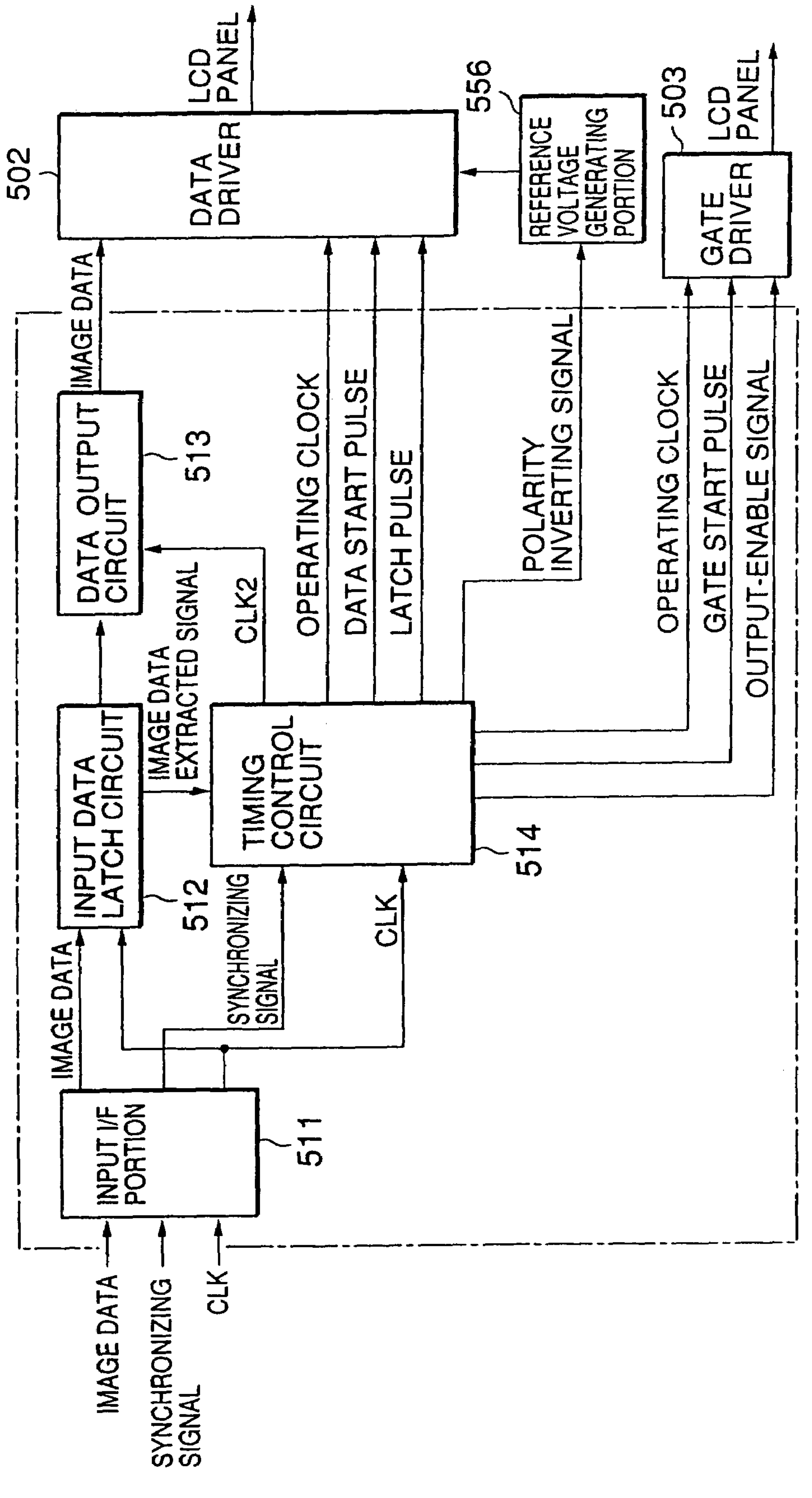
FIG. 17 is a block diagram showing a configuration of an input controlling portion of the liquid crystal display device in FIG. 16.

FIG. 17 is a block diagram showing a configuration of the input controlling portion 555 of the liquid crystal display device in FIG. 16. The input controlling portion 555 is composed of an input interface (I/F) portion 511, an input data latch circuit 512, a data output circuit 513, and a timing control circuit 514. Based on the synchronizing signal and the operation clock CLK which are input via the input I/F portion 511 and the image data extracted signal which is extracted by the input data latch circuit 512, the timing control circuit 514 outputs the operation CLK2 for the data output circuit 513; the operation clock, the data start pulse and the latch pulse for the data driver 502; the operation clock, the gate start pulse and an output-enable signal for the gate driver 503; and the polarity inverting signal which controls the polarity inverting period of the reference voltage supplied from the reference voltage generating portion 556. The data output circuit 513 sets output timings of the image signals, which are output to the data driver 502 based on the operation clock CLK2.

Figure 18:
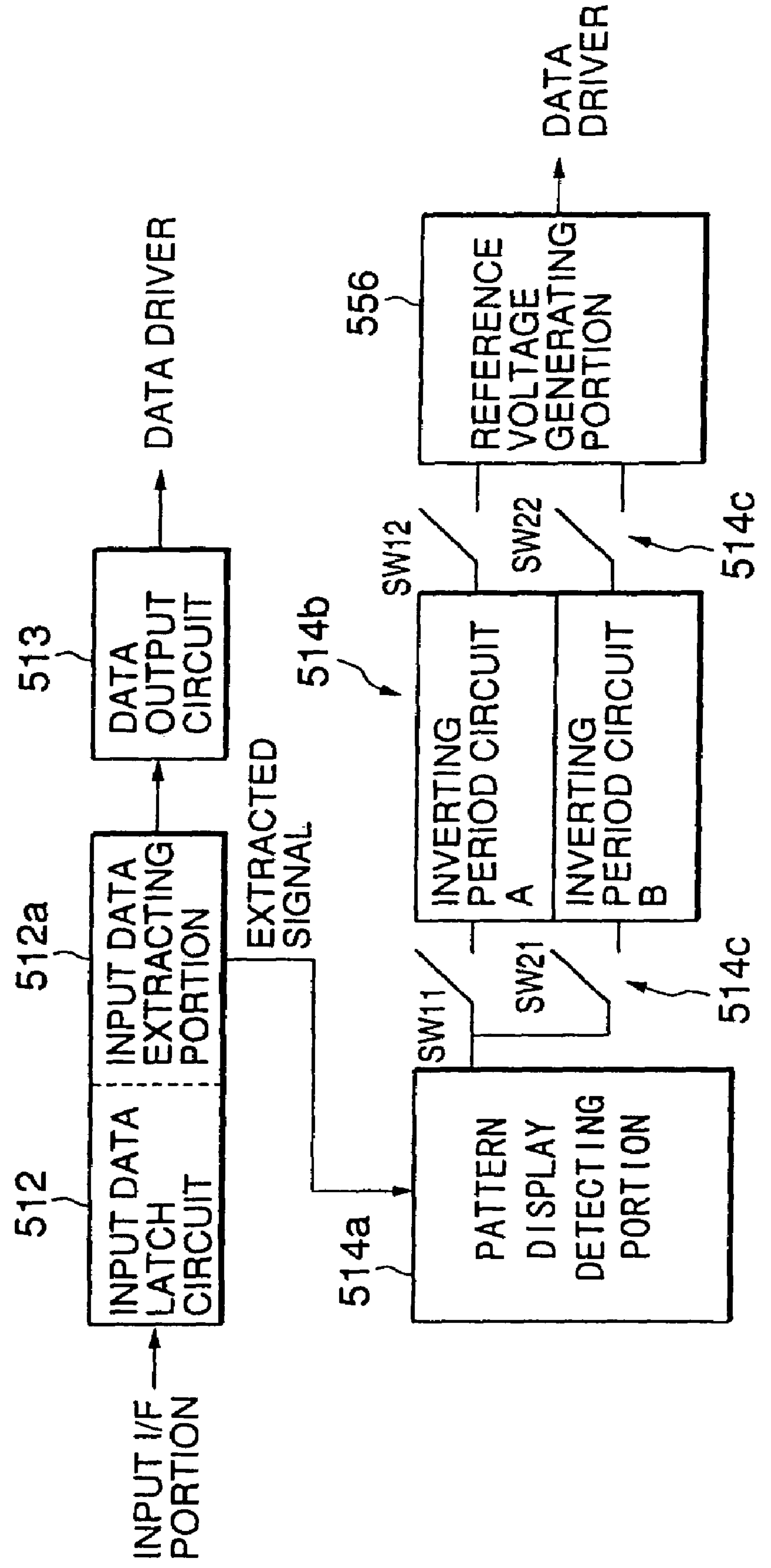
FIG. 18 is a block diagram showing a configuration of a timing control circuit of the liquid crystal display device in FIG. 16.

FIG. 18 is a block diagram showing a configuration of the timing control circuit 514 of the liquid crystal display device in FIG. 16.

As shown in FIG. 18, the timing control circuit 514 comprises an input data extracting portion 512*a* which constitutes an image data extracting means, a display pattern detecting portion 514*a* which constitutes a pattern detecting means, an inverting period circuit group 514*b* and a switching group 514*c* which constitute an inverting period controlling means.

The input data extracting portion 512*a* is provided in the input data latch circuit 512. The input data extracting portion 512*a* extracts sequentially the image signals, which are supplied to two adjacent picture elements, from the continuous image signals to output them as the extracted signal.

The display pattern detecting portion 514*a* counts mutual change between two extracted image signals (extracted signals), e.g., an amount of change from white to black and the number of times of the change, and then detects the particular display pattern. Where the wording "particular display pattern" means the pattern which increases the flicker in display or the increase in the power consumption during the polarity inverting period of the reference voltage in the initial state. Such particular display patterns are patterns which are a checker pattern, a pattern in which horizontal lines are displayed on the green background, etc.

In case the particular display pattern is detected based on the detection result of the display pattern detecting portion 514*a*, the inverting period circuit group 514*b* and the switching group 514*c* can switch the polarity inverting signal (polarity inverting period) which is to be output to the reference voltage generating portion 556. For example, as shown in FIG. 18, the timing controller circuit 514 comprises an inverting period circuit A and an inverting period circuit B, which have a different polarity inverting period respectively. Normally, the timing controller circuit 514 executes the display operation based on the polarity inverting period of the inverting period circuit A, controls to switch the switching group 514*c* to select the other inverting period circuit B when the particular display pattern is detected, and executes the display operation based on different polarity inverting period.

Then, the reference voltage generating potion 556 supplies the polarity inverting signal to the data driver 502, based on the inverted period which is provided by the inverting period circuit B.

As the configuration of the inverting period controlling means, there is shown such a configuration that controls to switch two pairs of switches SW11, SW21 and SW12, SW22 to select one of a plurality of inverting period circuits A, B based on the detection result of the display pattern detecting portion 514*a*. However, the inverting period controlling means is not limited to the above if it can vary freely the polarity inverting period for the reference voltage generating portion 556 and then output it.

(1) Operation

Figure 19:
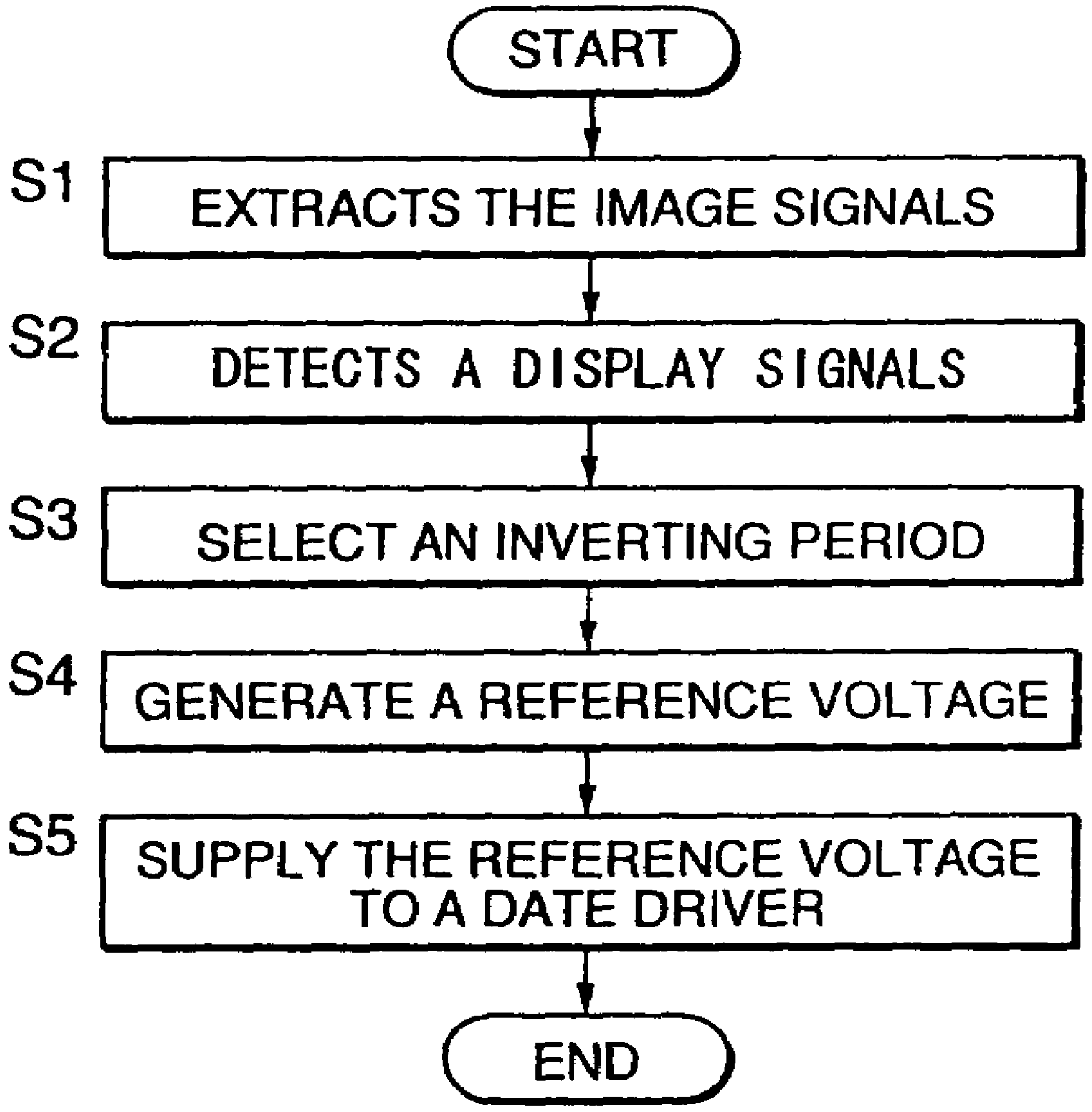
FIG. 19 is a flowchart showing an inverting period controlling operation.

Next, an inverting period controlling operation of the above timing control circuit will be explained with reference to a flowchart shown in FIG. 19 hereinafter.

In the timing control circuit shown in FIG. 18, assume in the initial state that switches SW11, SW12 of the switching group 514*c* which select one of the inverting period circuit group 514*b* are set in their ON states and also the polarity inverting period provided by the inverting period circuit A is output to the reference voltage generating portion 556.

First, the input data extracting portion 512*a* always monitors the image signals which are input into the input data latch circuit 512 via the input I/F portion 511 and held there, then extracts the image signals which are to be supplied to two adjacent picture elements every R, G, B data (step S1).

Then, the display pattern detecting portion 514*a* counts an amount of change in the image data extracted by the input data extracting portion 512*a* and the number of times of change, then detects display patterns which causes the conspicuous flicker of the display screen or the increase in the power consumption during the polarity inverting period of the inverting period circuit A which is set as the initial state, and then detects the particular display pattern (step S2).

Then, if the particular display pattern is detected, the switches SW 11, SW 12 are turned OFF and also switches SW21, SW 22 are turned ON so as to select other inverting period circuit B which has the different inverting period from that of the currently selected inverting period circuit A (step S3).

Then, the polarity inverting period being provided by the newly selected inverting period circuit B is output as the polarity inverting signal to the reference voltage generating portion 556, and then the reference voltage is generated to have the polarity inverting period different from that in the initial state (step S4). Then, the reference voltage is supplied to the data driver 502 (step S5).

In contrast, if the image data being extracted by the input data extracting portion 512*a* are not decided as the particular display pattern being set in the display pattern detecting portion 514*a*, or if the display pattern which causes the conspicuous flicker on the display screen or the increase in the power consumption relative to the polarity inverting period which is provided by the switched inverting period circuit B is detected, the switch group 514*c* is controlled to be switched to the inverting period circuit A which has been selected in the initial state.

According to such inverting period switching method, when the image data having the display pattern, in which only the picture elements with either the positive polarity or the negative polarity out of the picture elements of the liquid crystal display panel are brought into their ON state, are input, the polarity inverting period of the reference voltage which is applied to the picture elements can be varied. Therefore, the alignment of the positive polarity picture elements and the negative polarity picture elements can be varied. Here, preferably, it should be provided by the varied alignment of the picture elements that half the number of overall picture elements are in their ON states even in the same display pattern.

Figure 20A:
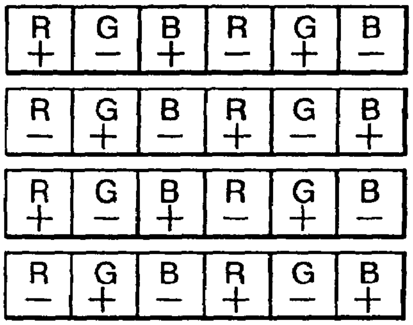
FIGS. 20A to 20D are views each showing a relationship between an operation state of the picture elements and a polarity inverting period.

More particularly, as shown in FIG. 20, in the normal operation state, it is assumed that the inverting period circuit A is selected as the initial state and that, as shown in FIG. 20A, the data voltage with the positive polarity "+" and the negative polarity "−" are applied alternatively to the alignment of the picture elements [RGBRGB . . . ] like [+−+−+−. . . ].

Figure 20B:
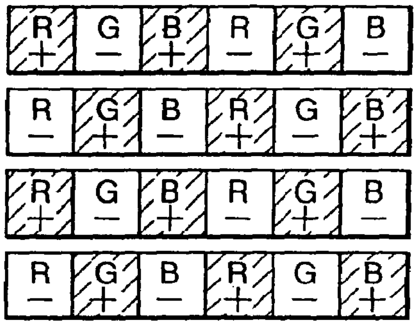

Under such condition, as shown in FIG. 20B, in the case of the display pattern in which only the picture elements with one polarity, e.g., the picture elements with the positive polarity "+" are turned ON, the flicker is caused because the polarity inverting period and change in the display pattern are synchronized with each other.

As described above, the patterns being displayed on the display screen are always monitored by the input data extracting portion 512*a* and the display pattern detecting portion 514*a*. Then, if the display pattern to cause the conspicuous flicker is detected, the switch group 514*c* is controlled to switch the inverting period circuit group 514*b* based on the detection result supplied from the display pattern detecting portion 514*a*.

Figure 20C:
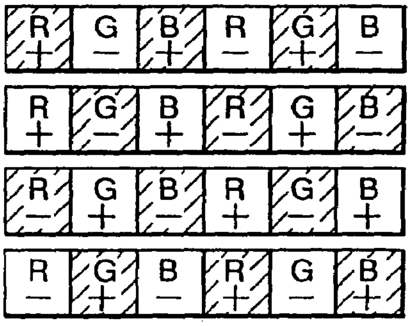
Figure 20D:
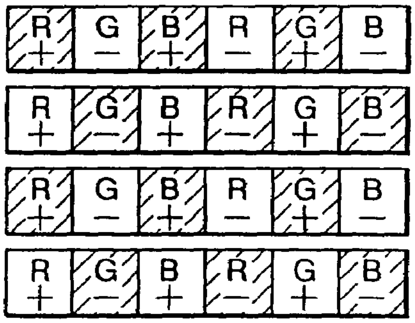

For this reason, the other inverting period circuit B can be selected and then, for example, the period at which the polarity inversion is performed in unit of the horizontal line at random, as shown in FIG. 20C, or the period at which the polarity inversion is performed alternatively every one horizontal line, as shown in FIG. 20D, can be output to the reference voltage generating portion 556 as the polarity inverting signal.

Accordingly, if a series of image data having the display patterns which cause the flicker on the display screen and the increase in the power consumption are input, the polarity inverting period of the reference voltage being applied to the picture elements can be switched immediately. Therefore, improvement of the display quality and reduction in the power consumption can be achieved.

(2) Configuration of the Input Data Extracting Portion 512*a*

Figure 21:
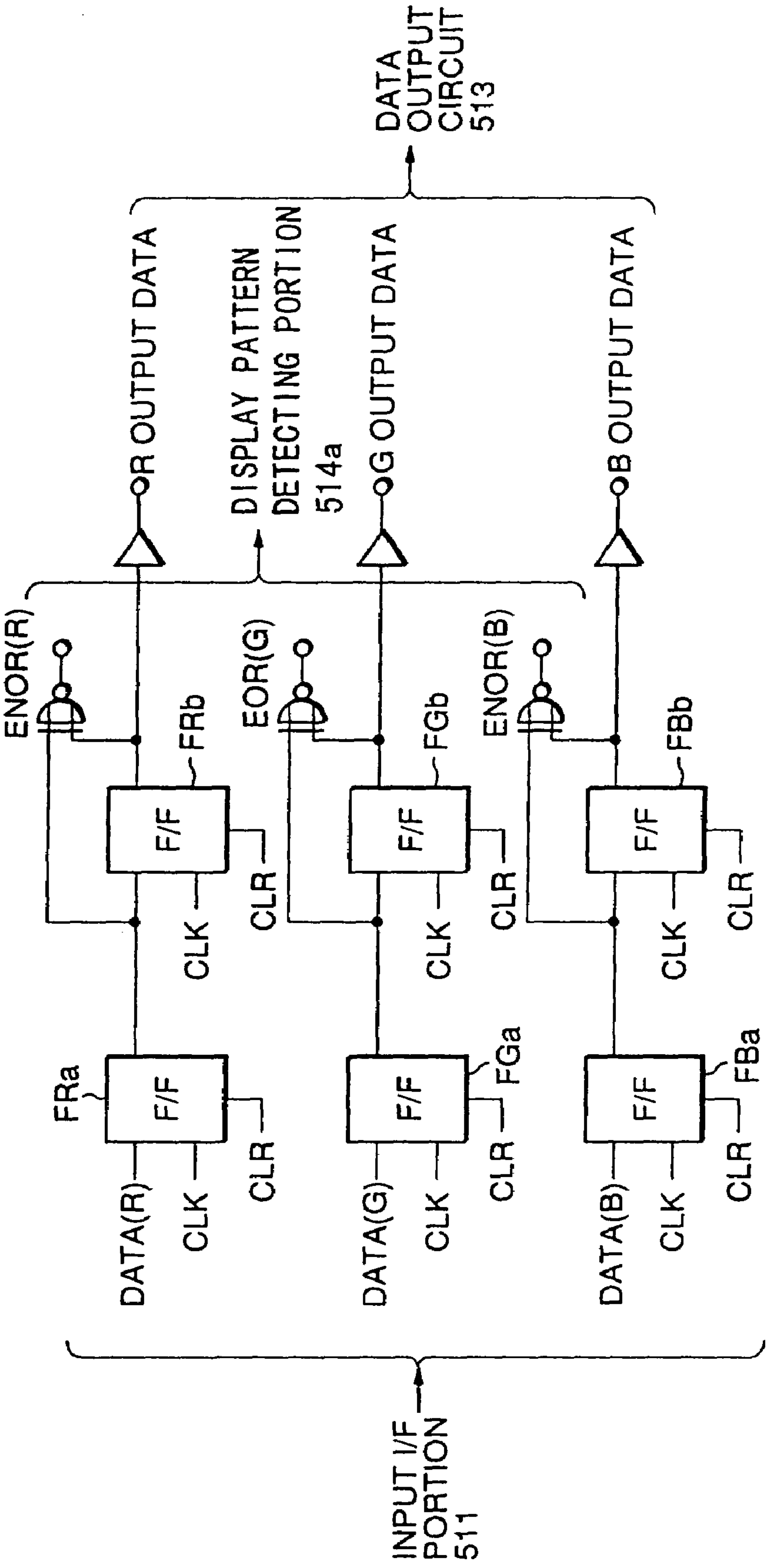
FIG. 21 is a circuit diagram showing an embodiment of an input data extracting portion in FIG. 18 which is applied to the second embodiment of the present invention.
Figure 22:
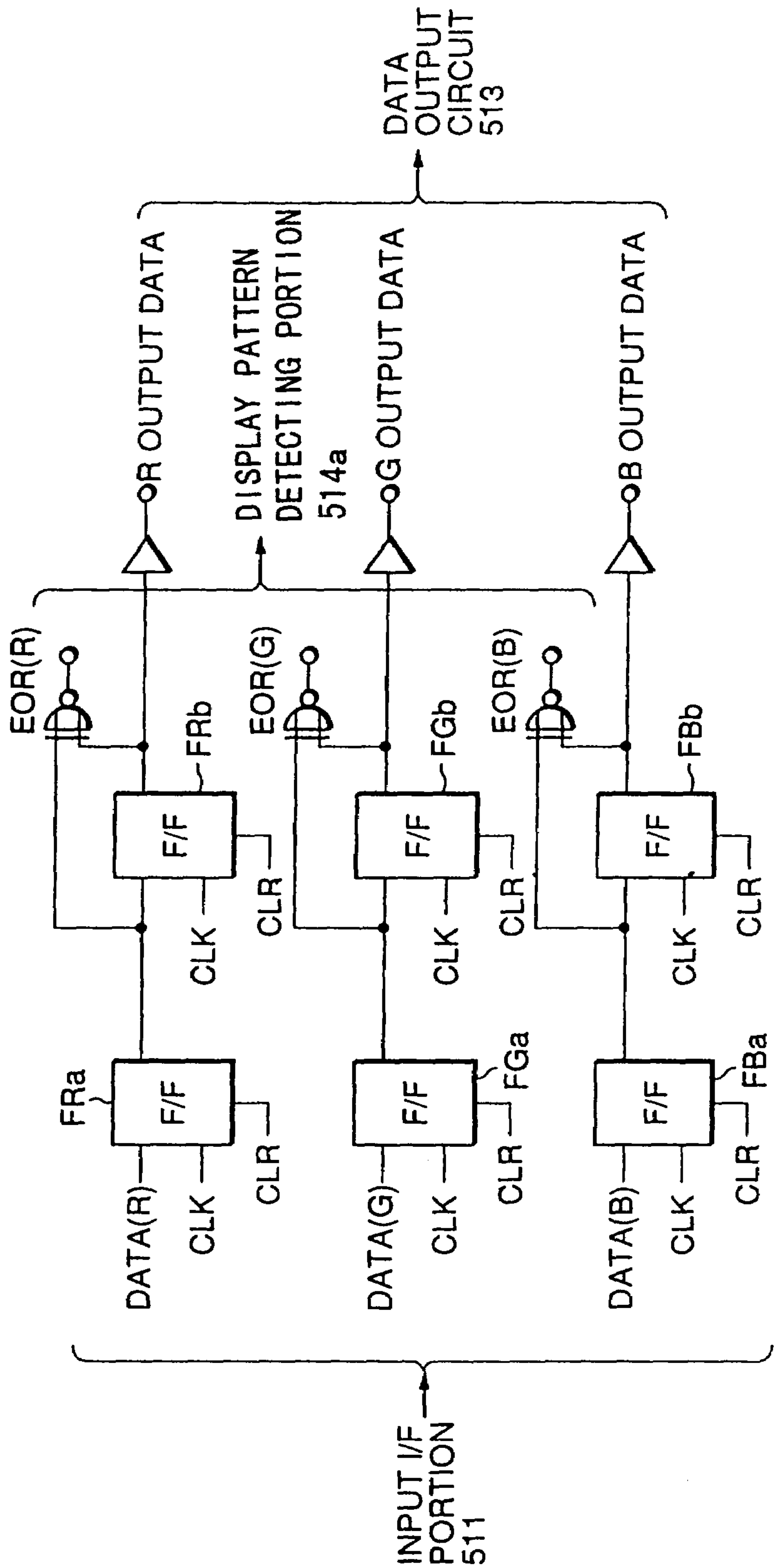
FIG. 22 is a circuit diagram showing another embodiment of the input data extracting portion in FIG. 18 which is applied to the second embodiment of the present invention.

FIG. 21 is a circuit diagram showing an example of the input data extracting portion 512*a* in FIG. 18. FIG. 22 is a circuit diagram showing another example of the input data extracting portion 512*a* in FIG. 18.

As shown in FIGS. 21 and 22, in the input data latch circuit 512 in which flip-flops (F/Fs) FRa, FGa, FBa and FRb, FGb, FBb are provided at plural stages every R, G, B data, the input data extracting portion 512*a* has logic gates which receive input patterns and output patterns of the flip-flops FRb, FGb, FBb in the succeeding stage and output predetermined logic outputs to the display pattern detecting portion 514*a* as the extracted data.

Where, as shown in FIG. 21, in case the display patterns such as the checker pattern, etc. which generates the conspicuous display flicker, for example, is extracted, exclusive NOR (ENOR) gates are provided for the R data and the B data as the logic gates and exclusive OR (EOR) gates are provided for the G data as the logic gates.

In this manner, with the use of the predetermined logic outputs which receive the input data and the output data of the flip-flops FRb, FGb, FBb of the input data latch circuit

512, the mutual change states between the continuously neighboring image data can always be extracted every R, G, B data.

Also, as shown in FIG. 22, if the display patterns which increase the power consumption of the liquid crystal display device, e.g., in which black and white patterns in the checker pattern are extracted, the situation that all R, G, B image data are varied in the inverting period so as to synchronize with each other can always be extracted by providing the exclusive OR (EOR) gates, which receive the input data and the output data of the flip-flops FRb, FGb, FBb, for all R, G, B data.

Next, an example of the display pattern detecting portion 514*a* which is applied to the liquid crystal display device of the present invention will be explained with reference to FIG. 23 hereinbelow.

Figure 23:
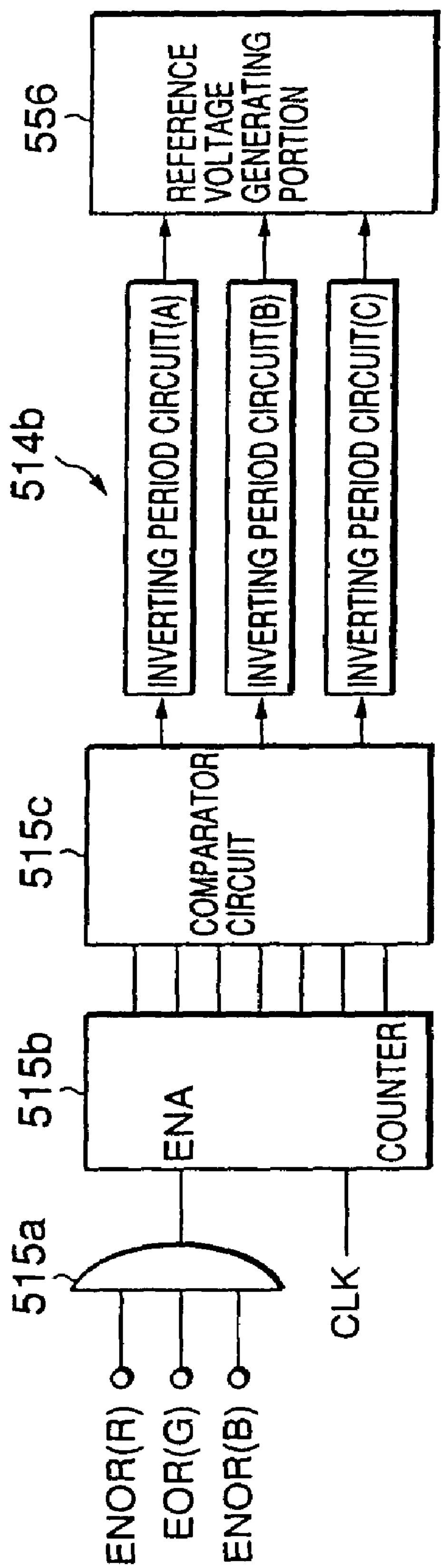
FIG. 23 is a block diagram showing an embodiment of a display pattern detecting portion in FIG. 18 which is applied to the second embodiment of the present invention.

An shown in FIG. 23, the display pattern detecting portion 514*a* comprises a logical product (AND) gate 515*a* for receiving R, G, B logical outputs being extracted by the input data extracting portion 512*a*, a counter 515*b* for receiving an logical output of the AND gate 515*a* and then outputting counted values bit by bit, a comparator circuit 515*c* for comparing a bit output from the counter 515*b* with a previously specified value (reference value), and a plurality of inverting period circuits 514*b* which are switched by switches (not shown) based on the compared result and which have a different polarity inverting period respectively.

In this case, any inverting period circuits may be employed if they can output the predetermined polarity inverting signal to the reference voltage generating portion 556 located at the succeeding stage and also, for example, the inverting period circuit A can be selected in the initial state and then such inverting period circuit A is switched into another inverting period circuit B or C if the particular display pattern which causes the flicker on the display screen is detected. As shown in. FIG. 18, at least two inverting period circuits may be provided as the inverting period circuit group 514*b*.

Also, as shown in FIG. 23, in a configuration which comprises three inverting period circuits or more, since the different polarity inverted states shown in FIGS. 20B and 20C are set previously into the inverting period circuits A, B, C respectively, normally the inverting period circuit A is selected and then one inverting period circuit is selected at random from other inverting period circuits B, C if the particular display patterns are detected. As a result, the synchronization between the polarity inverting period of the reference voltage applied to the picture elements and change in the display pattern can be avoided.

In this way, the particular display patterns can be monitored/discriminated by extracting the continuously adjacent image data with the use of the input data extracting portion 512*a* and the display pattern detecting portion 514*a*, then counting an amount of change in the image data and the number of times of the change, and then comparing them with predetermined specified values. Thus, the synchronization between the period of the display pattern which is displayed on the liquid crystal display panel 501 and the polarity inverting period of the reference voltage which is applied to the picture elements can be avoided, and also the flicker on the screen and the increase in the power consumption can be suppressed.

In addition, according to such drive controlling method, even when the inverting system is employed in unit of one dot, two dots, horizontal line, or vertical line, for example, as the polarity inverting system of the reference voltage applied to the picture elements, the period of the polarity inversion can be set appropriately so as to avoid the synchronization state between the period of the polarity inversion and the period of the display pattern.

Third Embodiment

A liquid crystal display panel driver circuit according to a third embodiment of the present invention will be explained hereunder. A different respect between the third embodiment and the first embodiment resides in that a configuration of the polarity pattern controlling portion is different from each other. Since remaining configurations are similar to those in the first embodiment, redundant explanations of the overlapping constituting portions will be omitted.

Figure 24:
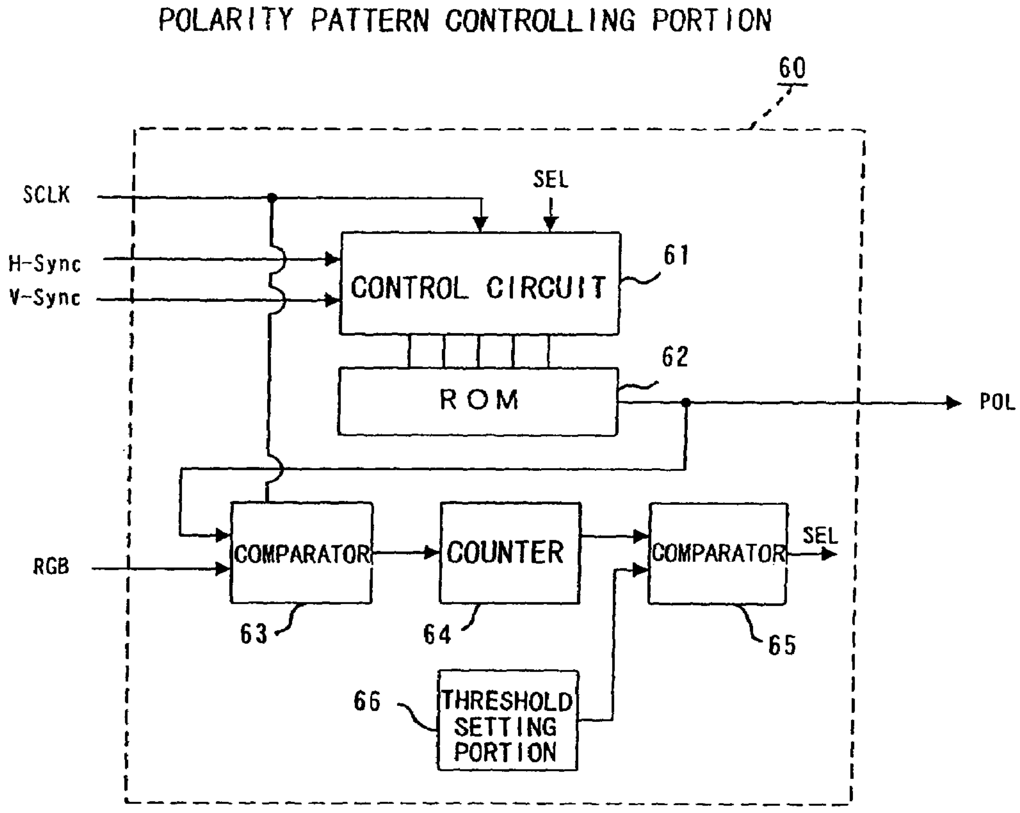
FIG. 24 is a block diagram showing a configuration of a polarity pattern controlling portion of a liquid crystal display panel driver circuit according to a third embodiment of the present invention.

FIG. 24 is a block diagram showing a configuration of a polarity pattern controlling portion 60 of a liquid crystal display panel driver circuit according to the third embodiment. The polarity pattern controlling portion 60 includes a control circuit 61, a ROM 62, comparators 63, 65, a counter circuit 64, and a threshold setting portion 66.

Two sets of polarity patterns are stored in the ROM 62. Respective polarity patterns have two-frame bit numbers, and are set such that the polarity is inverted frame by frame. The control circuit 61 selects one set out of two sets of polarity patterns, then sets the initial address of the ROM 62, and then increments the address of the ROM 62 in synchronism with the shift clock SCLK. Therefore, a set of the polarity patterns are read from the ROM 62 bit by bit, and then output as the polarity pattern signal POL.

The comparator 63 compares the polarity pattern signal POL being read out from the ROM 62 with the image signal RGB being output from the timing controller 31. Then, for example, the comparator 63 outputs "1" in synchronism with the shift clock SCLK if the most significant bit of the image signal RGB coincides with the polarity pattern signal POL, whereas the comparator 63 outputs "0" in synchronism with the shift clock SCLK if the most significant bit of the image signal RGB does not coincide with the polarity pattern signal POL. The counter circuit 64 monitors the output of the comparator 63 to count the number of times of the output "1" of the comparator 63 for a unit time or every predetermined data number (unit data number). The comparator 65 outputs a selection signal SEL of "1" if a counted value being output from the counter circuit 64 exceeds a value set by the threshold setting portion 66, while the comparator 65 outputs the selection signal SEL of "0" if the counted value does not exceed the value set by the threshold setting portion 66.

The control circuit 61 continues to read the polarity pattern which is now being read out when the selection signal SEL is "0", while the control circuit 61 starts to read other patterns by adding an offset to the address of the ROM 62 when the selection signal SEL is "1".

Figures 25A, 25B:
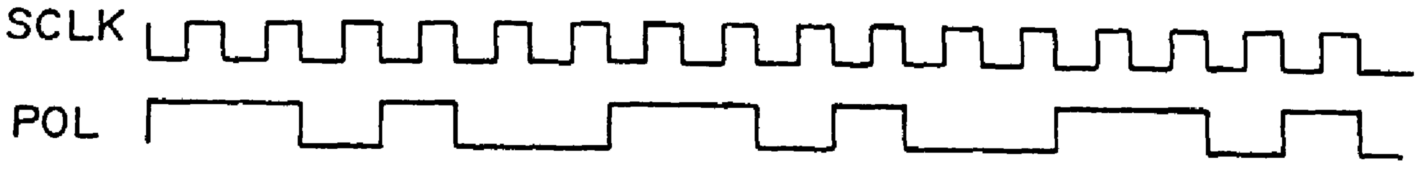
FIG. 25A is a view showing an example of the polarity pattern.
FIG. 25B is a timing chart showing timings of a shift clock and a polarity pattern signal (POL)

The polarity pattern in which the polarity is different every two bits, as shown in FIG. 14, for example, is stored in the ROM 62 as the first polarity pattern. Also, the polarity pattern in which two continuous bits out of three continuous bits of data have the same logical value but one remaining bit has the opposite logical value, for example, as shown in FIG. 25A, the polarity pattern of a set of six picture element electrodes 14 which are arranged continuously in the horizontal direction is given as "++−+−−", is stored in the ROM 62 as the second polarity pattern. In this case, the polarity pattern signal POL shown in FIG. 25B is output from the ROM 62 in synchronism with the shift clock SCLK.

In the third embodiment, as described above, two sets of polarity patterns are stored in the ROM 62, and then it is decided by the comparator 63, the counter circuit 64, the comparator 65, and the threshold setting portion 66 whether or not the polarity pattern signal POL output from the ROM 62 is similar to the image signal RGB. Then, if it is decided that both signals are similar to each other, there is such a possibility that the flicker is generated, so that the polarity pattern which is read from the ROM 62 can be changed. Therefore, the polarity pattern can be switched automatically in response to the display image, and thus generation of the flicker can be prevented without fail. In addition, in the third embodiment, the liquid crystal display device which is able to switch the polarity pattern by the simple circuit configuration in response to the image signal can be achieved.

Fourth Embodiment

A liquid crystal display panel driver circuit according to a fourth embodiment of the present invention will be explained hereunder. A different respect between the fourth embodiment and the first embodiment resides in that configurations of the polarity pattern controlling portion and the data driver are different from each other. Since remaining configurations are similar to those in the first embodiment, redundant explanations of the overlapped constituent portions will be omitted.

(1) Configuration of a Polarity Pattern Controlling Portion

Figure 26:
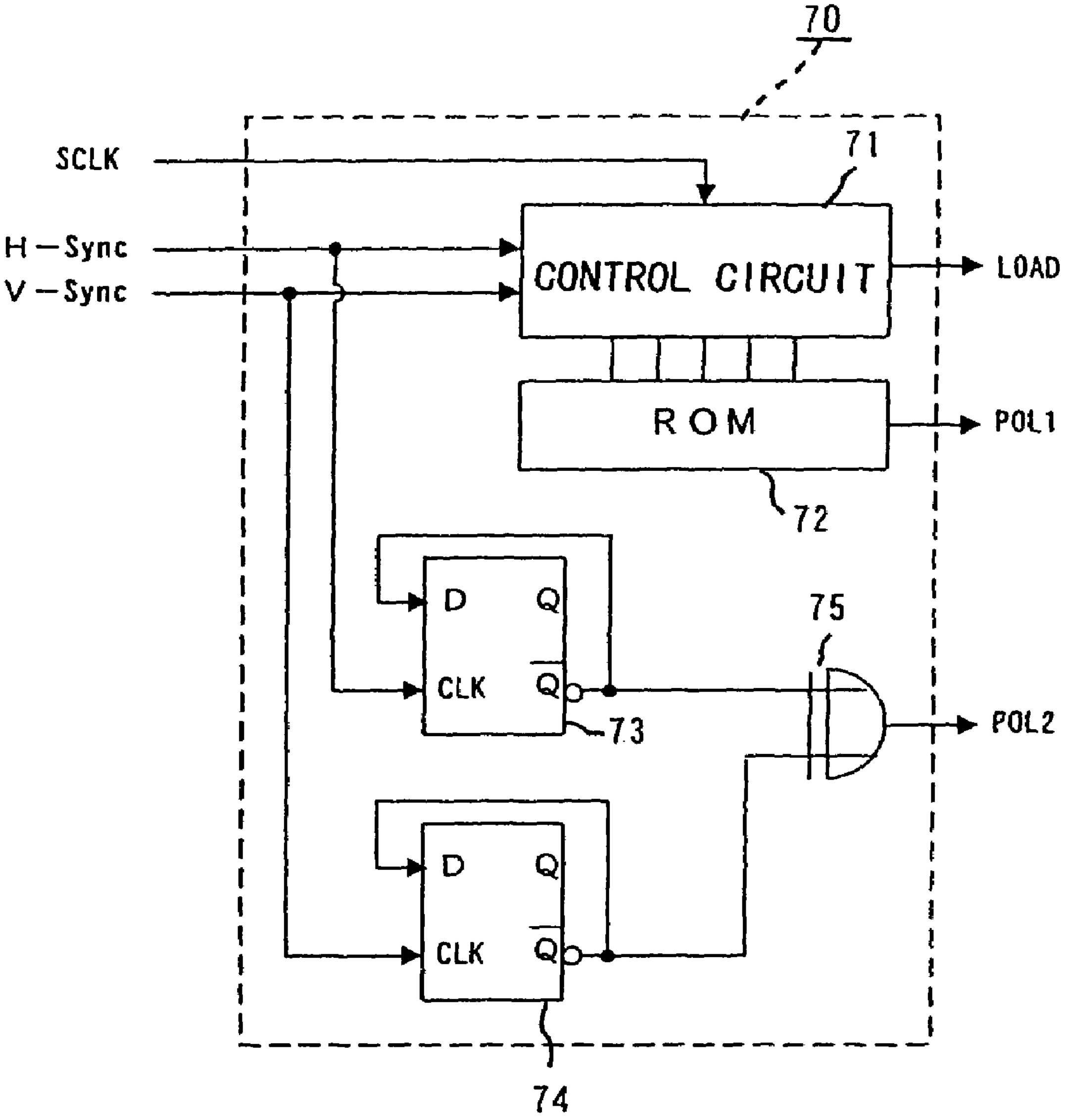
FIG. 26 is a block diagram showing a configuration of a polarity pattern controlling portion of a liquid crystal display panel driver circuit according to a fourth embodiment of the present invention.

FIG. 26 is a block diagram showing a configuration of a polarity pattern controlling portion 70 of a liquid crystal display panel driver circuit according to the fourth embodiment of the present invention.

The polarity pattern controlling portion 70 comprises a control circuit 71, a ROM 72, D-type flip-flop circuits 73, 74, and an exclusive-OR (XOR) circuit 75. The polarity patterns in which data corresponding to the horizontal picture element number (n) of the liquid crystal display panel 40 are compiled as a set are stored in the ROM 72.

The control circuit 71 receives the horizontal synchronizing signal H-sync, the vertical synchronizing signal V-sync, and the shift clock SCLK, sets the address of the ROM 72, and generates the loading signal LOAD which takes a value "1" only for the first horizontal synchronization period after the power supply has been turned ON and then takes a value "0" thereafter. The polarity pattern signal POL1 is output from the ROM 72 bit by bit in synchronism with the shift clock SCLK.

The D-type flip-flop circuit 73 receives the horizontal synchronizing signal H-sync at its clock terminal CLK, and feeds back an output of its inverted output terminal /Q (Where "/" denotes an inverting signal. This is also true hereinafter.) to its input terminal D. Also, the vertical synchronizing signal V-sync is input into a clock terminal CLK of the D-type flip-flop circuit 74. An output of an inverted output terminal /Q of the D-type flip-flop circuit 74 is fed back to an input terminal D. Signals being output from the inverted output terminals /Q of the D-type flip-flop circuits 73, 74 are input into the XOR circuit 75. Then, the XOR circuit 75 outputs the exclusive-OR of two input signals as an inverting signal POL2.

The inverting signal POL2 output from the XOR circuit 75 is inverted every one period of the horizontal synchronizing signal H-sync and also inverted every one period of the vertical synchronizing signal V-sync.

(2) Configuration of the Data Driver

Figure 27:
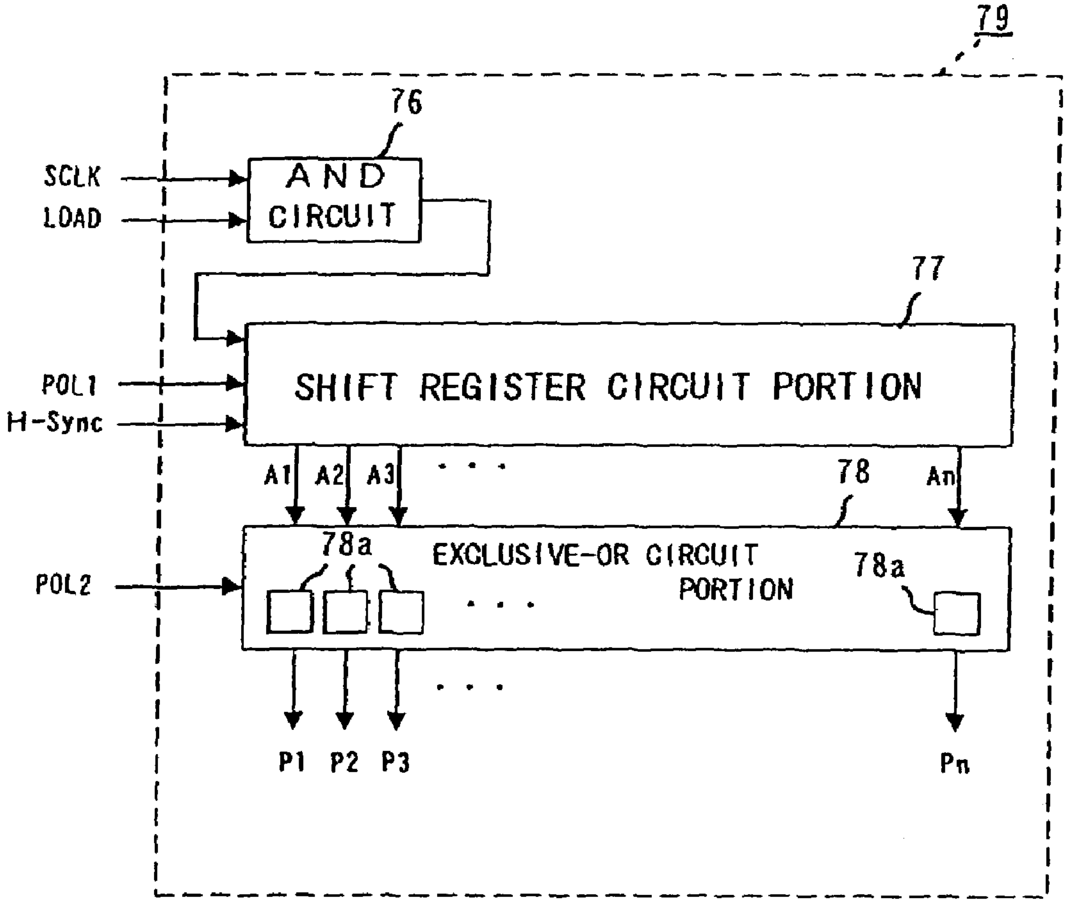
FIG. 27 is a block diagram showing a configuration of a data driver of the liquid crystal display panel driver circuit according to the fourth embodiment of the present invention.

FIG. 27 is a block diagram showing a configuration of a data driver of the liquid crystal display panel driver circuit according to the fourth embodiment. A difference of a data driver 79 in the liquid crystal display panel driver circuit according to the fourth embodiment from the data driver shown in FIG. 9 is that a circuit for outputting the polarity signals P1 to Pn is different. However, since configurations from the shift register circuit portion 42 to the voltage follower portion 47 are similar mutually, redundant explanations of the overlapped constituent portions with those in FIG. 9 will be omitted in FIG. 27.

An AND circuit 76 transmits the shift clock SCLK to a shift register circuit portion 77 only in a period when the loading signal LOAD is "1".

The shift register circuit portion 77 shifts the polarity pattern signal POL1 which is input from the polarity pattern controlling portion 70 in synchronism with the-shift clock SCLK, and then outputs the polarity pattern signal POL1 for one horizontal synchronization period in parallel. The signals which are output parallelly from the shift register circuit portion 77 are referred to as polarity signals A1 to An hereinafter.

An exclusive-OR circuit portion 78 consists of n exclusive-OR circuits 78*a*. The exclusive-OR circuits 78*a* output the exclusive OR of the polarity signals A1 to An and the inverting signal POL2 as the polarity signals P1 to Pn. In other words, the exclusive-OR circuits 78*a* outputs the polarity signals A1 to An, which are output from the shift register circuit portion 77, as the polarity signals P1 to Pn when the inverting signal POL2 is "1", while the exclusive-OR circuits 78*a* outputs the inverted signals of the polarity signals A1 to An as the polarity signals P1 to Pn when the inverting signal POL2 is "0".

(3) Operation

An operation of the liquid crystal display panel driver circuit according to the fourth embodiment will be explained hereunder.

The control circuit 71 of the polarity pattern controlling portion 70 sets the loading signal LOAD to "1" in synchronism with the leading edge of the first horizontal synchronizing signal H-sync after the power supply has been turned ON. Also, the control circuit 71 sets the-initial address of the ROM 72 in synchronism with the horizontal synchronizing signal H-sync, and then increments the address in synchronism with the shift clock SCLK. Accordingly, the polarity pattern signal POL1 is output from the ROM 72 bit by bit in synchronism with the shift clock SCLK.

The XOR circuit 75 outputs the inverting signal POL2 which is inverted every one horizontal synchronization period and every one vertical synchronization period.

The AND circuit 76 of the data driver 79 shown in FIG. 27 transmits the shift clock SCLK to the shift register circuit portion 77 in a period when the loading signal LOAD is "1". After the horizontal synchronizing signal H-sync has changed from "0" to "1", the shift register circuit portion 77 shifts the polarity pattern signal POL1 in synchronism with the shift clock SCLK being input from the AND circuit 76, and then n-bit signals are output in parallel as the polarity signals A1 to An when the polarity pattern signal POL1 is shifted by n bits. The exclusive-OR circuits.78*a* of the exclusive-OR circuit portion 78 outputs the polarity signals A1 to An as the polarity signals P1 to Pn in a period when the inverting signal POL2,is "1", while the exclusive-OR circuits 78*a* of the exclusive-OR circuit portion 78 outputs the inverted signals of the polarity signals A1 to An as the polarity signals P1 to Pn in a period when the inverting signal POL2 is "0".

FIG. 28 is a timing chart showing timings of the loading signal LOAD, the shift clock SCLK, and the polarity pattern signal POL1. FIG. 29 is a view showing a relationship between the polarity pattern signal POL2 and the polarity pattern. FIG. 30 is a view showing voltages (polarities) of respective picture element electrodes of the liquid crystal display panel.

As shown in FIGS. 28 to 30, the polarity pattern signal POL1 is input into the shift register circuit portion 77 in synchronism with the shift clock SCLK in a period when the loading signal LOAD is "1". Thus, the n-bit polarity pattern signal POL1 is stored into the shift register circuit portion 77. Then, the loading signal LOAD becomes "0" when the first horizontal synchronization period is completed, so that the shift clock SCLK is not input into the shift register circuit portion 77. Therefore, the shift register circuit portion 77 still holds the polarity pattern signal POL1 which has been input in the first horizontal synchronization period.

Meanwhile, the inverting signal POL2 output from the XOR circuit 75 is inverted every one horizontal synchronization period. Hence, as shown in FIG. 29, the polarity signals P1 to Pn (P1 to P12 are shown in FIG. 29) being output from the exclusive-OR circuit portion 78 are inverted every one horizontal synchronization period. Accordingly, as shown in FIG. 30, the polarity of the picture element electrodes which are adjacent to each other in the vertical direction is set differently.

In addition, the inverting signal POL2 output from the XOR circuit 75 is inverted every one vertical synchronization period. As a result, the polarity of the picture element electrodes is inverted frame by frame.

(4) Advantage of the Fourth Embodiment

In the fourth embodiment, since only the polarity pattern for one horizontal synchronization period should be stored in the ROM 72, an amount of memory cell of the ROM 72 can be reduced smaller than the ROM 62.

Also, in the fourth embodiment, like the third embodiment, plural sets of polarity patterns may be stored previously in the ROM 72, then the similarity between the data signal TADA and the polarity pattern signal POL1 may be estimated by comparing them by using the comparator, and then the polarity pattern signal read out from the ROM 72 may be switched if there is such a possibility that the flicker is generated.

Fifth Embodiment

A liquid crystal display panel driver circuit according to a fifth embodiment of the present invention will be explained hereinafter. A difference of the fifth embodiment from the first embodiment resides in that configurations of the polarity pattern controlling portion and the data driver are different. Since other configurations are similar to those of the first embodiment, redundant explanations of overlapped constituent portions will be omitted.

(1) Configuration of a Polarity Pattern Controlling Portion

Figure 31:
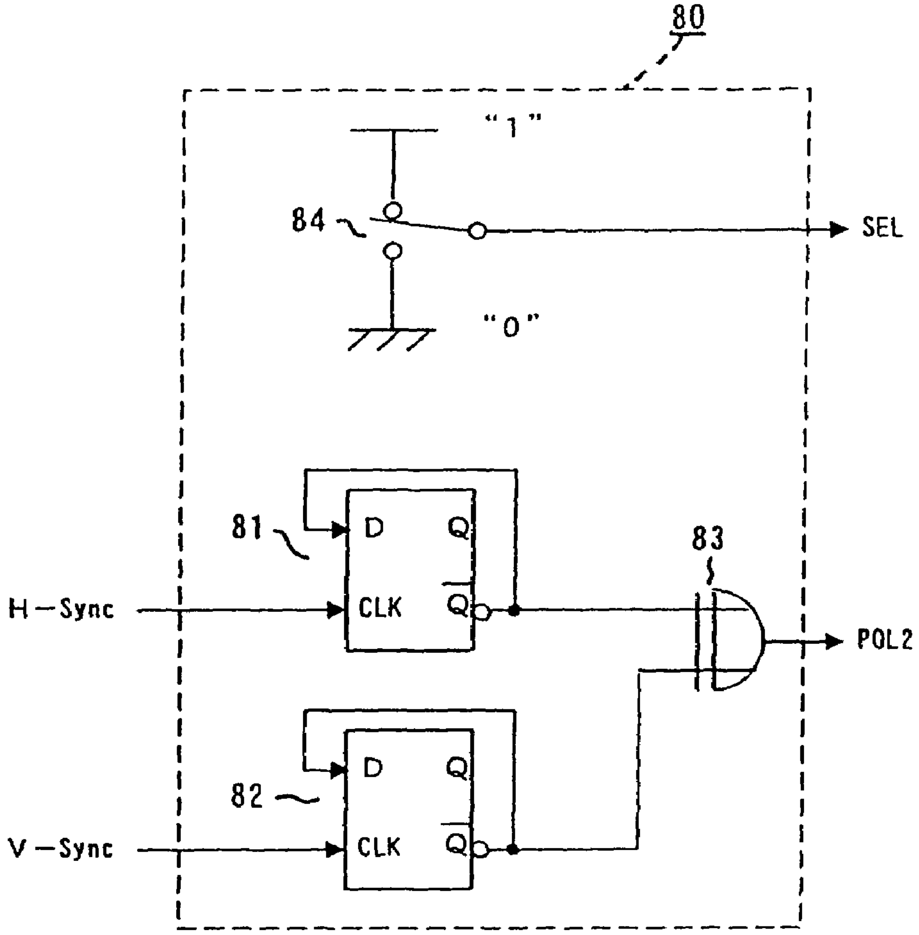
FIG. 31 is a block diagram showing a configuration of a polarity pattern controlling portion of a liquid crystal display panel driver circuit according to a fifth embodiment of the present invention.

FIG. 31 is a block diagram showing a configuration of a polarity pattern controlling portion of a liquid crystal display panel driver circuit according to the fifth embodiment.

The polarity pattern controlling portion 80 comprises D-type flip-flops circuits 81, 82, an exclusive-OR circuit 83, and a change-over switch 84. The D-type flip-flops circuit 81 receives the horizontal synchronizing signal H-sync at its clock terminal CLK, and an output of the inverted output terminal /Q is fed back to an input terminal D. Also, the vertical synchronizing signal V-sync is input into the clock terminal CLK of the D-type flip-flops circuit 82. An output of the inverted output terminal /Q of the D-type flip-flops circuit 82 is fed back to an input terminal D. Signals being output from the inverted output terminals /Q of the D-type flip-flops circuits 81, 82 are input into the exclusive-OR circuit 83. This exclusive-OR circuit 83 outputs the exclusive-OR of two input signals as the inverting signal POL2. This inverting signal POL2 output from the exclusive-OR circuit 83 is inverted every one period of the horizontal synchronizing signal H-sync and every one period of the vertical synchronizing signal V-sync. The change-over switch 84 is connected to any one of the high potential side wiring and the low potential side wiring, and outputs "1", or "0".

(2) Configuration of the Data Driver

Figure 32:
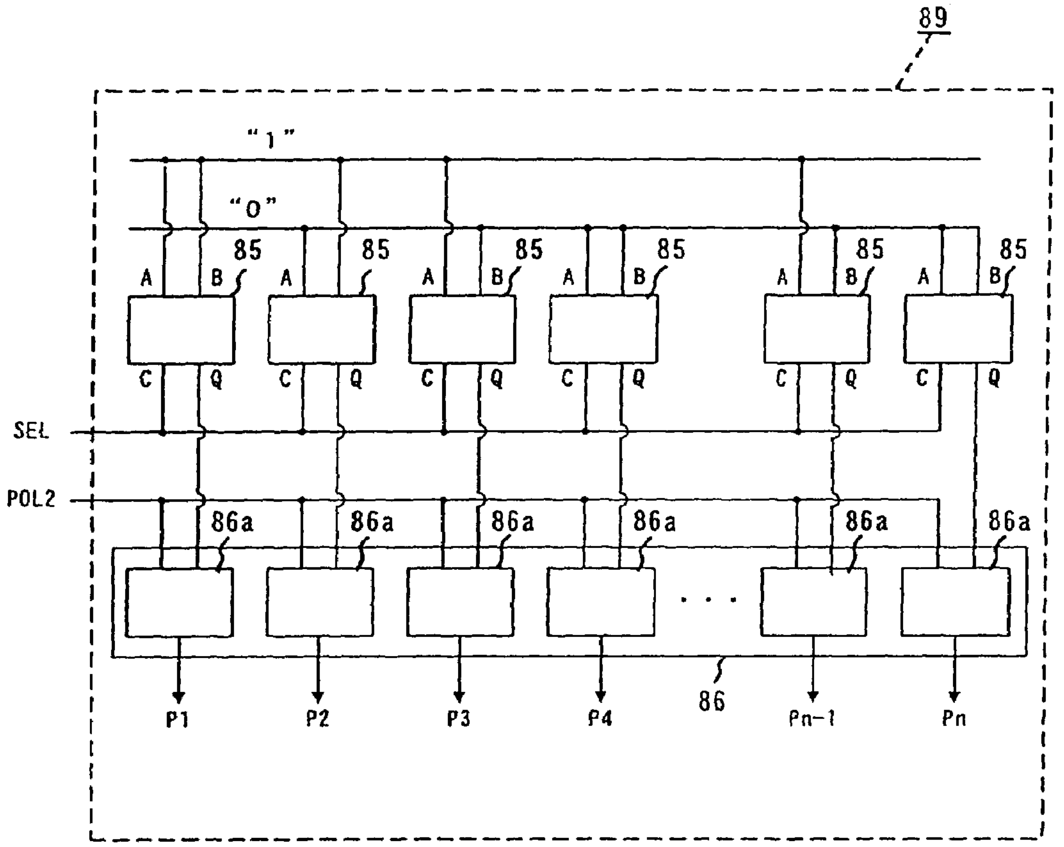
FIG. 32 is a block diagram showing a configuration of a data driver of the liquid crystal display panel according to the fifth embodiment of the present invention.

FIG. 32 is a block diagram showing a configuration of the data driver of the liquid crystal display panel according to the fifth embodiment of the present invention. A difference of a data driver 89 in the liquid crystal display panel driver circuit according to the fifth embodiment from the data driver shown in FIG. 9 is that a circuit for outputting the polarity signals P1 to Pn is different. However, since configurations from the shift register circuit portion 42 to the voltage follower portion 47 are similar mutually, redundant explanations of the overlapped constituent portions with those in FIG. 9 will be omitted in FIG. 32.

The data driver 89 includes n logic circuits 85, and an exclusive-OR circuit portion 86. As shown in FIG. 33, in each logic circuit 85, an input of its input terminal A is output to its output terminal Q when the selection signal SEL input into an input terminal C is "0", while an input of its input terminal B is output to its output terminal Q when the selection signal SEL is "1".

In the fifth embodiment, as shown in FIG. 32, both input terminals A, B of the (4m−3)-th logic circuit 85 (where m=1, 2, . . . ) are connected to the line of "1". Also, the input terminal A of the (4m−2)-th logic circuit 85 is connected to the line of "0" and the input terminal B thereof is connected to the line of "1". The input terminal A of the (4m−1)-th logic circuit 85 is connected to the line of "1" and the input terminal B thereof is connected to the line of "0". Both input terminals A, B of the 4m-th logic Circuit 85 are connected to the line of "0".

The exclusive-OR circuit portion,86 consists of n exclusive-OR circuits 86*a*. The inverting signal POL2 is input into one input terminal of each exclusive-OR circuit 86*a*, while the other input terminal of each exclusive-OR circuit 86*a* is connected to an output terminal Q of the logic circuit 85.

FIG. 34A is a view showing the polarity of the polarity pattern when the selection signal SEL is "0", and FIG. 34B is a view showing the polarity of the polarity pattern when the selection signal SEL is "1". When the selection signal SEL is "0", the polarities of the picture element electrodes 14 which are adjacent to each other in the horizontal direction and the vertical direction are set oppositely. Also, when the selection signal SEL is "1", the polarity of the picture element electrodes 14 which are aligned in the horizontal direction is inverted every two picture elements and also the polarity of the picture element electrodes 14 which are aligned in the vertical direction is inverted every one picture element.

(3) Operation

For example, the selection signal SEL is set to "0" by switching the change-over switch 84. Then, the inverted signals shown in FIG. 34A are input in parallel from the logic circuit 85 to the exclusive-OR circuit portion 86. Then, the exclusive-OR circuit portion 86 outputs the logical sum of the signals being input from the logic circuit 85 and the inverting signal POL2 as the polarity signals P1 to Pn. Since the inverting signal POL2 is inverted every one horizontal synchronization period, the polarity of the picture element electrodes of the liquid crystal display panel 40 can be given as shown in FIG. 34A. Similarly, since the inverting signal. POL2 is inverted every one horizontal synchronization period, the polarity of the picture element electrodes is inverted every one frame. If the selection signal SEL is set to "1" by switching the change-over switch 84, the polarity pattern being input into the exclusive-OR circuit portion 86 can be changed, so that the polarity of the picture element electrodes of the liquid crystal display panel 40 can be given as shown in FIG. 34B.

(4) Advantage of the Fifth Embodiment

In the fifth embodiment, the polarity pattern can be changed by the selection signal SEL. In addition, in the fifth embodiment, unlike the first to third embodiments, the ROM for storing the polarity pattern can be omitted.

Sixth Embodiment

Figure 35:
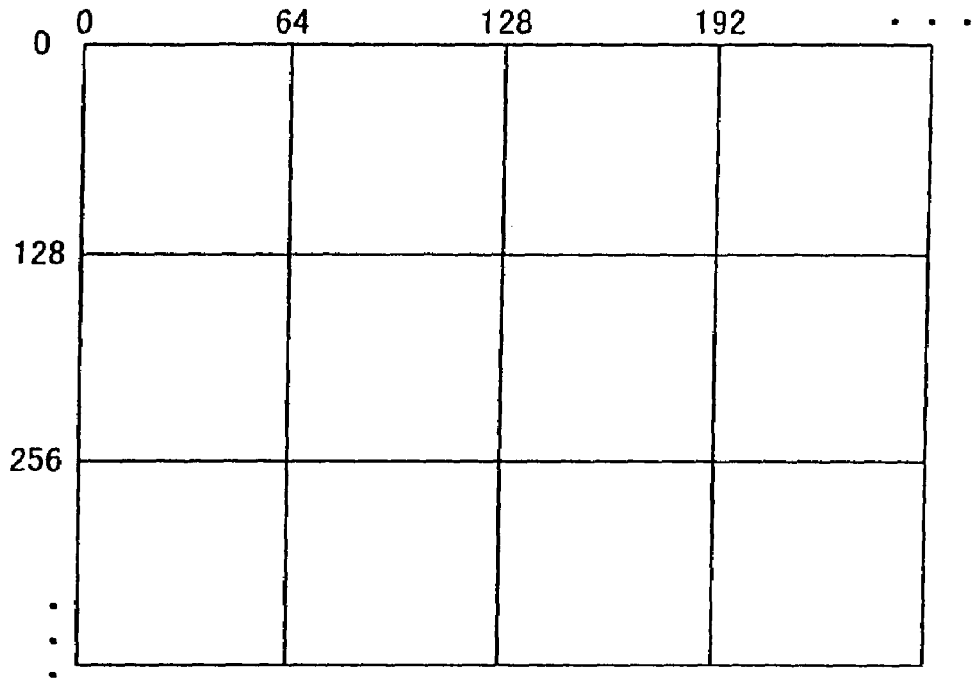
FIG. 35 is a view showing an outline of a sixth embodiment of the present invention.

FIG. 35 is a view showing an outline of a sixth embodiment of the present invention. In the sixth embodiment, the display region is partitioned into rectangular blocks each has 64×3 (R, G, B) picture elements in the horizontal direction and 128 picture elements in the vertical direction, then it is decided in a minimum transfer unit to what extent a flicker generating pattern (referred to as a "flicker pattern" hereinafter) is contained in one block, and then the polarity pattern is exchanged if the flicker pattern is contained in one block in excess of a predetermined number (25% of one block in this example). In the following example, assume that three picture elements R, G, B being aligned in the horizontal direction are set as one display unit, and this display unit is denoted as the pixel. Also, assume that the minimum transfer unit corresponds to the data for two pixels (six picture elements).

In the sixth embodiment, such an operation can be achieved that, as shown in FIG. 36A, the images can be displayed by the polarity pattern, in which the positive polarity and the negative polarity are switched alternatively in the vertical direction and the horizontal direction (referred to as a "first polarity pattern" hereinafter), in the initial state and then, as shown in FIG. 36B, the images can be displayed by the polarity pattern in which the polarities are switched every one picture element in the horizontal direction and every two picture elements in the vertical direction (referred to as a "second polarity pattern" hereinafter) if it is decided that the flicker is generated by the first polarity pattern.

(1) Configuration of a Driver Circuit

Figure 37:
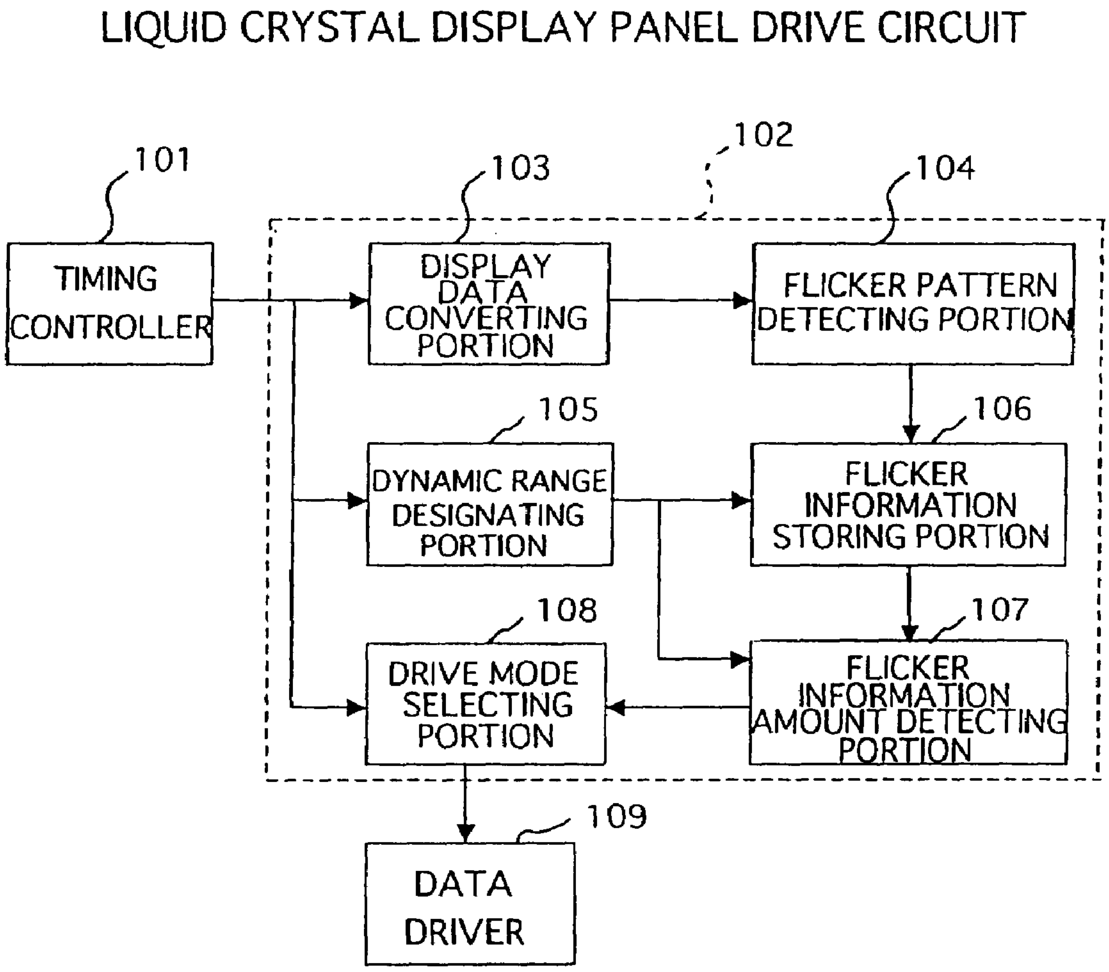
FIG. 37 is a block diagram showing a configuration of a liquid crystal display panel driver circuit according to the sixth embodiment of the present invention.

FIG. 37 is a block diagram showing a configuration of a liquid crystal display panel driver circuit according to the sixth embodiment of the present invention.

The liquid crystal display panel driver circuit according to the sixth embodiment comprises a timing controller 101, a drive mode detecting portion 102, a data driver 109, a gate driver (not shown), and a reference voltage generation circuit (not shown). Then, the drive mode detecting portion 102 includes a display data converting portion 103, a flicker detecting portion 104, a dynamic range designating portion 105, a flicker information storing portion 106, a flicker information amount detecting portion 107, and a drive mode selecting portion 108. Because configurations of the timing controller 101, the gate driver, and the reference voltage generation circuit are basically similar to those in the first embodiment, their explanation will be omitted herein. Also, assume that the R, G, B signals being output from the timing controller 101 are composed of a 6-bit signal respectively in the following explanation.

(2) Circuit of the Drive Mode Detecting Portion

FIGS. 38 to 43 are circuit diagrams showing the display data converting portion 103, the flicker detecting portion 104, the dynamic range designating portion 105, the flicker information storing portion 106, the flicker information amount detecting portion 107, and the drive mode selecting portion 108, which constitute the drive mode detecting portion 102.

Figure 38:
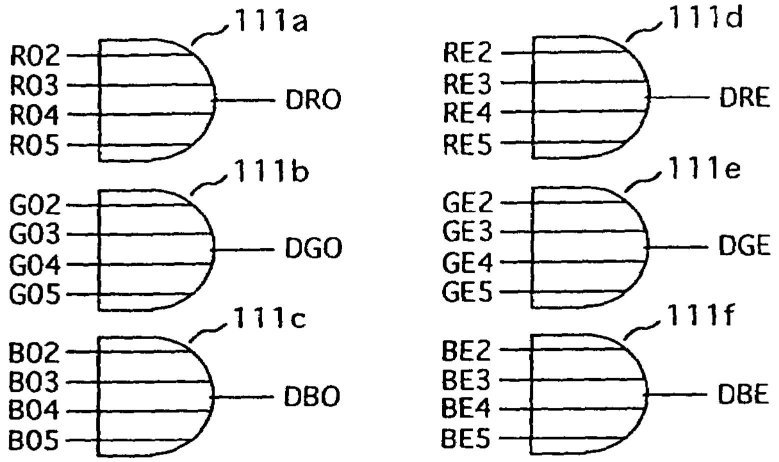
FIG. 38 is a circuit diagram showing a display data converting portion of the liquid crystal display panel driver circuit in FIG. 37.

As shown in FIG. 38, the display data converting portion 103 consists of six 4-input OR gates 111*a* to 111*f*. The OR gates 111*a* to 111*c* receive the R, G, B signals of the odd-numbered picture elements respectively, and the OR gates 111*d* to 111*f* receive the R, G, B signals of the even-numbered picture elements respectively. Then, the OR gates 111*a* to 111*f* output binary signals of the input signals.

More particularly, upper 4-bits (R02 to R05) of the R signal of the odd-numbered picture elements are input into the OR gate 111*a*. Then, an output signal DRO is set to "1" if at least one bit of these bits R02 to R05 is "1", while the output signal DRO is set to "0" if all the bits R02 to R05 are "0". The signal DRO of "1" indicates that the picture element is turned ON, and the signal DRO of "0" indicates that the picture element is not turned ON. Operations of the OR gates 111*b*, 111*c* are similar to the above operation of the OR gate 111*a*. That is, upper 4-bits G02 to G05, B02 to B05 of the G signal, the B signal of the odd-numbered picture elements are input into the OR gates 111*b*, 111*c* respectively. Then, output signals DGO, DBO are set to "1" respectively if at least one bit of these four bits is "1", while the output signals DGO, DBO are set to "0" respectively if all four input bits are "0".

Similarly, upper 4-bits of the R, G, B data of the even-numbered picture elements are input into the OR gates 111*d*, 111*e*, 111*f* respectively. Then, output signals DRE, DGE, DBE are set to "1" respectively if at-least one bits of these four input bits (RE2 to RE5, GE2 to GE5, BE2 to BE5) are "1" respectively, while the output signals DRE, DGE, DBE are set to "0" respectively if all four input bits are "0".

Figure 39:
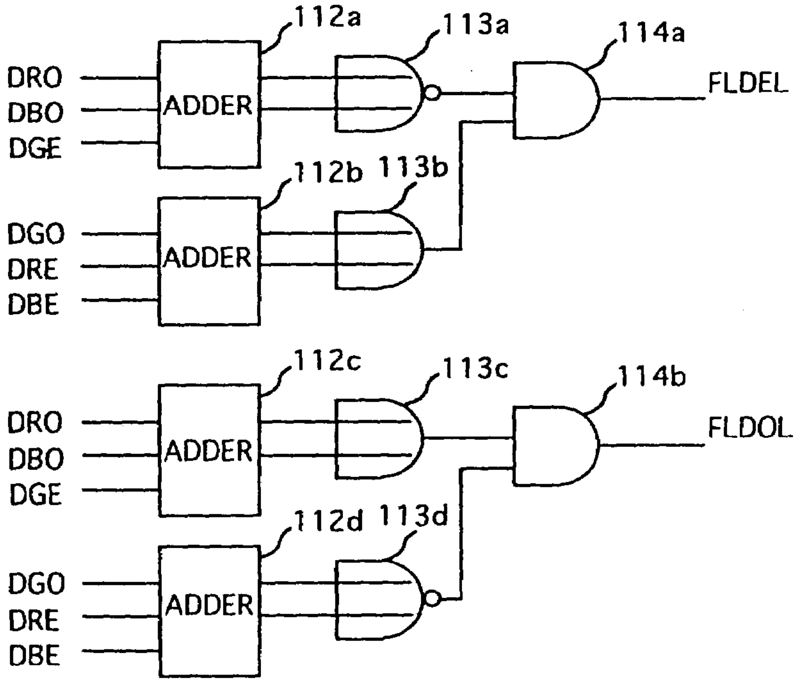
FIG. 39 is a circuit diagram showing a flicker pattern detecting portion of the liquid crystal display panel driver circuit in FIG. 37.

As shown in FIG. 39, the flicker detecting portion 104 includes four adders 112*a* to 112*d*, two NOR gates 113*a*, 113*d*, two OR gates 113*b*, 113*c*, and two AND gates 1114*a*, 114*b*. Such flicker detecting portion 104 detects whether or not the data for two pixels (six picture elements) which are adjacent in the horizontal direction constitute the flicker pattern.

Figure 44A:
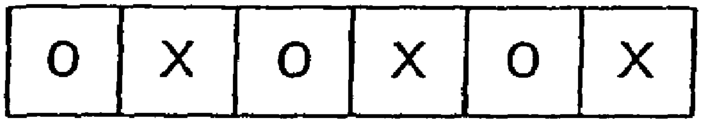
FIGS. 44A and 44B are schematic views each showing an example of a flicker pattern.

More particularly, the adder 112*a* receives the signals DRO, DBO, DGE which are output from the display data converting portion 103, and then outputs added signals (2-bit signals) of these signals. Also, the adder 112*b* receives the signals DGO, DRE, DBE which are output from the display data converting portion 103, and then outputs added signals (2-bit signals) of these signals. A NOR gate 113*a* outputs "0" if at least one bit of the 2-bit signals output from the adder 112*a* is "1", and outputs "1" if all bits of the 2-bit signals are "0". An OR gate 113*b* outputs "1" if at least one of the 2-bit signals output from the adder 112*b*is "1", and outputs "0" if all bits of the 2-bit signals are "0". An AND gate 114*a* sets an output signal FLDEL to "1" if both outputs of the NOR gate 113*a* and the OR gate 113*b* are "1", and sets an output signal FLDEL to "0" if at least one output of the NOR gate 113*a* and the OR gate 113*b* is "0". If the output signal FLDEL of the AND gate 114*a* is "1", the data arrangement shows the even-number flicker pattern, as shown in FIG. 44A, in which the flicker is generated on the even-numbered picture elements. In this case, in FIG. 44A and FIG. 44B, at least one picture element of the picture elements which are indicated by an X mark is "1".

Figure 44B:
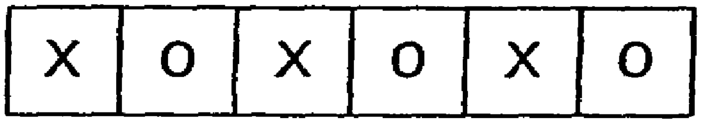

The adder 112*c* receives the signals DRO, DBO, DGE which are output from the display data converting portion 103, and then outputs added signals (2-bit signals) of these signals. Also, the adder 112*d* receives the signals DGO, DRE, DBE which are output from the display data converting portion 103, and then outputs added signals (2-bit signals) of these signals. An OR gate 113*c* outputs "1" if at least one of the 2-bit signals output from the adder 112*c* is "1", and outputs "0" if all bits of the 2-bit signals are "0". A NOR gate 113*d* outputs "0" if at least one bit of the 2-bit signals output from the adder 112*d* is "1", and outputs "1" if all bits of the 2-bit signals are "0". An AND gate 114*b* sets an output signal FLDOL to "1" if both outputs of the OR gate 113*c* and the NOR gate 113*d* are "1", and sets an output signal FLDOL to "0" if at least one output of the OR gate 113*c* and the NOR gate 113*d* is "0". If the output signal FLDOL of the AND gate 114*b* is "1", the data arrangement shows the odd-number flicker pattern, as shown in FIG. 44B, in which the flicker is generated on the odd-numbered picture elements.

Figure 40:
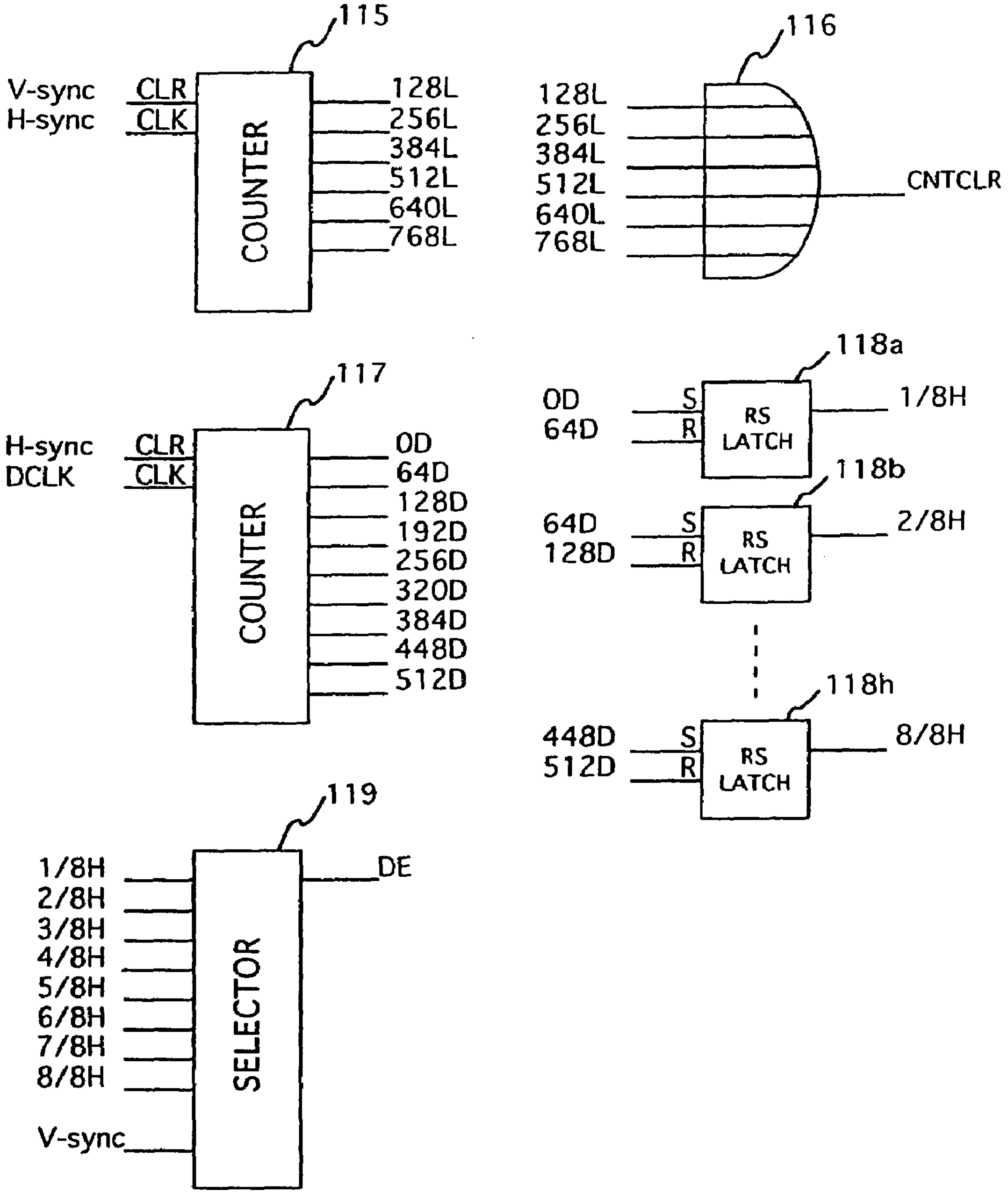
FIG. 40 is a circuit diagram showing a dynamic range designating portion of the liquid crystal display panel driver circuit in FIG. 37.

As shown in FIG. 40, the dynamic range designating portion 105 comprises a counter 115, an OR gate 116, a counter 117, RS latch circuits 118*a*, 118*b*, . . . , 118*h* (where the illustration of the RS latch circuits 118*c* to 118*g* is omitted), and a selector 119. This dynamic range designating portion 105 defines a block (also called the "dynamic range") in which a rate of the flicker pattern generation is checked (see FIG. 35).

The counter 115 counts the pulse of the horizontal synchronizing signal H-sync, and is cleared by the vertical synchronizing signal V-sync. Then, when a counted value reaches 128, 256, 384, 512, 640, or 768, the counter 115 sets a corresponding one of output signals 128L, 256L, . . . , 768L to "H". When any one of the output signals 128L, 256L, . . . , 768L of the counter 115 is set to "H", the OR gate 116 sets an output signal CONTCLR to "H". Accordingly, the signal CONTCLR which is set to "H" every 128 lines can be output.

The counter 117 is cleared by the horizontal synchronizing signal H-sync, and then counts the data clock DCLK. Then, when the counted value is 0 (i.e., the counter 117 is cleared), or when the 64-th, 128-th, 192-th, 320-th, 384-th, 448-th, or 512-th data clock DCLK is counted, a corresponding one of output signals 0D, 64D, . . . , 512D is set to "H".

The RS latch circuit 118*a* is set by the output signal OD of the counter 117, and is reset by the signal 64D. An output signal 1/8H becomes "H" during when the RS latch circuit 118*a* is set. The RS latch circuit 118*b* is set by the output signal 64D of the counter 117, and is reset by the signal 128D. An output signal 2/8H becomes "H" during when the RS latch circuit 118*b* is set. Operations of other RS latch circuits 118*c* to 118*h* are similar to the above operation.

The selector 119 selects any one of the output signals output from the RS latch circuits 118*a* to 118*h* in sequence every time when the vertical synchronizing signal V-sync is input into the selector 119, and then outputs the signal DE which defines the dynamic range. In this manner, the signal DE which is set to "H" in a period when the predetermined block is being selected is output from the selector 119.

Figure 41:
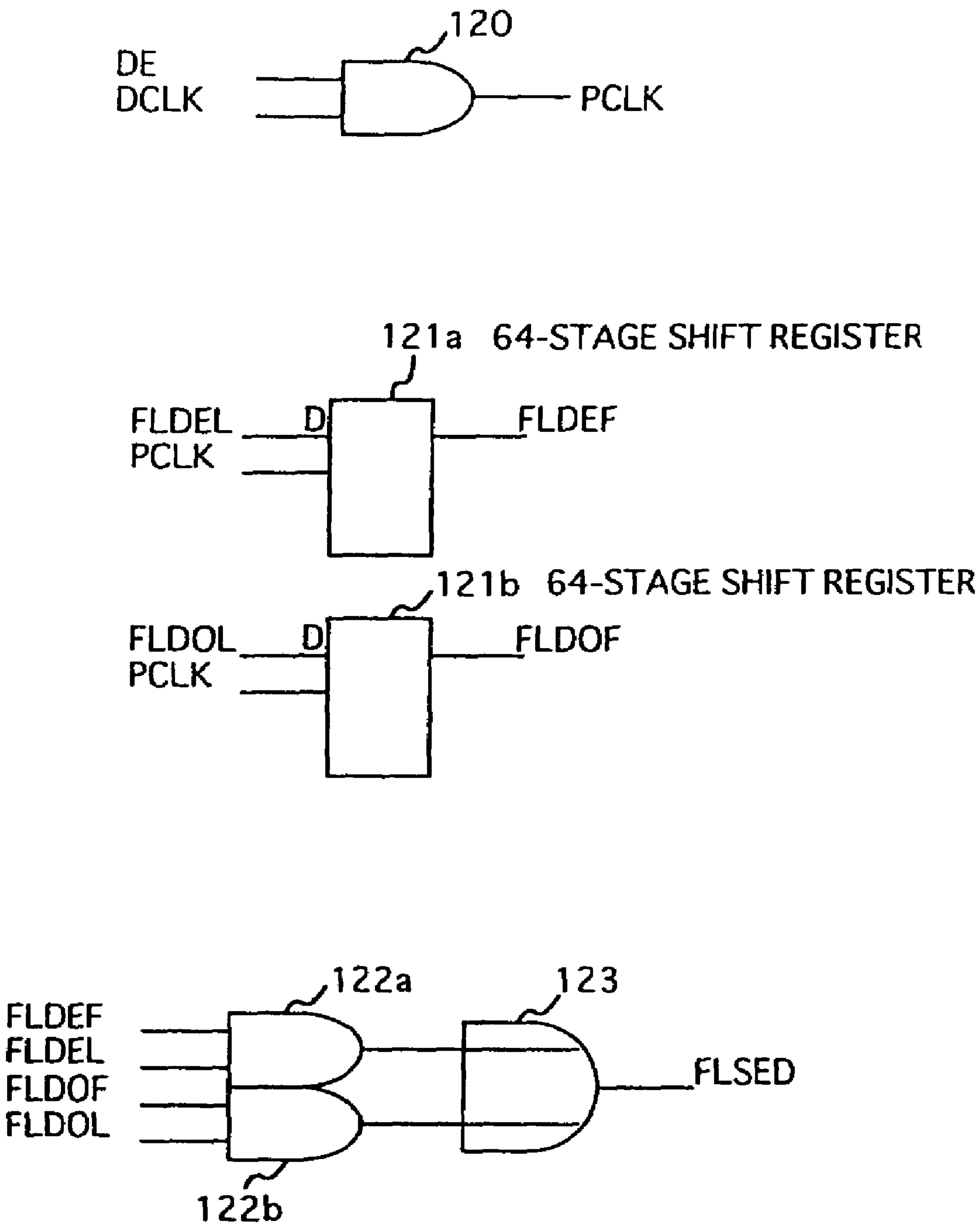
FIG. 41 is a circuit diagram showing a flicker information storing portion of the liquid crystal display panel driver circuit in FIG. 37.

As shown in FIG. 41, the flicker information storing portion 106 comprises an AND 120, two 64-stage shift registers 121*a*, 121*b*, AND gates 122*a*, 122*b*, and an OR gate 123. The flicker information storing portion 106 detects the flicker pattern which exists in the vertical direction.

More particularly, the AND 120 receives the data clock DCLK, and then output the clock PCLK only in a period when the signal for defining the dynamic range is "H". The 64-stage shift register 121*a* receives the even-numbered flicker pattern signal FLDEL, which is output from the flicker detecting portion 104, at timings in synchronism with the clock PCLK, and then shifts the signal FLDEL sequentially. Then, a value of the final stage register is output as the signal FLDEF. Similarly, the 64-stage shift register 121*b* receives the odd-numbered flicker pattern signal FLDOL, which is output from the flicker detecting portion 104, at timings in synchronism with the clock PCLK, and then shifts the signal FLDOL sequentially. Then, a value of the final stage register is output as the signal FLDOF.

The AND gate 122*a* outputs "H" when both the even-numbered flicker pattern signal FLDEL and the output signal FLDEL of the 64-stage shift register 121*a* are "H". Similarly, the AND gate 122*b* outputs "H" when both the odd-numbered flicker pattern signal FLDOL and the output signal FLDOL of the 64-stage shift register 121*b* are "H". The OR gate 123 sets an output signal FLSED to "H" when at least one of the output signals of the AND gate 122*a* and the AND gate 122*b* is "H". In other words, the flicker information storing portion 106 sets the output signal FLSED to "H" when the picture elements being aligned in the vertical direction show the flicker pattern.

Figure 42:
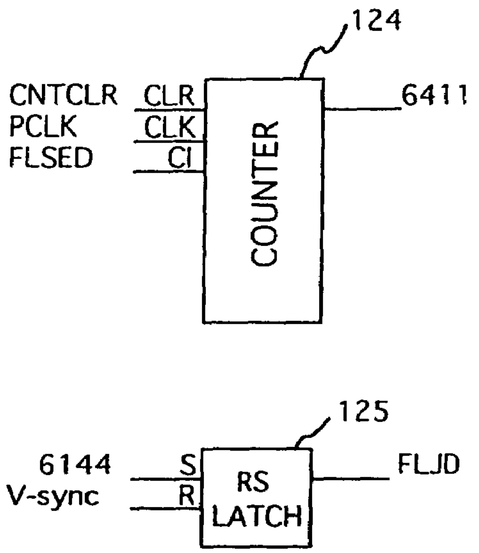
FIG. 42 is a circuit diagram showing a flicker information amount detecting portion of the liquid crystal display panel driver circuit in FIG. 37.

As shown in FIG. 42, the flicker information amount detecting portion 107 comprises a counter 124, and an RS latch 125. The flicker information amount detecting portion 107 detects at what rate the flicker pattern is contained in the range which is defined by the dynamic range designating portion 105.

More particularly, the counter 124 is cleared when the-output signal CONTCLR of the OR gate 116 of the dynamic range designating portion 105 becomes "H". The counter 124 fetches a value of the output signal FLSED of the OR gate 123 of the flicker information storing portion 106 at timings which are in synchronism with the clock PCLK being output from the AND gate 120 of the flicker information storing portion 106, and then increments the counted number. Then, if the counted value is in excess of 6144, the output of the counter 124 becomes "H". When the counter 124 exceeds its dynamic range in the vertical direction, it is cleared by the output CNTCLR of the OR gate 116 of the dynamic range designating portion 105. The RS latch 125 is set by the output of the counter 124, and is reset by the vertical synchronizing signal V-sync. It is shown that, when the output signal FLJD of the RS latch 125 is "H", 6144 flicker patterns are present in the dynamic range (64×3×128 picture elements).

Figure 43:
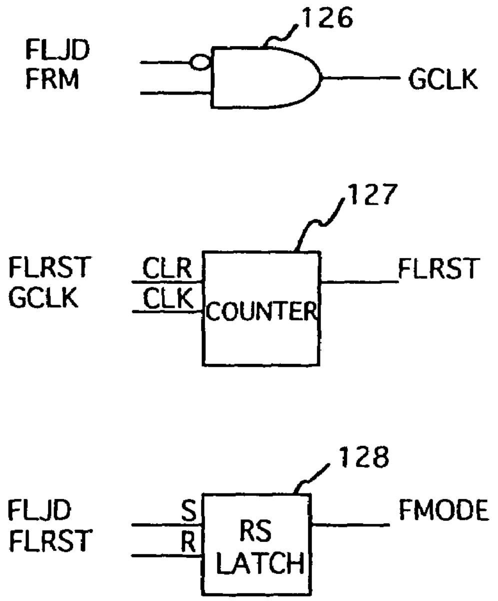
FIG. 43 is a circuit diagram showing a drive mode selecting portion of the liquid crystal display panel driver circuit in FIG. 37.

As shown in FIG. 43, the drive mode selecting portion 108 comprises an AND gate 126, a counter 127, and an RS latch circuit 128. This drive mode selecting portion 108 sets an output signal FLPT to "H" when the flicker information amount detecting portion 107 detects the flicker patterns by more than a predetermined number. Then, the drive mode selecting portion 108 has a function for returning the output signal FLPT to "L" when the frames in which the number of the flicker-patterns is less than the above predetermined number are continued over a predetermined period.

More particularly, the AND gate 126 receives the inverted signal of the output FLJD of the RS latch 125 of the dynamic range designating portion 105 and a signal FRM. The signal FRM is a signal which is in synchronism with the vertical synchronizing signal V-sync, and has a pulse which becomes "H" in an image data blank period prior to the pulse of the vertical synchronizing signal V-sync. The AND gate 126 outputs the signal GCLK which becomes "H" when the output signal FLJD of the RS latch circuit 125 is "L" and the signal FRM is "H".

The counter 127 counts the output signal GCLK of the AND gate 126, and then sets the output signal FLRST to "H" to clear the value of the counter when the counted value reach a predetermined value. In other words, the counter 127 counts the flickerless frames, and then sets the output signal FLRST to "H" when the flickerless frames are continued over a predetermined period (e.g., 15 to 30 frame period).

The RS latch-circuit 128 is set when the output signal FLJD of the RS latch circuit 125 in FIG. 42 becomes "H", and is reset by the output signal FLRDT of the counter 127. Thus, the first polarity pattern is selected when the output signal FMODE of the RS latch circuit 128 is "L", and the second polarity pattern is selected when the output signal FMODE of the RS latch circuit 128 is "H".

(3) Configuration of the Data Driver

Figure 45:
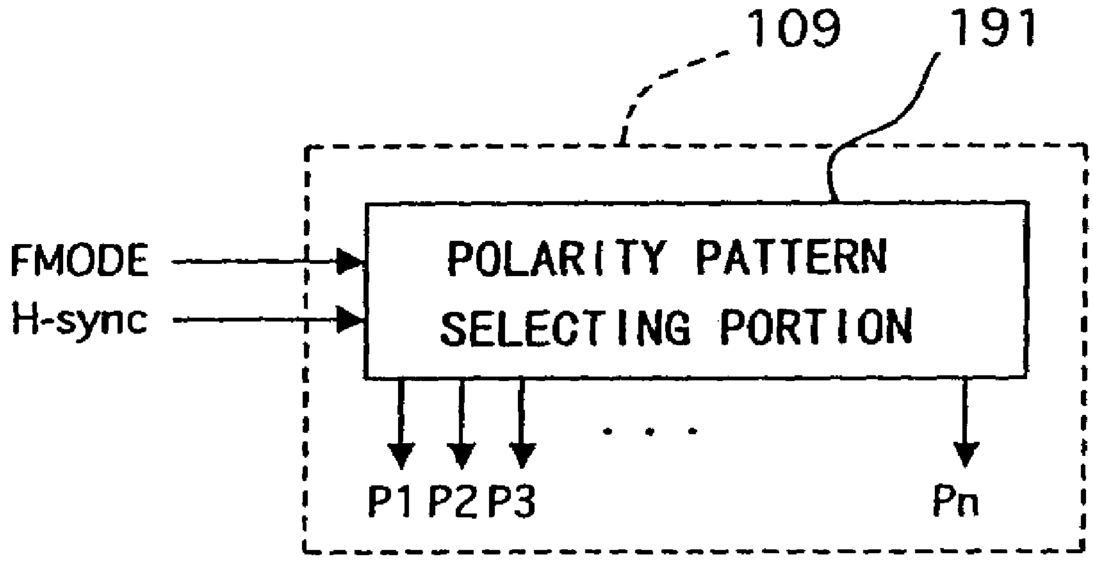
FIG. 45 is a block diagram showing a configuration of a data driver according to the sixth embodiment of the present invention.

FIG. 45 is a block diagram showing a configuration of the data driver 109 according to the sixth embodiment. A difference of the data driver 109 from the data driver shown in FIG. 9 is that a polarity pattern selecting portion 191 is provided in place of the shift register circuit portion 41. However, since remaining configurations are basically similar to each other, redundant explanations of the overlapped constituent portions will be omitted hereunder.

The polarity pattern selecting portion 191 changes the polarity of the polarity signals P1, P2, . . . , Pn every one horizontal synchronization period in a time period when the output signal FMODE of the latch circuit 128 is "L", and also changes the polarity of the polarity signals P1, P2, . . . , Pn every two horizontal synchronization periods in a time period when the output signal FLPT of the latch circuit 128 is "H". The polarity of the data signals $O_1$ to $O_n$ which are output from the data driver according to the polarity signals P1, P2, . . . , Pn (see FIG. 36).

(4) Advantage of the Sixth Embodiment

In the sixth embodiment, since the polarity pattern can be automatically changed from the first polarity pattern to the second polarity pattern by detecting the presence of the flicker pattern by the circuit consisting of the logic circuits when the flicker becomes conspicuous, the event that it becomes hard to watch the screen due to the flicker can be prevented. Also, in the sixth embodiment, since the drive mode detecting portion 102 is formed only by the logic circuit and no ROM is incorporated, such an advantage can be achieved that a production cost can be reduced.

(5) Modification

In the above sixth embodiment, the case is explained where the screen is partitioned into a plurality of blocks and then the polarity pattern is changed when the flicker pattern is detected from at least one block by the predetermined number or more. In this case, if a rate of the blocks, in which the flicker pattern is detected to exceed a preselected number (e.g., 25%), to all block number is detected and then such rate of the blocks exceeds a previously set value (e.g., 20% of all block number), the polarity pattern may be changed.

In addition, in order to detect generation of the flicker on the boundary between the partitioned blocks, for example, the block range may be shifted in the vertical direction or the horizontal direction by half of the block every frame. In this case, an offset value may be set in the counters 115, 117 in the dynamic range designating portion 105 every one frame.

Seventh Embodiment

A seventh embodiment of the present invention will be explained hereunder. In the seventh embodiment, the flicker patterns are set in more detail rather than the sixth embodiment.

FIG. 46 to FIG. 52 are views showing outlines of the seventh embodiment. In the seventh embodiment, if patterns shown in FIGS. 46A to 46L are detected, the flicker pattern is caused. Reasons why these patterns are deemed as the flicker pattern will be explained hereinbelow.

Figure 46A:
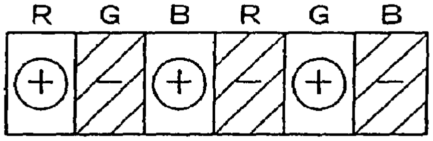
FIGS. 46A to 46L are schematic views each showing an example of a flicker pattern according to a seventh embodiment of the present invention.
Figure 46B:
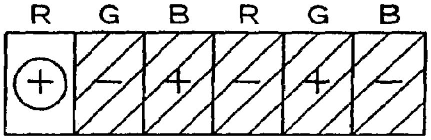
Figure 46C:
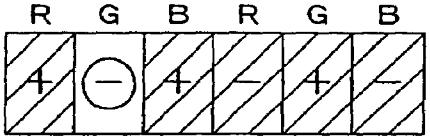
Figure 46D:
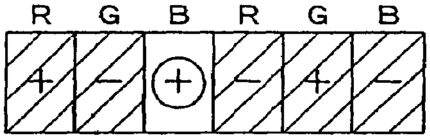

The flicker is generated when the polarity of turn-ON picture elements is deviated every R, G, B. Therefore, as for one color of R, G, B of two picture elements which are adjacent in the horizontal direction, the pattern in which one picture element is turned ON and the other picture element is not turned ON (turned off) is counted and then such pattern is assumed as the flicker pattern if the number of counted patterns exceed a predetermined value. FIGS. 46B, 46C, 46D correspond to this case.

Figure 46E:
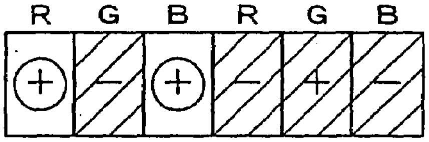
Figure 46F:
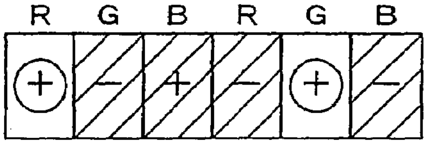
Figure 46G:
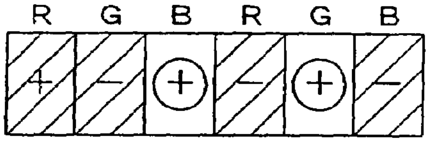
Figure 46H:
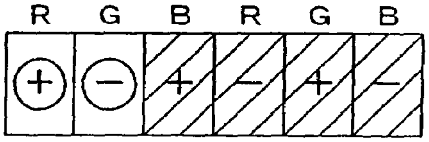
Figure 46I:
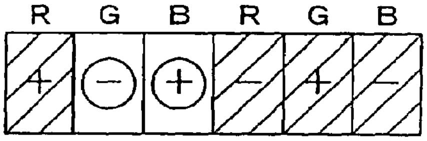
Figure 46J:
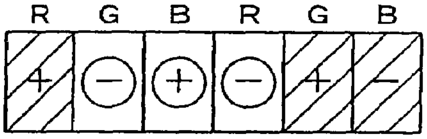
Figure 46K:
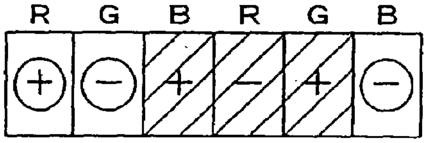
Figure 46L:
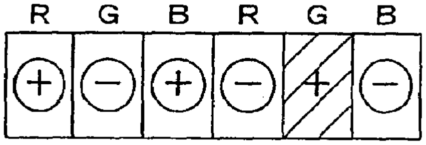
Figure 46L:
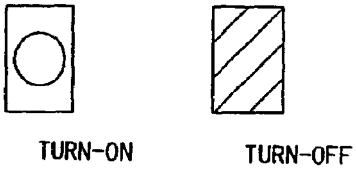

In the meanwhile, an amount of light transmitted through the picture elements of the liquid crystal display panel is associated with a product of a transmitted amount of light and a corrected value of a color filter. The corrected value of the R, G, B color filters are not uniform, and are set to 20%, 70%, 10% respectively. Consequently, if only one of G picture elements in two pixels being aligned in the horizontal direction is turned ON and the other is not turned ON, the flicker becomes conspicuous. Therefore, in the seventh embodiment, in case merely the G picture element in one pixel of two pixels being aligned in the horizontal direction is turned ON and the G picture element in the other pixel is not turned ON, such pattern is deemed as the flicker pattern, regardless of the situation that the R picture element and the B picture element are turned ON or not. FIGS. 46A, 46F to 46L correspond to this case. Also, in the seventh embodiment, if both G picture elements of two pixels being aligned in the horizontal direction are not turned ON and if any one or both of the R picture element and B picture element of one pixel is turned ON but the R picture element and B picture element of the other pixel are not turned ON, such pattern is deemed as the flicker pattern. FIGS. 46B, 46D, 46E correspond to this case.

According to the above method, since the flicker pattern is detected only in the horizontal direction, the patterns in which no flicker is generated, such as the vertical-striped pattern, as shown in FIG. 47B, etc. are also-decided as the flicker pattern. Therefore, a circuit for classifying the number of turned-ON picture elements into the picture elements in the odd-numbered column and the picture elements in the even-numbered column and counting them while checking any one color of R, G, B of the picture elements being aligned in the horizontal direction is provided, and then a flag is set if the counted value is in excess of a predetermined value. Then, the flags in the N-th row and the N+1-th row (where N is integer) are compared with each other, and then it is decided that the situation shown in FIG. 47A is caused if the flag is set only on one row. Also, the situation shown in FIG. 47B is caused if the flags are set on both the N-th row and the N+1-th row, and then it is decided that the vertical-striped pattern is displayed on the screen if such situation is present over predetermined rows. Explanation will be made in more detail with reference to FIG. 48. In FIG. 48, assume that a total number of the odd-numbered picture elements or the even-numbered picture elements in the horizontal direction is X and the number of the turn-ON picture elements is Y. In the event that the picture elements whose number exceeds the above predetermined counted number are turned ON on the N-th row and the N+1-th row, it is understood that the picture elements of more than 3Y−2Y are turned ON continuously without fail in the vertical direction. Thus, the vertical-striped pattern can be detected according to such principle.

Figure 49:
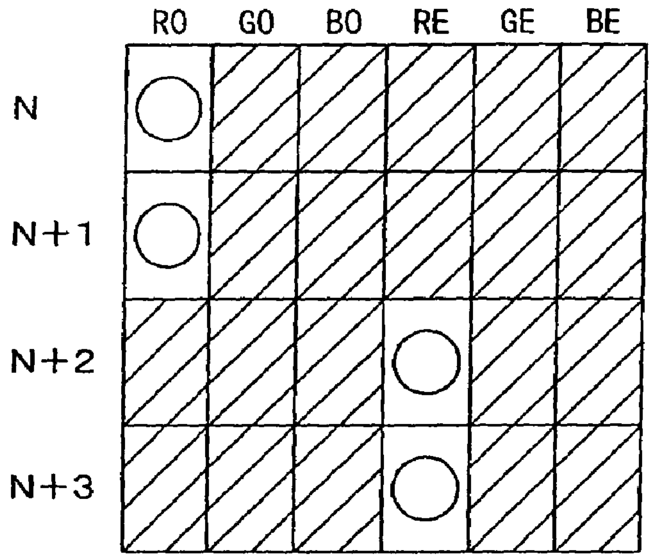
FIG. 49 is a view showing a 2-dot checker pattern.

In addition, special patterns such as a checker pattern in which two picture elements are displayed in the vertical direction, as shown in FIG. 49 (referred to as a “2-dot checker pattern” hereinafter), etc. can be detected by applying the above principle. For instance, assume that, concerning the odd-numbered picture elements of certain color, a flag indicating that the number of the turn-ON picture elements is in excess of a predetermined number is set on the N-th row and the N+1-th row and a flag indicating that the number of the turn-ON picture elements is less than the predetermined number is set on the N+2-th row and the N+3-th row. At the same time, concerning the even-numbered picture elements of the same color, the flag indicating that the number of the turn-ON picture elements is less than the predetermined number is set on the N-th row and the N+1-th row and the flag indicating that the number of the turn-ON picture elements is in excess of the predetermined number is set on the N+2-th row and the N+3-th row. The 2-dot checker pattern can be detected by extracting such pattern.

Because the flicker is generated due to difference between the-luminance of the positive polarity and the luminance of the negative polarity, it is hard to recognize the flicker in the low luminance area. Further, because change in the transmittance relative to the applied voltage is small, it is also hard to recognize the flicker in the high luminance area. Moreover, an appearance of the flicker is changed depending upon the luminance of the backlight. Therefore, the turning ON or OFF of the picture elements may be set appropriately according to the above conditions.

Figure 50:
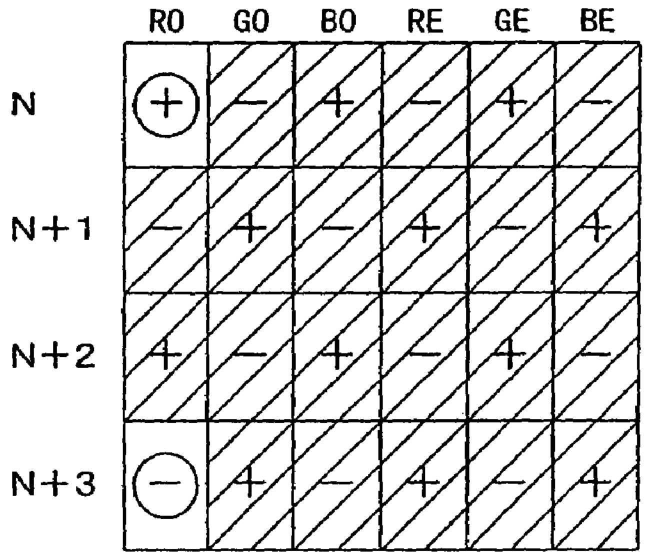
FIG. 50 is a view showing an example of special pattern.

In order to except the pattern shown in FIG. 50 from the flicker pattern, the turn-OFF picture elements may be decided as the turn-ON picture elements under certain conditions. In the case of the pattern shown in FIG. 50, no flicker is generated because the positive polarity and the negative polarity are mixed totally, but the vertical-striped pattern or the 2-dot checker pattern is not detected because both the RO picture element on the N+1-th row and the RO picture element on the N+2-th row are not turned ON. Accordingly, if the odd-numbered or the even-numbered picture elements on the N-th row and the N+2-th row are turned ON and the odd-numbered or the even-numbered picture elements on the N+1-th row and the N+2-th row are not turned ON, it is assumed that the picture elements on the N+1-th row and the N+2-th row are turned ON. Accordingly, the pattern shown in FIG. 50 can be excepted from the flicker patterns.

The optimum detection of the flicker pattern to mate with the polarity pattern can be attained by employing appropriately the above flicker pattern detecting method and the exception pattern detecting method in combination. For example, if the polarity pattern is the dot inversion pattern shown in FIG. 36A, the flicker pattern can be extracted by checking the turn-ON picture elements of two adjacent pixels in the horizontal direction. Then, it is decided whether or not the polarity pattern corresponds to the vertical-striped pattern or the vertical 2-dot checker pattern. Then, if the polarity pattern is the vertical-striped pattern or the vertical 2-dot checker pattern, such polarity pattern is excepted from the flicker patterns. Then, if it is decided finally that the polarity pattern displays the flicker pattern, such polarity pattern is switched into, for example, a two-horizontal lines/one-vertical line inverted pattern, as shown in FIG. 36B.

Further, when the polarity pattern corresponds to a vertical line inverted polarity pattern shown in FIG. 51, the polarity pattern is changed as the flicker pattern if the even-numbered column of certain color is the vertical-striped pattern but the odd-numbered column of the same color is not the vertical-striped pattern.

Furthermore, when the polarity pattern corresponds to a horizontal line inverted polarity pattern shown in FIG. 52, the number of the turn-ON picture elements out of the picture elements being aligned in the horizontal direction is counted, then a flag indicating that the number of the turn-ON picture elements is more than a predetermined number or a flag indicating that the number of the turn-ON picture elements is less than the predetermined number is set, and then the N-th line and the. N+1-th line are compared with each other. For example, since the patterns in which the number of the turn-ON picture elements on the N-th line is more than a predetermined number and the number of the turn-OFF picture elements on the N+1-th line is more than the predetermined number correspond to the flicker pattern, the polarity pattern is switched if the number of such patterns is more than a predetermined number.

(1) Configuration of the Seventh Embodiment

Figure 53:
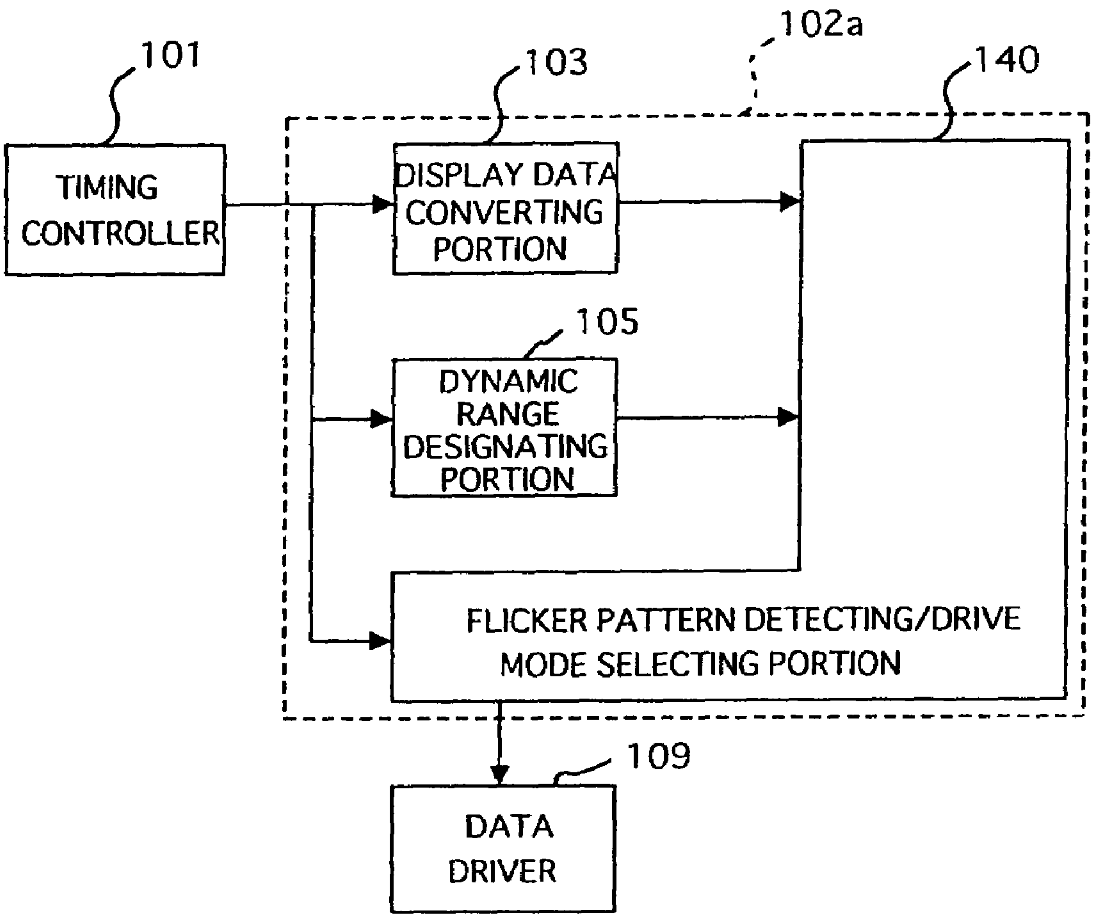
FIG. 53 is a block diagram showing a configuration of a liquid crystal display panel driver circuit according to a seventh embodiment of the present invention.

FIG. 53 is a block diagram showing a configuration of the liquid crystal display panel driver circuit according to the seventh embodiment. In FIG. 53, like references are affixed to the same constituent parts as those in the sixth embodiment shown in FIG. 37, and their detailed explanation will be omitted. The liquid crystal display panel driver circuit according to the seventh embodiment comprises a timing controller 101, a drive mode detecting portion 102*a*, and a data driver 109. The drive mode detecting portion 102*a* includes a display data converting portion 103, a dynamic range designating portion 105, and a flicker pattern detection/drive mode selecting portion 140.

(2) Circuits of the Flicker Pattern Detection/Drive Mode Selecting Portion

FIG. 54 to FIG. 59 are circuit diagrams each showing the flicker pattern detection/drive mode selecting portion. In a circuit shown in FIG. 54, the signals DGO, DGE out of the R, G, B signals (DRO, DRE, DGO, DGE, DBO, DBE) which are binarized by the display data converting portion 103 are input into an XOR gate 141. The XOR gate 141 sets the output signal GFP to "H" when any one of the signals DGO, DGE is "H", and the XOR gate 141 sets the output signal GFP to "L" in remaining situations. Then, the D-type flip-flop 142 receives the signal CNTCLR output from the dynamic range designating portion 105 and the data clock DCLK, and then outputs the signal DCNTCLR which is delayed from the signal CNTCLR by one clock.

The AND gate 143 outputs the "H" signal when both the signal DE which is output from the dynamic range designating portion 105 to define the dynamic range and the signal GFP which is output from the XOR gate 141 are "H", and outputs the "L" signal when the signal DE and the signal GFP take other conditions. The counter 144 counts an output of the AND gate 143 at timings in synchronism with the clock DCLK. Then, the counter 144 outputs the "H" signal when the counted value comes up to 2048 (¼ of the G picture element in the block). The counter 144 is cleared by the signal DCNTCLR which is output from the D-type flip-flop 142. The RS latch circuit 145 is set by the output of the counter 144 and is reset by the signal DCNTCLR.

Figure 54:
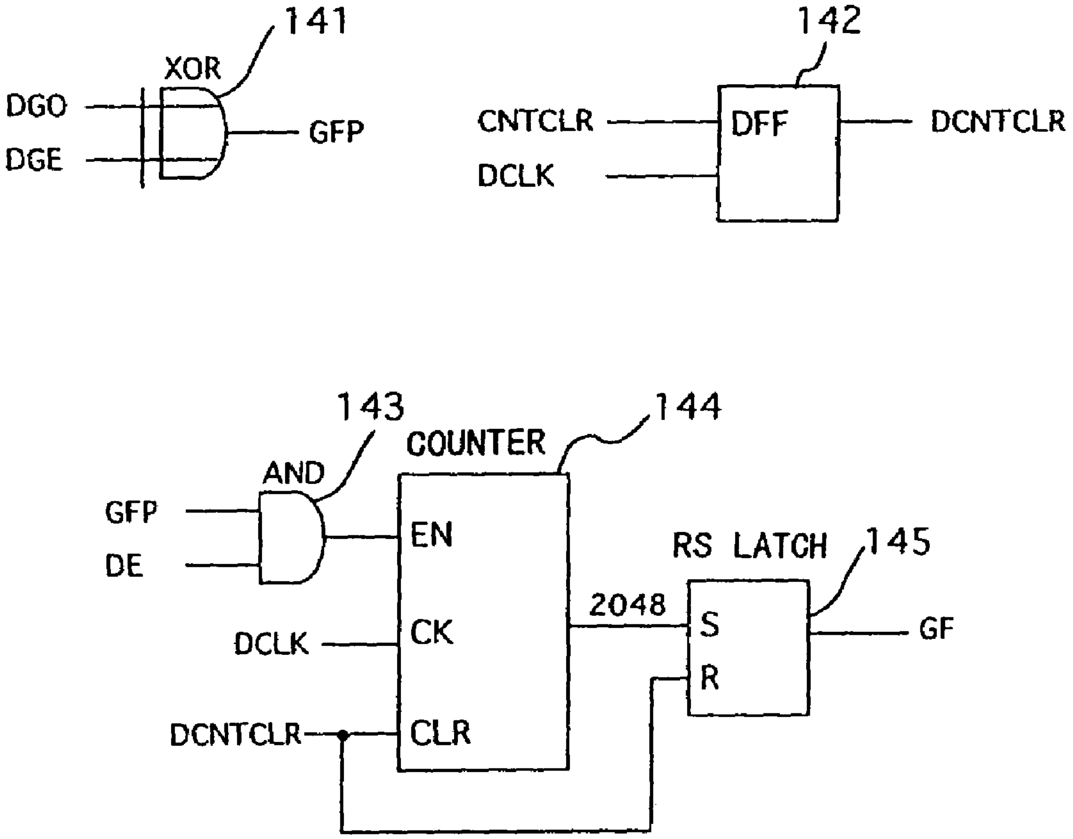
FIG. 54 is a circuit diagram showing a flicker pattern detection/drive mode selecting portion (No.1) according to the seventh embodiment of the present invention.

The circuits shown in FIG. 54 detects whether or not the G picture element pattern corresponds to the flicker pattern. In other words, it is decided that the G picture element pattern corresponds to the flicker pattern when, out of two pixels (6 picture elements) which are aligned in the horizontal direction, one G picture element is turned ON and the other G picture element is not turned ON. Then, the RS latch circuit 145 sets the output signal GF to "H" if the 2048 flicker patterns of the G picture elements or more are present in the dynamic range defined by the dynamic range designating portion 105.

Figure 55:
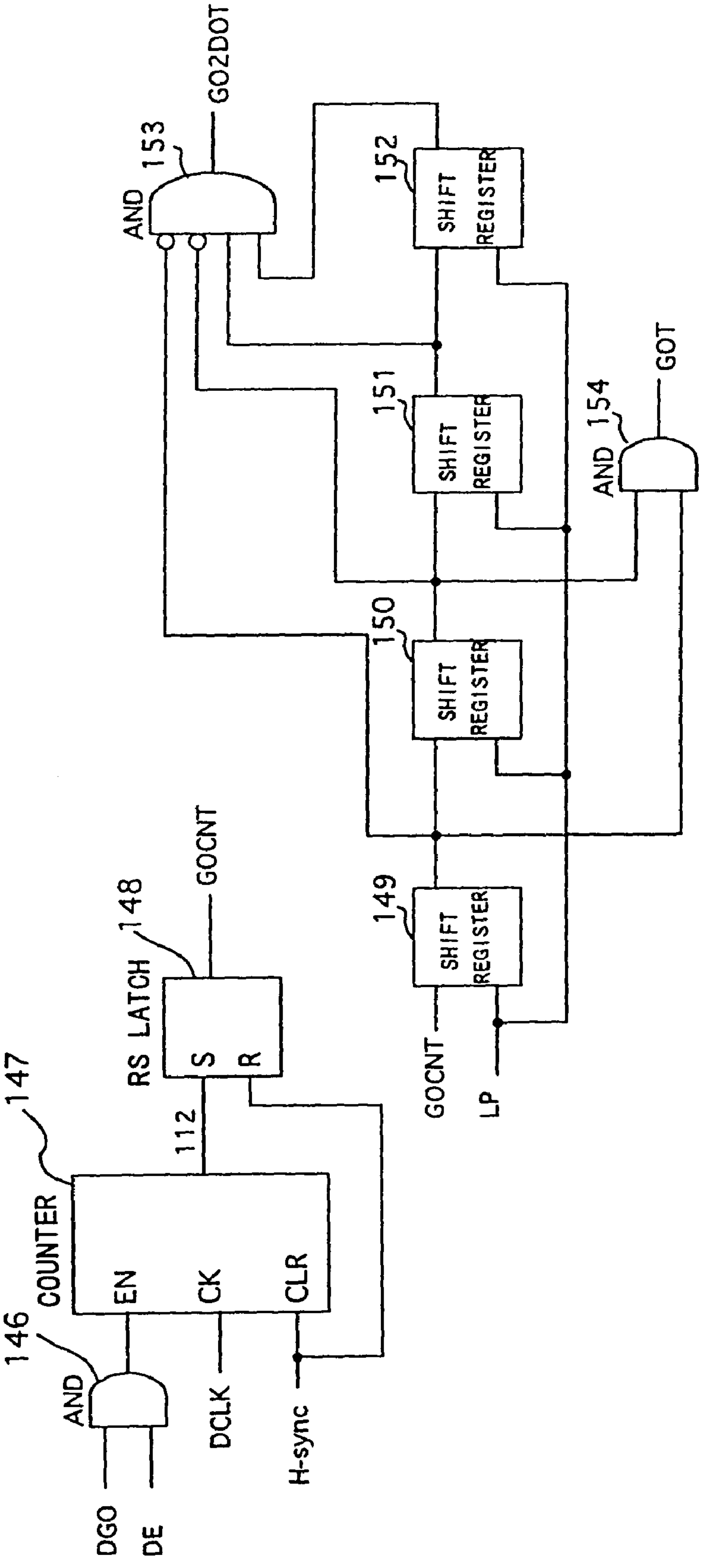
FIG. 55 is a circuit diagram showing a flicker pattern detection/drive mode selecting portion (No.2) according to the seventh embodiment of the present invention.

In circuits shown in FIG. 55, an AND gate 146 receives the signal DGO which is output from the display data converting portion 103 and the signal DE which is output from the dynamic range designating portion 105 to define the dynamic range, and outputs the "H" signal when these signals are "H". A counter 147 counts an output of the AND gate 146 at timings which are in synchronism with the data clock DCLK, and then outputs "H" when the counted value reaches 112. The counter 147 is cleared by the horizontal synchronizing signal H-sync. An RS latch 148 is set to output a signal GOCNT of "H" when the output of the counter 147 becomes "H", and is reset by the horizontal synchronizing signal H-sync.

In shift registers 149 to 152, the output signal GOCNT of the RS latch 148 is input into a first-stage shift register 149 which shifts the data according to the signal LP. In this case, the signal LP is a signal which becomes "H" after the valid data range of the horizontal synchronizing signal H-sync. An AND gate 153 receives outputs of the shift registers 149, 150 and inverted outputs of the shift registers 151, 152, and then outputs a signal G02DOT which becomes "H" when all outputs are "H". An AND gate 154 receives the outputs of the shift registers 149, 150, and then outputs a signal GOT which becomes "H" when both outputs are "H".

Figure 56:
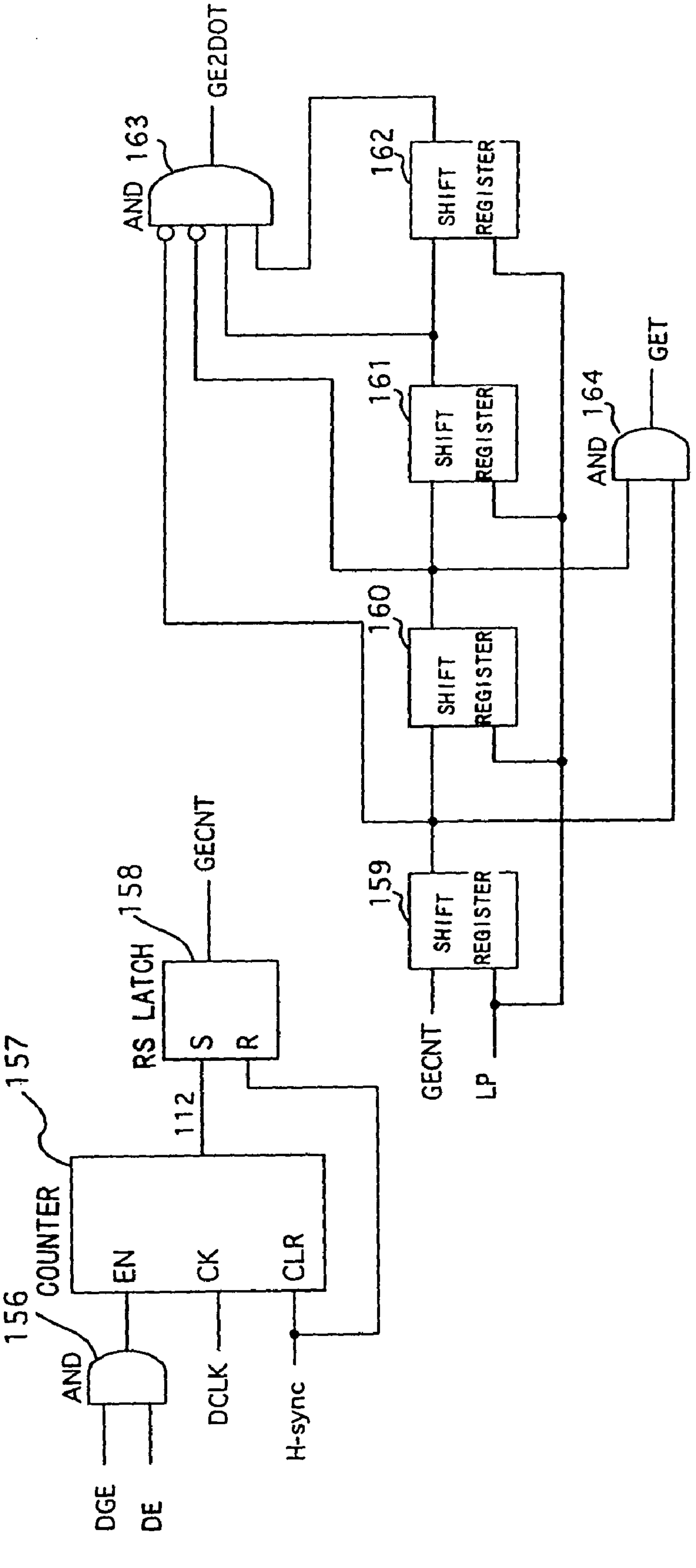
FIG. 56 is a circuit diagram showing a flicker pattern detection/drive mode selecting portion (No.3) according to the seventh embodiment of the present invention.

In circuits shown in FIG. 56, like the circuits in FIG. 55, an AND gate 155 outputs the "H" signal when the signal DGE which is output from the display data converting portion 103 and the signal DE which is output from the dynamic range designating portion 105 to define the dynamic range are "H". A counter 157 counts an output of the AND gate 156 at timings which are in synchronism with the data clock DCLK. Then, the counter 157 outputs "H" when the counted value comes up to 112. The counter 157 is cleared by the horizontal synchronizing signal H-sync. An RS latch 158 is set by the output of the counter 157 to output a signal GECNT, and is reset by the horizontal synchronizing signal H-sync.

In shift registers 159 to 162, the output signal GECNT of the RS latch 158 is input into a first-stage shift register 159 which shifts the data according to the signal LP. An AND gate 163 receives outputs of the shift registers 159, 160 and inverted outputs of the shift registers 161, 162, and then outputs a signal GE2DOT which becomes "H" when all outputs are "H". An AND gate 164 receives the outputs of the shift registers 159, 160, and then outputs a signal GET which becomes "H" when both outputs are "H".

The circuits shown in FIGS. 55, 56 are circuits for detecting patterns which are excepted from the flicker patterns. For example, if one G picture element of two pixels which are adjacent in the horizontal direction is turned ON and the other G picture element is not turned ON, such pattern is decided by the XOR gate 141 as the flicker pattern. However, the flicker appears conspicuously in the case shown in FIG. 47A, but the flicker becomes inconspicuous in the case where the turned-ON picture elements are arranged in the vertical direction, as shown in FIG. 47B. Therefore, in the seventh embodiment, the numbers of the turned-ON picture elements positioned on the odd-numbered lines and the even-numbered lines are counted along the vertical direction by the counters 147, 157 respectively, and then the output signals GOCNT, GECNT of the RS latch circuits 148, 158 become "H". The signals GOCNT, GECNT on the N-th row are compared with the counted values on the N+1-th row by the AND gates 154, 164. Then, as shown in FIG. 47B, it is decided that the turned-ON picture elements are aligned along the vertical direction when all signals are "H". At this time, the output signals GOT, GET of the AND gates 154, 164 become "H". Also, as shown in FIG. 49, it is decided that such pattern corresponds to the 2-dot checker pattern when the outputs of the AND gates 153, 163 are "H". At this time, the output signals GO2DOT, GE2DOT of the AND gates 153, 163 become "H".

Figure 57:
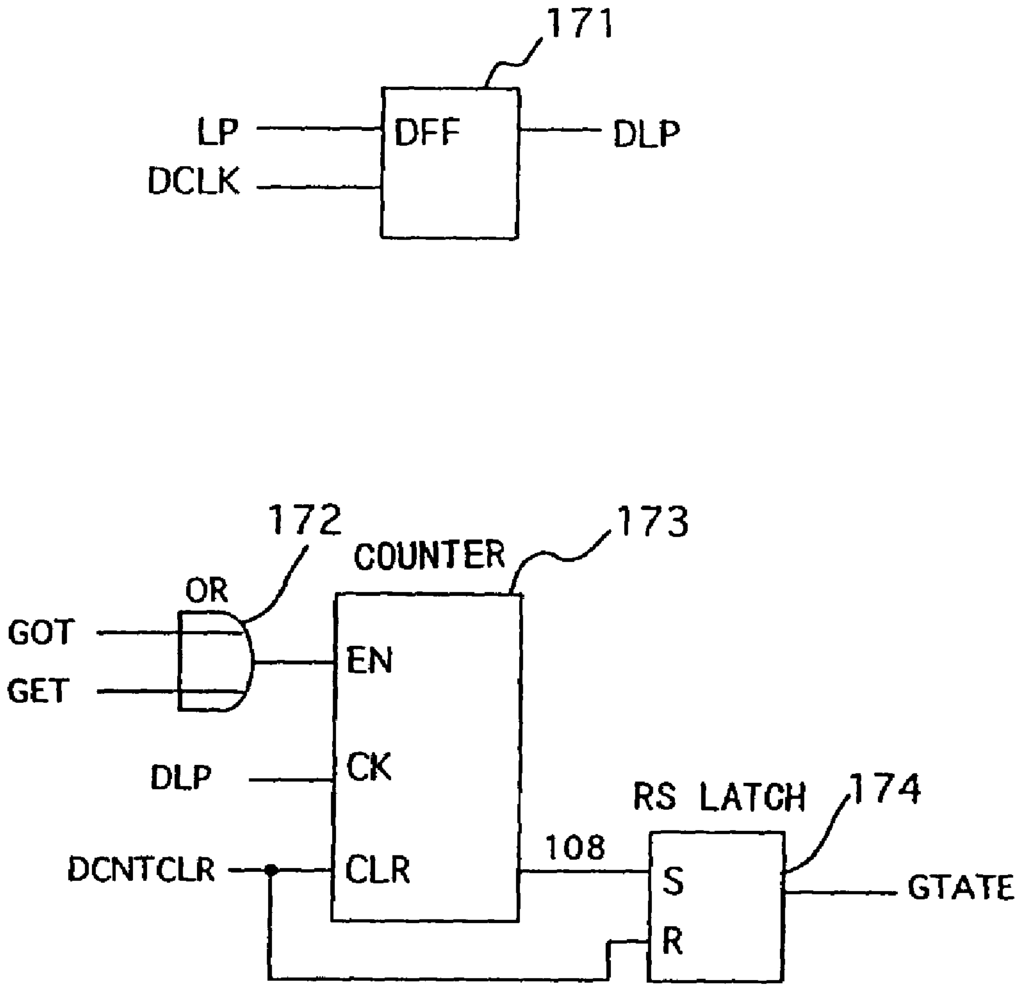
FIG. 57 is a circuit diagram showing a flicker pattern detection/drive mode selecting portion (No.4) according to the seventh embodiment of the present invention.

In circuits shown in FIG. 57, a D-type flip-flop 171 outputs a signal DLP which is delayed from the signal LP by one clock. An OR gate 172 receives the signals GOT, GET which are output from the AND gates 154, 164 shown in FIGS. 55, 56, and then outputs a signal "H" when at least one of them is "H". A counter 173 counts an output of the OR gate 172 at timings which are in synchronism with-the signal DLP of the D-type flip-flop 171. Then, the counter 173 outputs a signal which becomes "H" when the counted value is increased up to 108. This counter 173 is cleared by the output signal DCNTCLR of the D-type flip-flop 142 shown in FIG. 54. An RS latch 174 is set when the output of the counter 173 becomes "H", and is reset when the signal DCNTCLR output from the D-type flip-flop 142 shown in FIG. 54 becomes "H".

The circuits shown in FIG. 57 count the number of the green picture element in the odd-numbered pixels or the number of the green picture element in the even-numbered pixels along the vertical direction in the selected block, and then set the output signal GTATE of the RS latch 174 to "H" when the counted value reaches 108.

Figure 58:
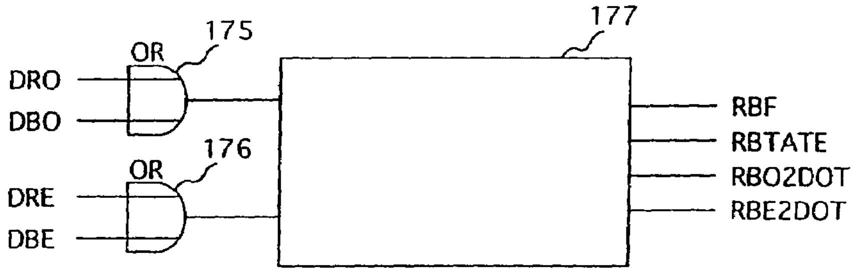
FIG. 58 is a circuit diagram showing a flicker pattern detection/drive mode selecting portion (No.5) according to the seventh embodiment of the present invention.

In circuits shown in FIG. 58, an OR gate 175 receives the signals DRO, DBO which are output from the display data converting portion 103, and then outputs a signal which becomes "H" when at least one of these signals DRO, DBO is "H". Also, an OR gate 176 receives the signals which are output from the display data converting portion 103, and then outputs a signal which becomes "H" when at least one of these signals DRE, DBE is "H". Then, signals RBF, RBTATE, RBO2DOT, RBE2DOT are generated by a circuit 177, which is similar to the circuits shown in FIGS. 54 to 57, and output therefrom. The signal RBF is a signal indicating whether or not the R picture element or B picture element flicker patters whose number is more than 2048 are present in one block. The signal RBTATE is a signal indicating whether or not such pattern corresponds to the red (R) or blue (B) vertical-striped pattern. The signal RBO2DOT is a signal indicating whether or not such pattern corresponds to the vertical 2-dot pattern of the R picture element or the B picture element on the odd-numbered column. The signal RBE2DOT is a signal indicating whether or not such pattern corresponds to the vertical 2-dot pattern of the R picture element or the B picture element on the even-numbered column.

Figure 59:
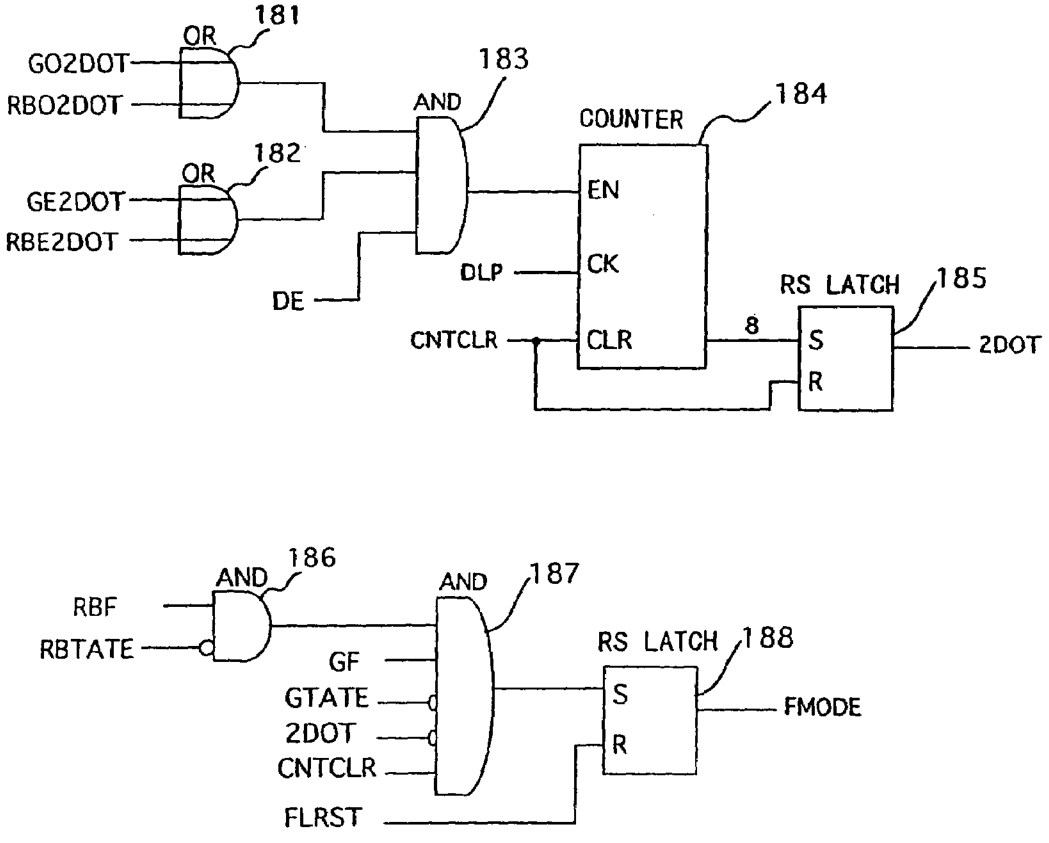
FIG. 59 is a circuit diagram showing a flicker pattern detection/drive mode selecting portion (No.6) according to the seventh embodiment of the present invention.

In circuits shown in FIG. 59, an OR gate 181 receives the signal GO2DOT which indicates the 2-dot checker pattern of the G picture element on the odd-numbered column and the signal RBO2DOT which indicates the 2-dot checker pattern of the R picture element or the B picture element on the odd-numbered column, and then outputs "H" when at least one of them is "H". Also, an OR gate 182 receives the signal GE2DOT which indicates the 2-dot checker pattern of the G picture element on the even-numbered column and the signal RBE2DOT which indicates the 2-dot checker pattern of the R picture element or the B picture element on the even-numbered column, and then outputs "H" when at least one of them is "H". An AND gate 183 receives outputs of the AND gates 181, 182 and the signal DE which defines the dynamic range, and then outputs "H" only when both of them are "H".

A counter 184 counts an output of the AND gate 183 at a timing which is given by the signal DLP output from the D-type flip-flop 171 shown in FIG. 57, and then outputs "H" when the counted value becomes equal to 8. This counter 184 is cleared by the signal CNTCLR output from the dynamic range designating portion 105. An RS latch 185 is set by an output of the counter 184, and is reset by the signal CNTCLR output from the dynamic range designating portion 105. Accordingly, an output signal 2DOT of the RS latch 185 becomes "H" when eight vertical-striped patterns or more are detected.

An output of an AND gate 186 becomes "H" only when both the signal RBF being output from the circuits shown in FIG. 58 and an inverted signal of the signal RBTATE are "H". An AND gate 187 outputs "H" only when all an output signal of the AND gate 186, an output signal GF of the RS latch circuit 145 shown in FIG. 54, an inverted signal of the output signal GTATE of the RS latch circuit 174 shown in FIG. 57, an inverted signal of the output signal 2DOT of the RS latch circuit 185 shown in FIG. 49, and the signal CNTCLR output from the dynamic range designating portion 105 are "H". An RS latch circuit 188 is set by an output of the AND gate 187, and is reset by the signal FLRST output from the counter 127 of the drive mode selecting portion (see FIG. 43). Like the fifth embodiment, the polarity pattern is switched by a signal FMODE output from the RS latch circuit 188.

(3) Advantage of the Seventh Embodiment

In the seventh embodiment, in addition to the similar advantage achieved by the fifth embodiment, such an advantage can be attained by setting appropriately the flicker patterns and the flicker exception-patterns that finer adjustment can be implemented.

In the above first to sixth embodiments, the timing controller 31 is connected to the personal computer, but the present invention is not limited to such embodiments. As devices being connected to the timing controller, there are a TV tuner, other video devices, etc.

Also, the above first to seventh embodiments show an example of the present invention respectively. The present invention is not limited to the scopes given by the above-mentioned embodiments.

What is claimed is:

1. A display panel driving method of receiving image signals, a horizontal synchronizing signal and a vertical synchronizing signal, or an enable signal, and then supplying data signals, which are generated from the image signals to change into a positive polarity and a negative polarity, to data bus lines of a display panel, comprising the steps of:

storing polarity patterns in a read only memory (ROM) of a polarity pattern storing portion; and detecting a polarity of data signals, which are supplied to the data bus lines, in compliance with the polarity patterns read from the polarity pattern storing portion.

2. A display panel driving method according to claim 1, further comprising the steps of:

storing a plurality of polarity patterns in the polarity pattern storing portion; and detecting the polarity of the data signals, which are supplied to the data bus lines, by outputting only one polarity pattern from the polarity pattern storing portion according to the image signals.

3. A display panel driving method according to claim 2, further comprising the steps of:

outputting any one polarity pattern of the plurality of polarity patterns from the polarity pattern storing portion, to supply the data signals with the polarity according to the polarity pattern to the data bus lines; and detecting whether or not the polarity pattern being output from the polarity pattern storing portion is similar to the image signals, to switch the polarity pattern which is output from the polarity pattern storing portion based on a detection result.

4. A display panel driving method according to claim 3, wherein the step of detecting whether or not the polarity pattern being output from the polarity pattern storing portion is similar to the image signals counts a coincidence number of times between them in a unit time or every predetermined data number, and compares a counted value with a predetermined value.

5. A display panel driver circuit for receiving image signals, a horizontal synchronizing signal and a vertical synchronizing signal, or an enable signal, and then supplying data signals, which are generated from the image signals to change into a positive polarity and a negative polarity, to data bus lines of a display panel, comprising:

a polarity pattern storing portion having a ROM for storing a polarity pattern;

a temporarily storing portion for storing the polarity pattern being output from the polarity pattern storing portion, and then outputting it as a polarity signal; and a data signal outputting portion for receiving the image signal and outputting the data signal with a polarity according to the polarity signal output from the temporarily storing portion.

6. A display panel driver circuit according to claim 5, wherein the polarity pattern storing portion stores data of two frame bit number, which consist of data for the odd-numbered frame and data for the even-numbered frame which has inverted logical values of the data for the odd-numbered frame, as a set of polarity patterns.

7. A display panel driver circuit according to claim 6, further comprising:

a polarity pattern switching portion for detecting whether or not the polarity pattern being output from the polarity pattern storing portion is similar to the image signal, and then switching the polarity pattern which is output from the polarity pattern storing portion based on a detection result.

8. A display panel driver circuit according to claim 5, further comprising:

a temporarily storing portion for storing the polarity pattern for one horizontal synchronization period output from the polarity pattern storing portion and outputting it as the polarity signal;

a polarity signal inverting portion for inverting the polarity of the polarity signal in synchronism with the horizontal synchronizing signal; and a data signal outputting portion for receiving the image signal and outputting the data signal with a polarity according to the polarity signal being output from the temporarily storing portion.

9. A display panel driver circuit according to claim 8, wherein the polarity pattern storing portion stores plural sets of polarity patterns, while using the data with the bit number for horizontal synchronization period as a set.

10. A display panel driving method of receiving image signals, a horizontal synchronizing signal and a vertical synchronizing signal, or an enable signal, and then supplying data signals, which are generated from the image signals to change into a positive polarity and a negative polarity, to data bus lines of a display panel, comprising the steps of:

partitioning a display screen into a plurality of blocks;

calculating a rate of flicker patterns contained in at least one block; and changing a polarity pattern, which detects a polarity of the data signal supplied to the data bus lines, from a first polarity pattern to a second polarity pattern when the rate exceeds a predetermined value.

11. A display panel driving method according to claim 10, wherein the polarity pattern is changed into the second polarity pattern when a number of blocks out of a plurality of blocks, in which the rate of flicker patterns is in excess of the predetermined value, exceeds a predetermined value.

12. A display panel driving method according to claim 10, wherein, after the plurality pattern is changed from the first plurality pattern to the second polarity pattern, the polarity pattern is returned to the first polarity pattern when the rate of flicker patterns contained in the block over a predetermined frame period is less than a predetermined value.

13. A display panel driving method according to claim 10, wherein partition positions of the blocks are changed frame by frame.

14. A display panel driving method according to claim 10, wherein the flicker patterns are detected every image signals for at least two pixels which are adjacent in a horizontal direction.

15. A display panel driver circuit for receiving image signals, a horizontal synchronizing signal and a vertical synchronizing signal, or an enable signal, and then supplying data signals, which are generated from the image signals to change into a positive polarity and a negative polarity, to data bus lines of a display panel, comprising:

an image signal detecting portion for receiving the image signals and then detecting turned-ON picture elements and turned-OFF picture elements;

a flicker pattern detecting portion for detecting whether or not a pattern corresponds to flicker patterns, based on a detection result of the image signal detecting portion;

a dynamic range designating portion for designating a dynamic range;

a flicker information amount detecting portion for calculating a rate at which the patterns, which are detected by the flicker pattern detecting portion as flicker patterns, are contained in the dynamic range which is designated by the dynamic range designating portion;

a driving mode selecting portion for outputting a signal to decide the polarity pattern of the data signal, based on a detection result of the flicker information amount detecting portion; and a polarity pattern varying portion for changing a polarity pattern, which detects a polarity of the data signal supplied to the data bus lines, from a first polarity pattern to a second polarity pattern according to an output of the driving mode selecting portion.

16. A liquid crystal display device comprising:

(i) a liquid crystal display panel;

(ii) an image signal detecting portion for receiving the image signals and then detecting turned-ON picture elements and turned-OFF picture elements;

(iii) a flicker pattern detecting portion for detecting whether or not a pattern corresponds to flicker patterns, based on a detection result of the image signal detecting portion;

(iv) a dynamic range designating portion for designating a dynamic range;

(v) a flicker information amount detecting portion for calculating a rate at which the patterns, which are detected by the flicker pattern detecting portion as flicker patterns, are contained in the dynamic range which is designated by the dynamic range designating portion;

(vi) a driving mode selecting portion for outputting a signal to select the polarity pattern of the data signal, based on a detection result of the flicker information amount detecting portion; and (vii) a polarity pattern varying portion for changing a polarity pattern, which detects a polarity of the data signal supplied to the data bus lines, from a first polarity pattern to a second polarity pattern according to an output of the driving mode selecting portion.

17. A liquid crystal display device according to claim 16, further comprising:

an exception pattern detecting portion for detecting patterns, which are to be excepted from the flicker patterns, from the patterns which are detected by the flicker pattern detecting portion as the flicker patterns.

* * * * *